United States Patent
Ravid et al.

(10) Patent No.: US 10,831,509 B2
(45) Date of Patent: Nov. 10, 2020

(54) DYNAMIC EXECUTION OF PARAMETERIZED APPLICATIONS FOR THE PROCESSING OF KEYED NETWORK DATA STREAMS

(71) Applicant: Ab Initio Technology LLC, Lexington, MA (US)

(72) Inventors: Oded Ravid, Lincoln, MA (US); Larry Paul Rossi, Colorado Springs, CO (US); Peter Baxter, Bath (GB); Joel Gould, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 452 days.

(21) Appl. No.: 15/688,587

(22) Filed: Aug. 28, 2017

(65) Prior Publication Data

US 2018/0239615 A1 Aug. 23, 2018

Related U.S. Application Data

(60) Provisional application No. 62/462,498, filed on Feb. 23, 2017.

(51) Int. Cl.
*G06F 7/00* (2006.01)
*G06F 9/448* (2018.01)
(Continued)

(52) U.S. Cl.
CPC ........ *G06F 9/4494* (2018.02); *G06F 9/44505* (2013.01); *G06F 16/1794* (2019.01);
(Continued)

(58) Field of Classification Search
CPC ............ G06F 16/1794; G06F 16/9024; G06F 17/30958; G06F 16/24568; G06F 9/4494; G06F 9/44505
(Continued)

(56) References Cited

U.S. PATENT DOCUMENTS

| 4,386,234 A | 5/1983 | Ehrsam et al. |
| 4,468,750 A | 8/1984 | Chamoff et al. |

(Continued)

FOREIGN PATENT DOCUMENTS

| AU | 2010212305 | 7/2014 |
| AU | 2012382780 | 6/2016 |

(Continued)

OTHER PUBLICATIONS

'tibco.com' [online]. "TIBCO Activematrix Businessworks," Jan. 26, 2013 [retrieved on Jul. 13, 2016]. Retrieved from the Internet: URL <www.tibco.com/integration>. 4 pages.
(Continued)

*Primary Examiner* — Md I Uddin
(74) *Attorney, Agent, or Firm* — Fish & Richardson P.C.

(57) ABSTRACT

A method is described for processing keyed data items that are each associated with a value of a key, the keyed data items being from a plurality of distinct data streams, the processing including collecting the keyed data items, determining, based on contents of at least one of the keyed data items, satisfaction of one or more specified conditions for execution of one or more actions and causing execution of at least one of the one or more actions responsive to the determining.

49 Claims, 17 Drawing Sheets

(51) Int. Cl.
*G06F 16/901* (2019.01)
*G06F 16/2455* (2019.01)
*G06F 16/178* (2019.01)
*G06F 9/445* (2018.01)
*G06F 8/41* (2018.01)

(52) U.S. Cl.
CPC .... *G06F 16/24568* (2019.01); *G06F 16/9024* (2019.01); *G06F 8/433* (2013.01)

(58) Field of Classification Search
USPC .......................................... 707/748, 769, 770
See application file for complete search history.

(56) References Cited

U.S. PATENT DOCUMENTS

| | | |
|---|---|---|
| 4,805,134 A | 2/1989 | Calo et al. |
| 5,165,031 A | 11/1992 | Pruul et al. |
| 5,201,044 A | 4/1993 | Frey, Jr. et al. |
| 5,261,089 A | 11/1993 | Coleman et al. |
| 5,276,876 A | 1/1994 | Coleman et al. |
| 5,319,774 A | 6/1994 | Ainsworth et al. |
| 5,327,532 A | 7/1994 | Ainsworth et al. |
| 5,363,505 A | 11/1994 | Maslak et al. |
| 5,408,409 A | 4/1995 | Glassman et al. |
| 5,410,684 A | 4/1995 | Ainsworth et al. |
| 5,600,778 A | 2/1997 | Swanson et al. |
| 5,603,034 A | 2/1997 | Swanson |
| 5,784,610 A | 7/1998 | Copeland, III et al. |
| 5,794,209 A | 8/1998 | Agrawal et al. |
| 5,802,599 A | 9/1998 | Cabrera et al. |
| 5,819,249 A | 10/1998 | Dohanich et al. |
| 5,828,862 A | 10/1998 | Singkornrat et al. |
| 5,835,694 A | 11/1998 | Hodges |
| 5,956,693 A | 9/1999 | Geerlings |
| 5,960,199 A | 9/1999 | Brodsky et al. |
| 6,088,026 A | 7/2000 | Williams |
| 6,108,700 A | 8/2000 | MacCabee et al. |
| 6,126,330 A | 10/2000 | Knight |
| 6,219,737 B1 | 4/2001 | Chen et al. |
| 6,240,444 B1 | 5/2001 | Fin et al. |
| 6,278,997 B1 | 8/2001 | Agrawal et al. |
| 6,292,933 B1 | 9/2001 | Bahrs et al. |
| 6,298,478 B1 | 10/2001 | Nally et al. |
| 6,301,630 B1 | 10/2001 | Chen et al. |
| 6,324,612 B1 | 11/2001 | Chen et al. |
| 6,405,276 B1 | 6/2002 | Chen et al. |
| 6,446,004 B1 | 9/2002 | Cao et al. |
| 6,457,143 B1 | 9/2002 | Yue |
| 6,493,826 B1 | 12/2002 | Schofield et al. |
| 6,513,152 B1 | 1/2003 | Branson et al. |
| 6,519,766 B1 | 2/2003 | Barritz et al. |
| 6,571,216 B1 | 5/2003 | Garg et al. |
| 6,606,527 B2 | 8/2003 | De Andrade, Jr. et al. |
| 6,631,309 B2 | 10/2003 | Boies et al. |
| 6,671,716 B1 | 12/2003 | Diedrichsen et al. |
| 6,701,363 B1 | 3/2004 | Chiu et al. |
| 6,704,843 B1 | 3/2004 | Arimilli et al. |
| 6,721,856 B1 | 4/2004 | Arimilli et al. |
| 6,748,550 B2 | 6/2004 | McBrearty et al. |
| 6,763,433 B1 | 7/2004 | Arimilli et al. |
| 6,779,177 B1 | 8/2004 | Bahrs et al. |
| 6,829,608 B2 | 12/2004 | Ma et al. |
| 6,829,731 B1 | 12/2004 | Lafauci et al. |
| 6,829,765 B1 | 12/2004 | Chan et al. |
| 6,829,771 B1 | 12/2004 | Bahrs et al. |
| 6,862,686 B1 | 3/2005 | Bahrs et al. |
| 6,885,641 B1 | 4/2005 | Chan et al. |
| 6,901,425 B1 | 5/2005 | Dykes et al. |
| 6,901,554 B1 | 5/2005 | Bahrs et al. |
| 6,973,638 B1 | 12/2005 | Gangopadhyay et al. |
| 6,976,027 B2 | 12/2005 | Cutlip et al. |
| 6,985,939 B2 | 1/2006 | Fletcher et al. |
| 7,024,670 B1 | 4/2006 | Leymann et al. |
| 7,069,427 B2 | 6/2006 | Adler et al. |
| 7,072,839 B2 | 7/2006 | Willner et al. |
| 7,085,286 B2 | 8/2006 | Dias et al. |
| 7,093,169 B2 | 8/2006 | Merriam |
| 7,134,075 B2 | 11/2006 | Hind et al. |
| 7,143,139 B2 | 11/2006 | Burbeck et al. |
| 7,149,296 B2 | 12/2006 | Brown et al. |
| 7,158,924 B2 | 1/2007 | Williams et al. |
| 7,181,489 B2 | 2/2007 | Lection et al. |
| 7,181,686 B1 | 2/2007 | Bahrs |
| 7,194,418 B2 | 3/2007 | Smith et al. |
| 7,206,732 B2 | 4/2007 | Williams et al. |
| 7,222,302 B2 | 5/2007 | Hauser et al. |
| 7,275,048 B2 | 9/2007 | Bigus et al. |
| 7,346,559 B2 | 3/2008 | Kraft et al. |
| 7,376,900 B2 | 5/2008 | Guido et al. |
| 7,424,530 B2 | 9/2008 | Chagoly et al. |
| 7,437,314 B2 | 10/2008 | Borenstein et al. |
| 7,448,035 B2 | 11/2008 | Dorrance et al. |
| 7,454,325 B2 | 11/2008 | Behm et al. |
| 7,454,469 B2 | 11/2008 | Zhou et al. |
| 7,496,855 B2 | 2/2009 | Guido et al. |
| 7,558,758 B2 | 7/2009 | McCarthy et al. |
| 7,567,994 B2 | 7/2009 | Adkins et al. |
| 7,596,583 B2 | 9/2009 | Chang et al. |
| 7,603,469 B2 | 10/2009 | Fletcher et al. |
| 7,606,742 B2 | 10/2009 | Bright et al. |
| 7,624,176 B2 | 11/2009 | Dickerson et al. |
| 7,634,726 B2 | 12/2009 | Ims et al. |
| 7,636,873 B2 | 12/2009 | Lacombe et al. |
| 7,711,462 B2 | 5/2010 | Daniels et al. |
| 7,752,159 B2 | 7/2010 | Nelken et al. |
| 7,752,183 B2 | 7/2010 | Patterson |
| 7,818,745 B2 | 10/2010 | Snyder |
| 7,844,562 B2 | 11/2010 | Gong et al. |
| 7,844,564 B2 | 11/2010 | Donohue et al. |
| 7,877,381 B2 | 1/2011 | Ewen et al. |
| 7,895,333 B2 | 2/2011 | Elliott et al. |
| 7,904,753 B2 | 3/2011 | Athey et al. |
| 7,908,225 B1 | 3/2011 | Bigus et al. |
| 7,908,233 B2 | 3/2011 | Angell et al. |
| 7,908,237 B2 | 3/2011 | Angell et al. |
| 7,908,365 B2 | 3/2011 | Sengupta et al. |
| 7,912,946 B2 | 3/2011 | Sengupta et al. |
| 7,914,288 B2 | 3/2011 | Cowherd et al. |
| 7,925,485 B2 | 4/2011 | D'Amora et al. |
| 7,933,975 B2 | 4/2011 | Allard et al. |
| 7,937,500 B2 | 5/2011 | Fletcher et al. |
| 7,937,716 B2 | 5/2011 | Betts et al. |
| 7,949,551 B2 | 5/2011 | Kloppmann et al. |
| 7,953,830 B2 | 5/2011 | Foster et al. |
| 7,958,032 B2 | 6/2011 | Schimpf et al. |
| 7,971,180 B2 | 6/2011 | Kreamer et al. |
| 8,005,736 B2 | 8/2011 | Botzer et al. |
| 8,006,174 B2 | 8/2011 | Aureglia et al. |
| 8,006,223 B2 | 8/2011 | Boulineau et al. |
| 8,028,203 B2 | 9/2011 | Chellam et al. |
| 8,032,765 B2 | 10/2011 | Dettinger et al. |
| 8,055,606 B2 | 11/2011 | Kreamer et al. |
| 8,060,919 B2 | 11/2011 | Andrasak et al. |
| 8,069,129 B2 | 11/2011 | Gould et al. |
| 8,117,234 B2 | 2/2012 | Parrott |
| 8,140,346 B2 | 3/2012 | Kaplan |
| 8,141,054 B2 | 3/2012 | Dolby et al. |
| 8,146,086 B2 | 3/2012 | Creamer et al. |
| 8,161,462 B2 | 4/2012 | Herbeck et al. |
| 8,180,559 B2 | 5/2012 | Jaffe et al. |
| 8,180,708 B2 | 5/2012 | Hurtado et al. |
| 8,190,693 B2 | 5/2012 | Bank et al. |
| 8,195,803 B2 | 6/2012 | Zhang et al. |
| 8,219,848 B2 | 7/2012 | Branson et al. |
| 8,219,998 B2 | 7/2012 | Taylor et al. |
| 8,266,630 B2 | 9/2012 | Araujo et al. |
| 8,272,059 B2 | 9/2012 | Freeman et al. |
| 8,285,583 B2 | 10/2012 | Jauffred et al. |
| 8,285,872 B2 | 10/2012 | Kennedy et al. |
| 8,290,806 B2 | 10/2012 | Lee et al. |
| 8,301,693 B2 | 10/2012 | Finley et al. |
| 8,302,069 B1 | 10/2012 | Hosmer |
| 8,302,861 B2 | 11/2012 | Siotia et al. |

(56) References Cited

U.S. PATENT DOCUMENTS

| | | |
|---|---|---|
| 8,315,904 B2 | 11/2012 | Black et al. |
| 8,326,660 B2 | 12/2012 | Breitgand et al. |
| 8,326,669 B2 | 12/2012 | Korupolu et al. |
| 8,346,931 B2 | 1/2013 | Bobak et al. |
| 8,356,254 B2 | 1/2013 | Dennard et al. |
| 8,364,634 B2 | 1/2013 | Horii |
| 8,365,189 B2 | 1/2013 | Jackson et al. |
| 8,370,575 B2 | 2/2013 | Eichenberger et al. |
| 8,386,611 B2 | 2/2013 | Inoue |
| 8,386,960 B1 | 2/2013 | Eismann et al. |
| 8,406,412 B2 | 3/2013 | Bethea et al. |
| 8,423,382 B2 | 4/2013 | Dettinger et al. |
| 8,423,602 B2 | 4/2013 | Goodman et al. |
| 8,428,983 B2 | 4/2013 | Bobak et al. |
| 8,433,786 B2 | 4/2013 | Agrawal et al. |
| 8,447,859 B2 | 5/2013 | Bobak et al. |
| 8,458,002 B2 | 6/2013 | Chafle et al. |
| 8,473,343 B2 | 6/2013 | Chalimadugu et al. |
| 8,473,344 B2 | 6/2013 | Benveniste et al. |
| 8,510,351 B2 | 8/2013 | Aronovich et al. |
| 8,510,430 B2 | 8/2013 | McKinney |
| 8,515,824 B2 | 8/2013 | Herring et al. |
| 8,515,924 B2 | 8/2013 | Paknad et al. |
| 8,521,786 B2 | 8/2013 | Black et al. |
| 8,543,528 B2 | 9/2013 | Lunteren |
| 8,560,357 B2 | 10/2013 | Sickenius et al. |
| 8,572,044 B2 | 10/2013 | Booz et al. |
| 8,577,087 B2 | 11/2013 | Albertson et al. |
| 8,582,803 B2 | 11/2013 | Ding et al. |
| 8,589,594 B2 | 11/2013 | Fletcher et al. |
| 8,594,855 B2 | 11/2013 | Musti et al. |
| 8,601,494 B2 | 12/2013 | Brown et al. |
| 8,612,286 B2 | 12/2013 | Bobbitt et al. |
| 8,620,688 B2 | 12/2013 | Dettinger et al. |
| 8,636,209 B2 | 1/2014 | Dennard et al. |
| 8,650,152 B2 | 2/2014 | Dettinger et al. |
| 8,655,623 B2 | 2/2014 | Duyanovich et al. |
| 8,667,165 B2 | 3/2014 | Brabson et al. |
| 8,674,843 B2 | 3/2014 | Bhageria et al. |
| 8,682,688 B1 | 3/2014 | Coluni et al. |
| 8,689,188 B2 | 4/2014 | Bassin et al. |
| 8,739,182 B2 | 5/2014 | Lambert et al. |
| 8,744,898 B1 | 6/2014 | Hewett et al. |
| 8,769,706 B2 | 7/2014 | Deng et al. |
| 8,793,377 B2 | 7/2014 | Anderson, III et al. |
| 8,805,737 B1 | 8/2014 | Chen et al. |
| 8,805,777 B2 | 8/2014 | Hajare et al. |
| 8,812,384 B2 | 8/2014 | Zhang et al. |
| 8,831,972 B2 | 9/2014 | Angell et al. |
| 8,839,167 B1 | 9/2014 | Dreibelbis et al. |
| 8,839,345 B2 | 9/2014 | Griffin et al. |
| 8,843,387 B2 | 9/2014 | Ricketts |
| 8,843,404 B2 | 9/2014 | Connors et al. |
| 8,843,621 B2 | 9/2014 | Dejana et al. |
| 8,875,120 B2 | 10/2014 | Venkatesan et al. |
| 8,880,237 B2 | 11/2014 | Boss et al. |
| 8,881,148 B2 | 11/2014 | Diaz et al. |
| 8,898,731 B2 | 11/2014 | De Armas et al. |
| 8,914,507 B2 | 12/2014 | Donoho et al. |
| 8,930,408 B2 | 1/2015 | Ramakrishnan et al. |
| 8,930,818 B2 | 1/2015 | Cordasco et al. |
| 8,937,456 B2 | 1/2015 | Bhageria et al. |
| 8,938,405 B2 | 1/2015 | Pinhanez et al. |
| 8,943,463 B2 | 1/2015 | Zhang et al. |
| 8,949,172 B2 | 2/2015 | Beaty et al. |
| 8,949,810 B2 | 2/2015 | Andrade et al. |
| 8,954,433 B2 | 2/2015 | Angell et al. |
| 8,954,724 B2 | 2/2015 | Branson et al. |
| 8,972,873 B2 | 3/2015 | Gerken, III et al. |
| 8,981,928 B2 | 3/2015 | Narayanaswami |
| 8,984,030 B2 | 3/2015 | Nagpal et al. |
| 8,987,010 B1 | 3/2015 | Ayotte et al. |
| 8,988,139 B2 | 3/2015 | Phan et al. |
| 8,996,714 B2 | 3/2015 | Johnston |
| 9,000,837 B1 | 4/2015 | Fifield |
| 9,003,080 B2 | 4/2015 | Bachrany et al. |
| 9,021,007 B2 | 4/2015 | Aggarwal et al. |
| 9,036,796 B2 | 5/2015 | Mankar et al. |
| 9,037,306 B2 | 5/2015 | Bhageria et al. |
| 9,037,533 B2 | 5/2015 | Hinshaw et al. |
| 9,043,037 B2 | 5/2015 | Bhageria et al. |
| 9,069,889 B2 | 6/2015 | Addison et al. |
| 9,069,964 B2 | 6/2015 | Ollmann et al. |
| 9,081,937 B2 | 7/2015 | Biswas et al. |
| 9,104,427 B2 | 8/2015 | Heller, Jr. et al. |
| 9,111,029 B2 | 8/2015 | Chagoly et al. |
| 9,112,733 B2 | 8/2015 | Falk et al. |
| 9,122,715 B2 | 9/2015 | Dickerson et al. |
| 9,134,957 B2 | 9/2015 | Bao et al. |
| 9,135,594 B2 | 9/2015 | Cross et al. |
| 9,152,168 B2 | 10/2015 | Bickford et al. |
| 9,164,878 B2 | 10/2015 | Kosuda |
| 9,167,029 B2 | 10/2015 | Beerse et al. |
| 9,171,142 B2 | 10/2015 | Do et al. |
| 9,223,760 B2 | 12/2015 | Boyer et al. |
| 9,235,319 B2 | 1/2016 | Finn et al. |
| 9,250,947 B2 | 2/2016 | Anand et al. |
| 9,253,610 B2 | 2/2016 | Nielsen et al. |
| 9,256,714 B2 | 2/2016 | Kumar et al. |
| 9,256,900 B2 | 2/2016 | Brown et al. |
| 9,262,206 B2 | 2/2016 | Cain, III et al. |
| 9,270,562 B2 | 2/2016 | Curtis et al. |
| 9,276,893 B2 | 3/2016 | Ajmera et al. |
| 9,288,158 B2 | 3/2016 | Boss et al. |
| 9,330,145 B2 | 5/2016 | Satyanarayanan |
| 9,361,031 B2 | 6/2016 | Busaba et al. |
| 9,396,234 B2 | 7/2016 | Lynch et al. |
| 9,397,947 B2 | 7/2016 | Dunne et al. |
| 9,411,397 B2 | 8/2016 | Deluca et al. |
| 9,424,525 B1 | 8/2016 | Byrne et al. |
| 9,430,276 B2 | 8/2016 | Busaba et al. |
| 9,442,738 B2 | 9/2016 | Alexander et al. |
| 9,448,773 B2 | 9/2016 | Calvin et al. |
| 9,460,393 B2 | 10/2016 | Friedlander et al. |
| 9,471,313 B1 | 10/2016 | Busaba et al. |
| 9,483,276 B2 | 11/2016 | Busaba et al. |
| 9,483,570 B2 | 11/2016 | Connan et al. |
| 9,495,342 B2 | 11/2016 | Lawrance |
| 9,501,232 B2 | 11/2016 | Gschwind et al. |
| 9,514,006 B1 | 12/2016 | Busaba et al. |
| 9,516,021 B2 | 12/2016 | Boivie et al. |
| 9,535,978 B2 | 1/2017 | Coldicott et al. |
| 9,536,108 B2 | 1/2017 | Powell et al. |
| 9,553,782 B2 | 1/2017 | Bartfai-Walcott et al. |
| 9,558,459 B2 | 1/2017 | Bobak et al. |
| 9,569,187 B2 | 2/2017 | Lewis |
| 9,569,791 B2 | 2/2017 | Akselrod et al. |
| 9,582,315 B2 | 2/2017 | Busaba et al. |
| 9,584,667 B2 | 2/2017 | Narayan et al. |
| 9,600,510 B2 | 3/2017 | Beechuk et al. |
| 9,601,104 B2 | 3/2017 | Cecchi et al. |
| 9,619,383 B2 | 4/2017 | Busaba et al. |
| 9,633,069 B2 | 4/2017 | Amador et al. |
| 9,639,888 B2 | 5/2017 | Proulx |
| 9,641,685 B2 | 5/2017 | Lintner |
| 9,665,391 B2 | 5/2017 | Das Gupta et al. |
| 9,665,564 B2 | 5/2017 | Bruno et al. |
| 9,674,059 B2 | 6/2017 | Aguiar et al. |
| 9,690,556 B2 | 6/2017 | Busaba et al. |
| 9,690,627 B2 | 6/2017 | Goyal et al. |
| 9,711,151 B2 | 7/2017 | Assem Aly Salama et al. |
| 9,727,604 B2 | 8/2017 | Jin et al. |
| 9,734,447 B1 | 8/2017 | Diev et al. |
| 9,734,473 B2 | 8/2017 | Scott et al. |
| 9,736,143 B2 | 8/2017 | Bocanegra et al. |
| 9,741,147 B2 | 8/2017 | Allen et al. |
| 9,753,962 B2 | 9/2017 | Petschulat et al. |
| 9,760,917 B2 | 9/2017 | O'Sullivan et al. |
| 9,772,374 B2 | 9/2017 | Bickford et al. |
| 9,779,409 B2 | 10/2017 | Fransen et al. |
| 9,779,447 B2 | 10/2017 | Paolini et al. |
| 9,782,069 B2 | 10/2017 | Bellamy et al. |
| 9,785,719 B2 | 10/2017 | Ma et al. |
| 9,785,884 B2 | 10/2017 | Hamilton, II et al. |

(56) References Cited

U.S. PATENT DOCUMENTS

| | | |
|---|---|---|
| 9,787,803 B2 | 10/2017 | Wenig et al. |
| 9,794,128 B2 | 10/2017 | DeCusatis et al. |
| 9,800,502 B2 | 10/2017 | Iles et al. |
| 9,804,863 B2 | 10/2017 | Burris et al. |
| 9,805,010 B2 | 10/2017 | Pittenger et al. |
| 9,805,324 B2 | 10/2017 | Ding et al. |
| 9,807,187 B2 | 10/2017 | Herman |
| 9,809,184 B2 | 11/2017 | Smith et al. |
| 9,811,505 B2 | 11/2017 | Gagliano et al. |
| 9,811,808 B2 | 11/2017 | Abuelsaad et al. |
| 9,842,000 B2 | 12/2017 | Bishop et al. |
| 9,846,593 B2 | 12/2017 | Bradbury et al. |
| 9,852,239 B2 | 12/2017 | Natarajan et al. |
| 9,858,082 B2 | 1/2018 | Greiner et al. |
| 9,858,592 B2 | 1/2018 | Osogami |
| 9,860,796 B2 | 1/2018 | Bostick et al. |
| 9,866,504 B2 | 1/2018 | Okada et al. |
| 9,883,033 B2 | 1/2018 | Li et al. |
| 9,888,340 B2 | 2/2018 | Brunn et al. |
| 9,894,266 B2 | 2/2018 | Andreassen et al. |
| 9,900,750 B2 | 2/2018 | Berentsen et al. |
| 9,904,442 B2 | 2/2018 | Hamilton, II et al. |
| 9,904,668 B2 | 2/2018 | Bruno et al. |
| 9,911,260 B2 | 3/2018 | Deluca et al. |
| 9,917,885 B2 | 3/2018 | Campbell et al. |
| 9,921,895 B2 | 3/2018 | Gschwind et al. |
| 9,922,357 B2 | 3/2018 | Proulx |
| 9,923,416 B2 | 3/2018 | Bhageria et al. |
| 9,935,837 B2 | 4/2018 | Barajas Gonzalez et al. |
| 9,940,581 B2 | 4/2018 | Bostick et al. |
| 9,940,648 B2 | 4/2018 | Hamilton, II et al. |
| 9,942,385 B2 | 4/2018 | Fisk et al. |
| 9,946,593 B2 | 4/2018 | Bishop et al. |
| 9,948,536 B2 | 4/2018 | Shazly et al. |
| 9,948,644 B2 | 4/2018 | Brouk et al. |
| 9,953,181 B2 | 4/2018 | Dunaway |
| 9,953,295 B2 | 4/2018 | Hughes et al. |
| 9,965,330 B2 | 5/2018 | Bishop et al. |
| 9,967,255 B2 | 5/2018 | Ciancio-Bunch et al. |
| 9,971,690 B2 | 5/2018 | Gschwind et al. |
| 9,971,942 B2 | 5/2018 | Fan et al. |
| 9,977,505 B2 | 5/2018 | Balasubramanian et al. |
| 9,983,774 B2 | 5/2018 | Disdero et al. |
| 9,983,943 B2 | 5/2018 | Jemiolo |
| 9,984,410 B2 | 5/2018 | Davis et al. |
| 9,984,425 B2 | 5/2018 | Kemp |
| 9,985,787 B2 | 5/2018 | Quirk et al. |
| 9,996,846 B2 | 6/2018 | Boss et al. |
| 10,007,243 B2 | 6/2018 | Bhageria et al. |
| 10,007,571 B2 | 6/2018 | Rajagopa et al. |
| 10,007,580 B2 | 6/2018 | Auvenshine et al. |
| 10,007,625 B2 | 6/2018 | Hagspiel et al. |
| 10,007,912 B2 | 6/2018 | Gaur et al. |
| 10,019,297 B2 | 7/2018 | Helmich et al. |
| 10,026,109 B2 | 7/2018 | Follis |
| 10,031,830 B2 | 7/2018 | Brodsky et al. |
| 10,031,938 B2 | 7/2018 | Allen et al. |
| 10,037,315 B2 | 7/2018 | Singh et al. |
| 10,038,971 B2 | 7/2018 | Childress et al. |
| 10,042,868 B2 | 8/2018 | Kucera |
| 10,042,915 B2 | 8/2018 | Hanis et al. |
| 10,044,660 B2 | 8/2018 | Vasudev et al. |
| 10,044,727 B2 | 8/2018 | Bender et al. |
| 10,045,096 B2 | 8/2018 | Briggs et al. |
| 10,049,130 B2 | 8/2018 | Brooks et al. |
| 10,049,324 B2 | 8/2018 | Angell et al. |
| 10,056,392 B2 | 8/2018 | Berstis et al. |
| 10,061,586 B2 | 8/2018 | Gschwind et al. |
| 10,062,100 B2 | 8/2018 | Alvarez et al. |
| 10,068,218 B2 | 9/2018 | Abraham et al. |
| 10,073,717 B2 | 9/2018 | Dawson et al. |
| 10,083,024 B2 | 9/2018 | Gopalakrishnan |
| 10,083,107 B2 | 9/2018 | Lentz et al. |
| 10,091,355 B2 | 10/2018 | Flores et al. |
| 10,096,383 B2 | 10/2018 | Buck et al. |
| 10,101,883 B2 | 10/2018 | Casalaina et al. |
| 10,102,030 B2 | 10/2018 | Schneider et al. |
| 10,108,496 B2 | 10/2018 | Hoobler, III et al. |
| 10,114,854 B2 | 10/2018 | Batra et al. |
| 10,121,128 B2 | 11/2018 | Hao et al. |
| 10,122,603 B2 | 11/2018 | Bodziony et al. |
| 10,127,793 B2 | 11/2018 | Abraham et al. |
| 10,135,777 B2 | 11/2018 | Flores et al. |
| 10,135,964 B2 | 11/2018 | Nuescheler et al. |
| 10,135,979 B2 | 11/2018 | Zimmerman et al. |
| 10,140,987 B2 | 11/2018 | Erickson et al. |
| 10,146,592 B2 | 12/2018 | Bishop et al. |
| 10,146,597 B2 | 12/2018 | Pack, III et al. |
| 10,156,922 B2 | 12/2018 | Cohen et al. |
| 10,158,537 B2 | 12/2018 | Dunne et al. |
| 10,158,638 B2 | 12/2018 | Micucci et al. |
| 10,158,758 B2 | 12/2018 | Zimmerman |
| 10,163,098 B2 | 12/2018 | Kaminsky et al. |
| 10,163,128 B2 | 12/2018 | Deshpande et al. |
| 10,168,961 B2 | 1/2019 | Bradbury et al. |
| 10,169,201 B2 | 1/2019 | Cook et al. |
| 10,169,443 B2 | 1/2019 | Beisiegel et al. |
| 10,171,406 B2 | 1/2019 | Farrer et al. |
| 10,185,588 B2 | 1/2019 | Greiner et al. |
| 10,185,649 B2 | 1/2019 | Bassin et al. |
| 10,191,835 B2 | 1/2019 | Gritter et al. |
| 10,218,690 B2 | 2/2019 | Helsen et al. |
| 10,223,154 B2 | 3/2019 | Busaba et al. |
| 10,223,214 B2 | 3/2019 | Greiner et al. |
| 10,235,656 B2 | 3/2019 | De Armas et al. |
| 10,237,238 B2 | 3/2019 | Floyd, III et al. |
| 10,241,809 B2 | 3/2019 | Gopalakrishnan et al. |
| 10,242,236 B2 | 3/2019 | Herger et al. |
| 10,242,237 B2 | 3/2019 | Herger et al. |
| 10,242,267 B2 | 3/2019 | Fan et al. |
| 10,242,387 B2 | 3/2019 | Balasubramanian et al. |
| 10,244,057 B2 | 3/2019 | Fransen |
| 10,248,297 B2 | 4/2019 | Beechuk et al. |
| 10,255,324 B2 | 4/2019 | Agrawal et al. |
| 10,255,568 B2 | 4/2019 | Sutton |
| 10,262,002 B2 | 4/2019 | Brodt et al. |
| 10,268,224 B2 | 4/2019 | Bhageria et al. |
| 10,268,561 B2 | 4/2019 | Bell et al. |
| 10,269,033 B2 | 4/2019 | Znerold et al. |
| 10,270,881 B2 | 4/2019 | George et al. |
| 10,275,451 B2 | 4/2019 | Bhowmick et al. |
| 10,275,619 B2 | 4/2019 | Klinger et al. |
| 10,289,395 B2 | 5/2019 | D'Souza |
| 10,295,704 B2 | 5/2019 | Haas et al. |
| 10,295,968 B2 | 5/2019 | Martinez et al. |
| 10,296,830 B2 | 5/2019 | Cai et al. |
| 10,296,962 B2 | 5/2019 | Abraham et al. |
| 10,304,079 B2 | 5/2019 | Znerold et al. |
| 10,304,144 B2 | 5/2019 | Chandran et al. |
| 10,306,127 B2 | 5/2019 | Choo et al. |
| 10,310,918 B2 | 6/2019 | Furuichi et al. |
| 10,311,033 B2 | 6/2019 | Lyle |
| 10,311,467 B2 | 6/2019 | Ghavamzadeh et al. |
| 10,321,265 B2 | 6/2019 | Gerken, III et al. |
| 10,324,773 B2 | 6/2019 | Wing et al. |
| 10,324,778 B2 | 6/2019 | Bearden et al. |
| 10,324,922 B2 | 6/2019 | Kallan |
| 10,331,293 B2 | 6/2019 | Bastide et al. |
| 10,334,067 B2 | 6/2019 | Harpaz et al. |
| 10,334,103 B2 | 6/2019 | Abrahams et al. |
| 10,334,398 B2 | 6/2019 | Deluca et al. |
| 10,338,812 B2 | 7/2019 | Adderly et al. |
| 10,339,933 B2 | 7/2019 | Bostick et al. |
| 10,346,219 B2 | 7/2019 | Nagpal et al. |
| 10,348,487 B2 | 7/2019 | Bisti et al. |
| 10,348,663 B2 | 7/2019 | Barajas Gonzalez et al. |
| 10,353,738 B2 | 7/2019 | Bogdany et al. |
| 10,353,759 B2 | 7/2019 | Belmar et al. |
| 10,360,188 B2 | 7/2019 | Hanson et al. |
| 10,360,412 B2 | 7/2019 | Herger et al. |
| 10,360,425 B2 | 7/2019 | Burkhart et al. |
| 10,360,579 B2 | 7/2019 | Znerold et al. |
| 10,361,924 B2 | 7/2019 | Baughman et al. |
| 10,579,753 B2 | 3/2020 | Gould et al. |

(56) References Cited

U.S. PATENT DOCUMENTS

| | | | |
|---|---|---|---|
| 2005/0021745 A1 | 1/2005 | Bookman et al. | |
| 2007/0011668 A1 | 1/2007 | Wholey et al. | |
| 2012/0054095 A1* | 3/2012 | Lesandro | G06Q 20/10 |
| | | | 705/39 |
| 2017/0177446 A1 | 6/2017 | MacLean et al. | |
| 2018/0239615 A1 | 8/2018 | Ravid et al. | |

FOREIGN PATENT DOCUMENTS

| | | |
|---|---|---|
| CA | 1056503 | 6/1979 |
| CA | 1059630 | 7/1979 |
| CA | 1104256 | 6/1981 |
| CA | 2040644 | 8/1995 |
| CA | 2637046 | 10/2015 |
| CA | 2797451 | 1/2018 |
| EP | 0003756 | 9/1981 |
| EP | 0002389 | 7/1982 |
| EP | 0002578 | 9/1982 |
| EP | 0348330 | 8/1995 |
| EP | 0428006 | 9/1996 |
| EP | 0494575 | 2/1998 |
| EP | 0484070 | 4/1999 |
| EP | 0457112 | 3/2000 |
| EP | 0805394 | 12/2002 |
| EP | 0831398 | 2/2003 |
| EP | 1131712 | 12/2003 |
| EP | 1389395 | 7/2007 |
| EP | 1186999 | 9/2007 |
| EP | 1402375 | 9/2010 |
| EP | 1491026 | 9/2011 |
| EP | 2834739 | 8/2018 |
| EP | 2862080 | 10/2018 |
| EP | 2862081 | 10/2018 |
| EP | 2862071 | 2/2019 |
| EP | 2862057 | 3/2019 |
| EP | 2862092 | 3/2019 |
| EP | 2862070 | 4/2019 |
| GB | 1591778 | 6/1981 |
| GB | 2366051 | 1/2005 |
| GB | 2484881 | 10/2016 |

OTHER PUBLICATIONS

TIBCO, TIBCO Activematrix Businessworks, Attributes & Capabilities, 2011, 2 pages.

'tibco.com' [online]. "How to have Continued Success with Continuous Integration," Feb. 1, 2015 [retrieved on Jul. 13, 2016]. Retrieved from the Internet: URL <https://www.tibco.com/blog/2015/01/21/how-to-have-continued-succes s-with-continuous-integration/>. 4 pages.

en.wikipedia.org [online]. "Lambda architecture," Oct. 4, 2014 [retrieved on Jun. 29, 2016]. Retrieved from the internet: URL <en.wikipedia.org/wiki/Lambda_architecture>. 4 pages.

International Search Report and Written Opinion issued in PCT/US2018/019272, dated Jun. 1, 2018.

'Adobe.com' [online], "Real-time customer interaction management", 2019 [retrieved on Oct. 1, 2019]. Retrieved from the Internet: URL <https://www.adobe.com/sea/experience-cloud/use-cases/real-time-interaction-management.html>. 9 pages.

'Salesforce.com' [online]. "Meet Interaction Studio" 2019 [retrieved on Oct. 1, 2019]. Retrieved from Internet: URL <https://www.salesforce.com/products/marketing-cloud/customer-interaction/>, 10 pages.

'tibco.com' [online]. "How to have Continued Success with Continuous Integration," Feb. 1, 2015 [retrieved on Jul. 13, 2016]. <https://www.tibco.com/blog/2015/01/21/how-to-have-continued-success-with-continuous-integration/>. 4 pages.

International Preliminary Report on Patentability in PCT Appln. No. PCT/US2018/019272, dated Aug. 27, 2019, 7 pages.

SAS.com [online]. "SAS 360 Plan" [retrieved on Oct. 1, 2019]. Retrieved from Internet: URL <https://www.sas.com/content/dam/SAS/en_us/doc/factsheet/sas-360-plan-109686.pdf>, 2019, 4 pages.

SAS.com [online]. "SAS Customer Intelligence 360" [retrieved on Oct. 1, 2019]. Retrieved from Internet: URL <https://www.sas.com/en_us/software/customer-intelligence-360.html>, 7 pages.

StrongView, UNICA CRM Email Marketing Integration, 2013, 2 pages.

Tableau, Data Aggregation in Tableau, 23 pages.

TIBCO, "Streaming analytics for accelerating action", 2019, 11 pages.

TIBCO, TIBCO StreamBlase, 3 pages.

\* cited by examiner

DYNAMIC EXECUTION OF PARAMETERIZED APPLICATIONS FOR THE PROCESSING OF KEYED NETWORK DATA STREAMS

TECHNICAL FIELD

The present application relates to network-ready computer-implemented methods, computer systems and computer-readable mediums for the collection, validation, formatting and further processing of (near) real-time network data streams in parameterized applications to execute certain actions, e.g. actions executed across a network such as a telecommunication network.

CLAIM OF PRIORITY

This application claims priority under 35 U.S.C. § 119(e) to provisional U.S. Patent Applications 62/462,498, filed on Feb. 23, 2017, the entire contents of which are hereby incorporated by reference.

BACKGROUND

In a common approach to processing of data records received from disparate sources, multiple disparate systems collect the data records, with each system being configured to process data of a particular type. Once the data of a particular type is processed by a system configured to process that type of data, the system then passes the data downstream to another application for further processing. In conventional systems, this downstream application then performs additional formatting (and/or reformatting) on the received data record to convert it to an acceptable format for that application. As a result, this conventional approach results in latency and delayed interaction between the systems that receive and collect the data and the downstream applications that process the data. This conventional approach also results in increased latency due to a single data record having to be re-formatted multiple times. For example, the data record is formatted (and/or reformatted) by each system that receives it and processes it, resulting in an accumulation of increased latency. This non-integrated system framework (of disparate systems that each perform their own data formatting and processing) also results in latency in the processing of the data, as the data is not able to be processed and analyzed in real-time or at least near real-time. Thus, the operations or actions that depend on the processed data are also increasingly delayed, or are eventually not executed at all, if the current situation has already changed again, making the execution obsolete.

SUMMARY

Contrary to these common approaches, the methods, systems and computer-readable mediums described herein perform data integration and preparation for data record management in a simplified and accelerated manner. The described capabilities allow for collection, validation, formatting and further processing of both batch and real-time data streams (e.g., in real-time or in near real-time as the data is received, e.g., without storing the collected data to disk). Additionally, by having a single execution system that performs the operations of collection, detection and action, the execution system eliminates the complexities involved with integrating data into one system for data collection and then re-integrating that collected data into another system for performing detection and action. The capabilities described herein are able to provide an immediate response to data records or items (e.g., as they are received), which also provides for immediate visibility of application results. As the desired final actions usually depend on a fast processing of the data, the final actions, such as actions in logistics or telecommunications, greatly benefit from this faster processing of large amounts of data from various different sources yielding data of various different formats. The system described herein can processes over two billion data records or items per day for fifty million users. Contrary to common approaches, the system described herein provides for increased bandwidth and decreased memory consumption.

A method for processing keyed data items that are each associated with a value of a key, the keyed data items being from a plurality of distinct data streams, the processing including collecting the keyed data items, determining, based on contents of at least one of the keyed data items, satisfaction of one or more specified conditions for execution of one or more actions and causing execution of at least one of the one or more actions responsive to the determining, includes: accessing first, second and third parameterized applications that include respective first, second and third specifications; wherein the first specification specifies one or more parameters defining one or more properties of the first parameterized application and one or more respective values for those one or more parameters; wherein the second specification specifies one or more parameters defining one or more properties of the second parameterized application and one or more respective values for those one or more parameters, wherein the second specification includes rules and respective conditions for the rules; wherein the third specification specifies one or more parameters defining one or more properties of the third parameterized application and one or more respective values for those one or more parameters; maintaining states of the second specification for respective values of the key, with a state for a particular value of the key specifying one or more portions of the second specification to be executed by the second parameterized application in that state; executing the first parameterized application with the one or more values for the one or more parameters specified by the first specification to perform processing including: collecting data items from a one or more data sources and one or more data streams, a plurality of data sources or a plurality of data streams, wherein a format of a first data item collected differs from a format of a second data item collected, and wherein a data item is associated with a value of a key; transforming the first and second data items in accordance with the first specification of the first parameterized application to obtain transformed data items; and populating a queue with the transformed data items; executing the second parameterized application with the one or more values for the one or more parameters specified by the second specification to process the transformed data items in the queue, with processing of the transformed data items including: for one or more of the transformed data items associated with a particular value of the key, identifying a current state, with respect to the particular value of the key, of the second specification; identifying one or more rules in a portion of the second specification to be executed in the current state; executing the one or more rules identified; determining that at least one of the one or more transformed data items satisfies one or more conditions of at least one of the one or more rules executed in the current state; responsive to the determining, generating a data structure specifying execution of one or more actions; causing the second specification, with respect to the particular value of the key, to transition from its current state to a subsequent state; and transmitting, to the third parameterized application, the generated data structure; and executing the third parameterized application with the one or more values for the one or more parameters specified by the third specification of to perform operations including: based on at least one of the one or more actions specified in the data structure, sending one or more instructions to cause execution of the at least one of the one or more actions. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. In a particular aspect, the foregoing method, computer program and/or system include one or more of the following features and/or actions.

The actions further include during operation of one or more user interfaces, displaying one or more user interface elements for specifying one or more values of the one or more parameters for each of the first, second and third parameterized applications. Executing the first parameterized application includes executing the first parameterized application with one or more values specified by the one or more user interface elements for the one or more parameters of the first parameterized application. Executing the second parameterized application includes executing the second parameterized application with one or more values specified by the one or more user interface elements for the one or more parameters of the second parameterized application, wherein the one or more specified values are used as input by the rules in determining whether the one or more conditions are satisfied. Executing the third parameterized application includes executing the third parameterized application with one or more values specified by the one or more user interface elements for the one or more parameters of the third parameterized application. A data item includes a data record and wherein the transforming includes reformatting the data record in accordance with a format specified by the first specification of the first parameterized application.

The actions further include based on execution of the second parameterized application, enriching the data record with data from a profile of a user associated with the data record, with the enriching being in accordance with instructions specified by the second specification of the second parameterized application to retrieve, from memory, profile data for the user and to populate one or more fields of the data record with the retrieved profile data. A parameterized application includes an application for data processing, with the application including one or more parameters that are configurable with one or more values. The actions further include including executing a feedback loop (e.g., a synchronous or an asynchronous feedback loop) to one or more third party systems for requesting confirmation of execution of the one or more actions. The actions further include generating, based on execution of the second parameterized application, one or more key performance indicators (KPIs) for the particular value of the key, with a KPI specifying one or more values of data items associated with the particular value of the key. For example, a KPI may include performance data, e.g., that specifies the performance of one or more portions or logic branches of a campaign or a set of pre-defined logic.

The actions further include receiving data for the particular value of the key, with the received data being indicative of feedback with regard to at least one of the one or more actions; and updating a KPI for the particular value of the key with the feedback data. The one or more actions include one or more of sending a text message to an external device, sending an email to an external system, opening a ticket for a work order in a case management system, cutting a mobile telephone connection, providing a web service to a targeted device, transmitting a data packet of the one or more transformed data items with a notification, and executing a data processing application that is hosted on one or more external computers on the one or more transformed data items. The one or more instructions are sent via a network connection to cause execution of at least one of the one or more actions on an external device, the method further including: receiving a feedback message indicating whether the at least one of the one or more actions (i) were successfully completed, or (ii) failed. The at least one of the one or more actions are considered failed if a portion of the at least one of the one or more actions was not completed, wherein the feedback message indicates which portion of the at least one of the one or more failed actions was not completed. The feedback message indicates result data of the successfully completed and/or failed at least one of the one or more actions.

The actions further include changing the one or more specified values for one or more parameters of the first, second, and/or third parameterized applications based on the result data; and re-executing the first, second and/or third parameterized applications with the changed one or more specified values. The one or more instructions are sent via a network connection to cause execution of the one or more actions on an external device, the method further including: receiving, from the external device, a feedback message including result data of the executed at least one of the one or more actions; comparing the result data with predetermined data associated with a successful completion of the execution of the at least one of the one or more actions; and determining that the execution of the at least one of the one or more actions was successfully completed, or that the execution of the at least one of the one or more actions failed, based on the comparison.

The actions further include changing the one or more specified values for one or more parameters of the first, second, and/or third parameterized applications based on the result data; and re-executing the first, second and/or third parameterized applications with the changed one or more specified values. The execution of the at least one of the one or more actions is determined as successfully completed if the result data deviates from the predetermined data less than a predetermined amount, and wherein the execution of the at least one of the one or more actions is determined as failed if the result data deviates from the predetermined data at least by a predetermined amount.

The actions further include during operation of one or more user interfaces, displaying one or more user interface elements for specifying the predetermined data and the predetermined amount. The actions further include during operation of one or more user interfaces, outputting, via one or more displayed user interface elements, whether the at least one of the one or more actions (i) were successfully completed, or (ii) failed. The method of claim 15, further including: during operation of one or more user interfaces, outputting, via one or more displayed user interface elements, the result data. The actions further include receiving, via one or more displayed user interface elements, user-specified changes to one or more specified values for one or more parameters of the first, second, and/or third parameterized applications based on the result data; and re-executing the first, second and/or third parameterized applications with the changed one or more specified values. The sending of the one or more instructions to cause execution of the at least one of the one or more actions is performed automatically by the third parameterized application by using the output specifying execution of the one or more actions as input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
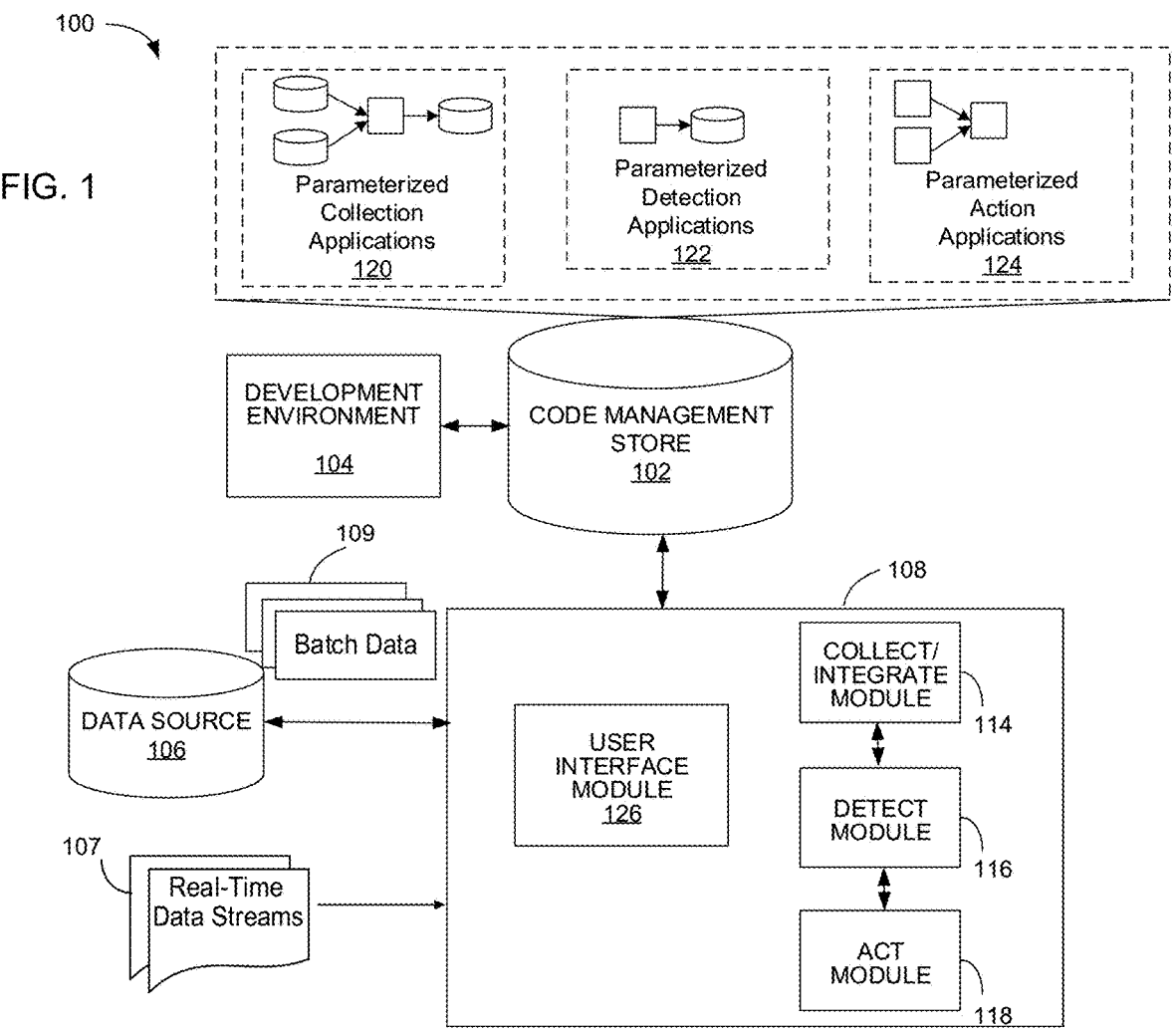
FIG. 1 is a diagram of a system that implements parameterized logic for processing keyed data.

Referring to FIG. 1, a system 100 for collecting data and data records from various sources, e.g., from different servers located at different locations and interconnected via a network, and for integrating that data with modules for performing data detection and executing actions is shown. Generally, a data item includes a data record, data indicative of a data record or an event (e.g., a record that includes data indicative of an occurrence of an action (e.g., the making of a voice call or a length of a voice call) or data indicative of an occurrence of an action). While techniques described herein are described primarily with regard to data records, the techniques may also be used to process events. System 100 includes code management store 102, development environment 104, data source 106 and execution system (or called runtime environment) 108. Execution system 108 includes a system for implementing a collect-detect-act (CDA) environment for configuring and executing various applications and programs for performing the above-described collection, detection and action. These various applications and programs include, e.g., a reusable collection of graphs, plans, applications and so forth (e.g., for speeding up development and simplifying maintenance of applications and programs). Generally, a graph (e.g., a dataflow graph) includes vertices or nodes (components or datasets) connected by directed links (representing flows of work elements) between the vertices, e.g., as described in U.S. Publication No. 2007/0011668, entitled "Managing Parameters for Graph-Based Applications," incorporated herein by reference. Generally, a plan includes an application that represents a process flow in which processing steps, called tasks, are connected by flows indicating execution order (e.g., dependencies).

Each method describes herein may be executed by system 100, the system including: the development environment 104 coupled to the code management store 102. The development environment 104 is configured to build any one of the applications described herein that is associated with a data flow graph that implements a graph-based computation performed on data flowing from one or more input data sets through a graph of processing graph components to one or more output data sets. The data flow graph is specified by data structures in the code management store 102. The dataflow graph has a plurality of vertices or nodes being specified by the data structures and representing the graph components connected by one or more links. The links are specified by the data structures and represent data flows between the graph components. Additionally, a runtime environment 108 is coupled to the store 102 and is hosted on one or more computers. The runtime environment 108 also reads the stored data structures specifying the data flow graph and to allocate and configure computing resources, such as processes, for performing the computation of the graph components that are assigned to the data flow graph by runtime environment 108. The runtime environment 108 also includes an execution module to schedule and control execution of the assigned processes such that the operations according to the method are executed.

Execution system 108 includes collect/integrate module 114 (hereinafter collect module 114) for collecting data records (and other data), transforming it and distributing that transformed data to downstream applications, including, e.g., detect module 116 and act module 118. In this example, act module 118 includes an interface to third party system and/or to an external system. In particular, collect module 114 gathers data from various sources, such as, e.g., data source 106 or from different servers located at different locations and interconnected via a network, in either batch or real time, and real-time data streams 107, e.g., real-time data coming from different servers located at different locations and interconnected via a network. Storage devices providing data source 106 may be local to system 100, for example, being stored on a storage medium connected to a computer running execution system 108 (e.g., a hard drive), or may be remote to execution system 108, for example, being hosted on a remote system in communication with execution system 108 over a local or wide area data network.

Collect module 114 is configured to parse, validate and enrich (e.g., with more slowly batch data 109 received from data source 106 and/or data in real-time data streams 107. For purposes of convenience, the terms "real-time" and "near real-time" may be collectively referred to herein as "real-time" or as "near real-time," without limitation. Collect module 114 stores enriched data records in memory and also writes the enriched data records to disk for archiving and to ensure recovery of the record. Because collect module 114 is able to handle any source, collect module 114 enables fast and independent integration (e.g., additional applications are needed for collect module 114 to successfully perform integration) of data into the CDA environment, while handling the complexities of arbitrarily large data volumes, low latency, and multiple data formats.

In an example, records are pushed to system 108 from a remote system. In this example, many thousands of records arrive per day. In this example, collect module 114 detects records pushed into local directories of system 108. Collect module 114 also performs record transfer by queuing up records in queue and copying data to an archive (not shown). Collect module 114 also deletes original records after parsing. In this example, the archive stores a copy of the input data, unchanged, and optionally compressed. The archive stores the data for a specified number of days. In this example, collect module 114 publishes or transmits the collected data to a data queue, with one data queue for each data feed. Collect module 114 also parses the records by reading the records, deleting duplicates, enriching the records (e.g., by adding profile data to a record), partitioning the records by key (e.g., for further enrichment) and writing the records to the queue. In this example, collect module 114 removes duplicates by storing an ICFF (Indexed Compressed Flat File) archive that keeps a copy of a hash for each record for a specified number of days, to be used for removing duplicates. In this example, collect module 114 also performs maintenance by executing a scheduled (e.g., daily) graph that cleans (e.g., deletes) up old files from the archive and the ICFF archive.

In this example, the queue (to which the records are published) includes a single centralized queue partitioned by key, with a standardized format that includes a data record type (indicating the source data feed name), standard fields (such as the key), and feed-specific fields. The queue includes a parallel queue that may be parallel within one server or across servers and/or that may be processed in parallel across one or more systems.

In this example, collect module 114 checkpoints the data feed after a specified number of received records or files (e.g., a collection of records) or after a specified number of seconds. Collect module 114 performs this checkpointing through execution of a graph with configurable parameters that push data through system 108 with near real-time latency as the input files arrive. Execution system 108 also includes detect module 116 for generating logic for programs that detect predefined occurrences. Following collection and integration of the collected data by collect module 114, execution system 108 executes detect module 116 on the collected and integrated data. In an example, collect module 114 sends one or more (e.g., distinct) streams of collected data (e.g., that has been validated and formatted/re-formatted) to detect module 116 for further processing and/or for execution of one or more predefined rules against the stream of collected data, e.g., in real-time as the data is received. As described in further detail below, detect module 116 is uniquely flexible, allowing users to generate both simple and sophisticated detection schemas (e.g., campaigns and/or a series of rules with various conditions to be satisfied prior to rule execution), based on multiple and dynamic data record types, aggregation types, state definitions and transitions, complex functions, and timers. Detect module 116 also enables the detection of "synthetic" data (e.g., data records). Generally, synthetic data includes data indicative of an absence of a condition or an occurrence, e.g., detecting that a user hasn't accessed a portal in a specified amount of time. Upon detection of a data record, detect module 116 publishes instructions or messages to a queue, the contents of which are received and processed by act module 118.

Act module 118 executes actions that have been triggered, such as sending a text message or email, opening a ticket for work orders in a case management system, cutting a service immediately, providing a web service to the targeted system or device, transmitting packetized data with one or more notifications and so forth. In another example, act module 118 generates instructions and/or contents of messages and sends these instructions (and/or contents) to third party systems, which in turn execute the actions based on the instructions, e.g., transmit the text messages, provides the web service and so forth. In an example, act module 118 is configured to generate customized content for various recipients. In this example, act module 118 is configured with rules or instructions that specify which customized content is sent or transmitted to which recipients.

In conventional models for data integration and data record detection, one system performs data collection and collects the data in batch and warehouses the data in a data warehouse. Then to perform data record detection, another, different system retrieves and queries the batch data from the data warehouse and performs data record detection on that warehoused, data. This conventional model has numerous limitations, including, e.g., that it cannot support real-time data collection. Additionally, to perform different types of data record detection (e.g., for different segments), different and inconsistent applications and/or engines are built. Contrary to these conventional models, the CDA environment described herein performs data integration and preparation for data record management without the need for additional technologies, e.g., without the need for a separate system for data integration and then another separate system for data record management. This capability simplifies and accelerates end-to-end integration. Additionally, the CDA environment described herein is configured to process both batch and real-time data streams (e.g., in real-time or in near real-time as the data is received). For example, the CDA environment is able to handle real-time data by collect module 114 processing, validating and/or formatting the data in near real time (e.g., as the data is received by execution system 108), e.g., without storing the collected data to disk. Collect module 114 is configured to validate and process streams of data, e.g., as the data is received, and then publish the processed data to a queue for further processing by detect module 116—all without storing the data in a data warehouse for subsequent retrieval, which introduces latency. Additionally, by having a single system that performs the operations of collection, detection and action, execution system 108 eliminates the complexities involved with integrating data into one system for data collection and then re-integrating that collected data into another system for performing detection and action. As the desired final operations or actions usually depend on the processed data and would also be increasingly delayed (or would even eventually not be executed at all if the current situation has already changed again making the execution obsolete), the final operations or actions, such as actions in logistics or telecommunications, greatly benefit from this faster processing of a large amount of data of various different formats.

In this example, code management store 102 is configured for communication with execution system 108 and stores parameterized collection applications 120, parameterized detection applications 122, and parameterized action applications 124. Generally, a parameterized application includes an electronic template or record that is preconfigured to perform specified functionality and operations with regard to one or more parameters, the values of which are received by the parameterized application from one or more other applications and/or from user input. Once values of parameters are designated or specified, the parameterized application (e.g., the parameterized template) represents a parameterized template specification (hereinafter "specification"), e.g., because the parameterized application specifies values for states, values for actions, values for transitions among states, and so forth. Generally, a specification represents executable logic and specifies values for parameters of the executable logic and various states of the executable logic, based on a state reached from executing the executable logic on prior data items. In a variation, the system includes action applications that are not parameterized.

In an example, a parameterized application is referred to as parameterized logic, e.g., when an electronic application or record is preconfigured with logical expressions (or other logic) to perform specified functionality and operations with regard to one or more parameters.

In an example, a parameterized application includes a generic dataflow graph (or other generic data processing program or application), with various parameters, the values of which are specified as input into the parameterized application. In this example, a parameterized collection application includes a parameterized application for performing data collection and integration. A parameterized detection application includes a parameterized application for performing data detection. A parameterized action application includes a parameterized application for performing actions.

In an example, each of modules 114, 116, 118 is implemented by execution of instances of parameterized applications 120, 122, 124, respectively. In this example, an instance of a parameterized application includes an execution of a parameterized application in which values of the parameters are specified. Execution of collect module 114 is based on one or more parameterized collection applications 120 that specify how data is collected, formatted, validated and integrated. By parameterizing the incoming data streams, a new program doesn't need to be written to process each incoming data stream. Rather, execution system 108 maintains a program or application for processing incoming data. That program or application includes various parameters whose values can be set to configure the program or application to process a particular incoming data stream. In some examples, the program or application is a generic dataflow graph, e.g., such as a parameterized application. Using user interface module 126, a user customizes the generic dataflow graph for a particular incoming data stream by specifying values for the parameters of the generic dataflow graph. These specified values specify how collect module 114 processes that particular data stream. Rather than conventional techniques of having dedicated programs to process each incoming data stream, the parametrization of the generic dataflow graph (or application) enables reuse, which reduces memory requirements of execution system 108 and also reduces dataflow graph errors in data collection and integration, as a single, generic (and error-proof) is used and reused.

In this example, the parameterized collection application promotes reuse of a specified collection application, since the parameters of the parameterized collection application provide for easy modification of values in the parameterized collection application, e.g., rather than having a (non-parameterized) collection application for which the code itself has to be changed every time there is an associated change in values for the collection application. In this example, execution system 108 compiles parameterized collection applications 120 into executable code. Collect module 114 is implemented by the execution of this executable code.

Execution of detect module 116 is based on one or more parameterized detection applications 122 that specify one or more predefined rules for detecting specified occurrences or lack thereof. In this example, parameterized detection applications 122 include one or more parameters for specifying one or more values (e.g., values that are used by the rules in performing the detection). In this example, the parameterized detection application promotes reuse of a specified detection application, since the parameters of the parameterized detection application provide for easy modification of values in the parameterized detection application, e.g., rather than having a (non-parameterized) detection application for which the code itself has to be changed every time there is an associated change in values for the detection application. Additionally, parameterized applications in general, and parameterized detection applications 122 in particular, provide for implementation of flexible and on the-the-fly detection across various segments (e.g., of users) and across various types of data records and data records. For example, one of parameterized detection applications 122 can be configured to detect an occurrence of a specified type of data record (e.g., by setting of values of parameters in that parameterized detection application). That parameterized detection application can then be reused to detect an occurrence of another type of data record (e.g., by specifying other values for the parameters of the parameterized detection application). This reuse of parameterized applications reduces errors in execution of detect module 116, e.g., since error free applications can be reused. These parameterized applications also promote flexibility in data record detection. In particular, deployment of convention detection modules (e.g., detection engines) involve extensive modeling and configuration of various instructions and relationships (e.g., between detection of various data record types and rules that specify various actions to take upon successful detection) in advance of performing detection. In contrast, detect module 116 can be launched without such tasks and instead configured on-the-fly, e.g., by users specifying (e.g., via user interface module 126) values for parameters of parameterized detection applications 122. In this example, execution system 108 compiles parameterized detection applications 122 into executable code. Detect module 116 is implemented by the execution of this executable code.

Execution of act module 118 is based on one or more parameterized action applications 124 that specify one or more predefined actions to be performed or instructions to be transmitted or execution, e.g., based on instructions or triggers received from detect module 116. In this example, parameterized action applications 124 include one or more parameters for specifying one or more values (e.g., values that are used by the rules in performing the action). In this example, the parameterized action application promotes reuse of a specified action application, since the parameters of the parameterized action application provide for easy modification of values in the parameterized action application, e.g., rather than having a (non-parameterized) action application for which the code itself has to be changed every time there is an associated change in values for the action application. Additionally, parameterized action applications 124 provide for implementation of flexible and on the-the-fly execution of actions across various segments (e.g., of users) and across various types of data records and data records. For example, one of parameterized action applications 124 can be configured to perform a specified action (e.g., of sending a text message that alerts a user) by setting of values of parameters in that parameterized action application. That parameterized action application can then be reused to transmit instructions to a third party to perform an action, e.g., to send a particular message. The parameterized action application is reused by specifying or modifying values for the parameters of the parameterized action application. In this example, execution system 108 compiles parameterized action applications 124 into executable code. Act module 118 is implemented by the execution of this executable code.

The collect module 114, detect module 116, act module 116 represent an improvement of the existing technology (e.g., of having separate systems for performing collection, detection and action) by achieving benefits over conventional systems, such as increased flexibility, faster processing times of streams of real-time data, and smaller memory requirements. As previously described, execution system 108 includes an integrated system that includes collect module 114, detect module 116 and act module 118. By having these modules integrated into a single system, execution system 108 is able to process data in real-time (or in near-real-time), because collect module 114 processes the received data streams in memory and then publishes the validated data to a queue for further processing, e.g., rather than committing the received data to a data store for subsequent retrieval. Additionally, the integration of collect module 114, detect module 116 and act module 118 into a system results in smaller memory requirements, as a system does not need to store multiple, different applications to perform collection, detection and action for each data stream from which records are received. Rather, the respective parameterized applications can be reused, e.g., as various values for the various parameters are specified.

Execution system 108 also changes the configuration of parameterized applications and also that sets the values of various parameters in the parameterized applications, e.g., based on user input specifying values for the parameters or based on an executed action resulting in such a change or in such a setting. User interface module 126 displays configuration information to a user and receives configuration actions from the user, e.g., data specifying values of parameters and/or data specifying actions for configuration of the parameterized applications. In this example, each of parameterized collection applications 120, parameterized detection applications 122 and parameterized action applications 124 are stored in code management store 102. Code management store 102 is also accessible to development environment 104 in which a developer is able to develop user interfaces, stored in code management store 102, that are used by the user interface module 126 to display a user interface. Development environment 104 also enables a developer to develop parameterized applications, including, e.g., parameterized collection applications 120, parameterized detection applications 122 and parameterized action applications 124. The executed actions resulting from the execution of the application or applications allows the developer to determine whether the application or applications operated properly for one or more given parameter values. That is, the application or applications may be tested before it is made usable by a user to prevent that the user from facing an incorrectly operating application or applications.

Figure 2A:
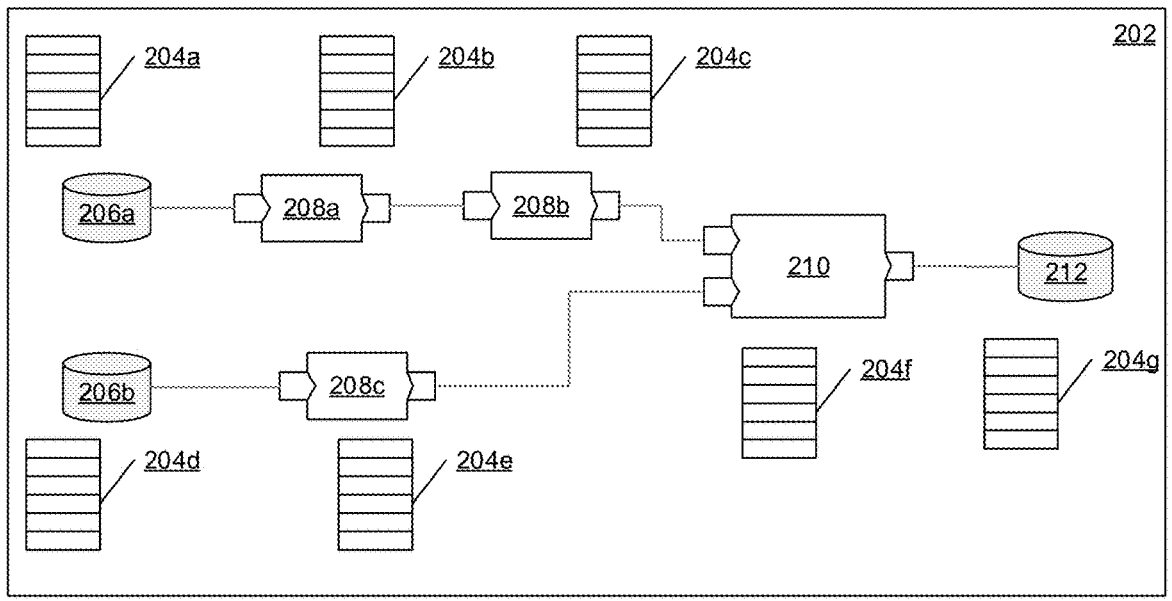
FIG. 2A is a diagram of an exemplary dataflow graph.

Referring to FIG. 2A, a dataflow graph 202 may include data sources 206a, 206b, components 208a-c, 210 and data sinks 212. In this example, dataflow graph 202 is an example of a parameterized application. As described in further detail, dataflow graph 202 includes various parameters, the values of which are specified by user input. For example, when dataflow graph 202 is a parameterized collection application, each of data sources 206a, 206b, components 208a-c, 210 and data sinks 212 specify how data is collected, processed and integrated (e.g., into execution system 108) in near real-time as data streams are received. In another example where dataflow graph 202 is a parameterized detection application, each of data sources 206a, 206b, components 208a-c, 210 and data sinks 212 specify various detection operations and functionality that are performed in detecting various data records. In yet another example where dataflow graph 202 is a parameterized action application, each of data sources 206a, 206b, components 208a-c, 210 and data sinks 212 specify various action operations and functionality that are performed in response to triggers and/or instructions received from a detect module.

In this example, each of the sources, components, and sinks may be associated with a set of parameters 204a-g. A user may use user interface module 126 (FIG. 1) to input or otherwise specify the values of these parameters. A parameter for one source, component, or sink may be used to evaluate a parameter for a different source, component, or sink. The sources 206a, 206b are connected to the input ports of components 208a, 208c. The output port of component 208a is connected to the input port of component 208b. The output port of component 210 is connected to data sink 212. The connections between the sources, components, and sinks define the data flow.

Some of the data sources, components, or sinks may have input parameters 204a-g which may define some of the behavior of the graph. For example, a parameter may define the location of the data source or sink on a physical disk. A parameter may also define the behavior of a component, for example, a parameter may define how a sorting component sorts the input. In another example, a parameter defines how a data record is formatted or validated. In some arrangements, the value of one parameter may depend upon the value of another parameter. For example, a source 206a may be stored in a file in a particular directory. The parameter set 204a may include a parameter called "DIRECTORY" and another called "FILENAME". In this case the FILENAME parameter would depend upon the DIRECTORY parameter. (e.g., DIRECTORY may be "/usr/local/" and FILENAME may be "/usr/local/input.dat"). Parameters may also depend upon the parameters for other components. For example, the physical location of a sink 212 may depend upon the physical location of the source 206a. In this example, the sink 212 includes a set of parameters 204g which includes a FILENAME parameter which depends upon the DIRECTORY parameter of the source 206a. (e.g., the FILENAME parameter in the set 204g may be "/usr/local/output.dat" where the value "/usr/local/" is obtained from the DIRECTORY parameter in the set 204a.)

Within the user interface on the client, the parameters of the parameter sets 204a-204g may be combined and reorganized into different groups for interacting with a user, which reflect business considerations rather than technical ones. The user interface for receiving values for the parameters based on user input can display different parameters according to relationships among the parameters in a flexible way that is not necessarily restricted by aspects of the development environment on the server.

Figure 2B:
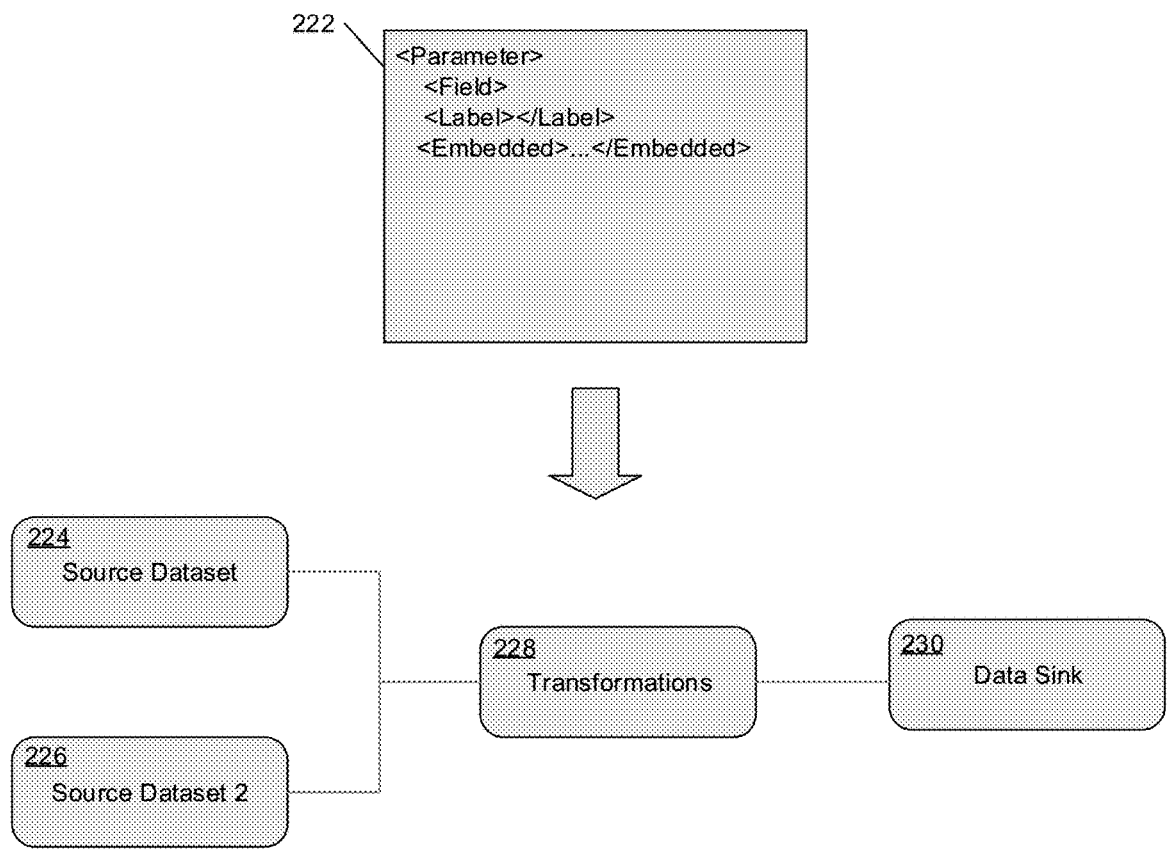
FIGS. 2B and 2C are diagrams of portions of an interface for customizing the dataflow graph.

Referring to FIG. 2B, a user interface can be presented in which icons are displayed with relationships that represent dependencies among the parameters. In this example, the parameters are divided into a first group of parameters, represented by a first source icon 224 representing parameters for a first source dataset, a second source icon 226 representing parameters for a second source dataset, a sink icon 230 representing parameters for a sink dataset, and a transformation icon 228 representing parameters for one or more components of the dataflow graph being configured, showing their relationship to the source datasets and the sink dataset. This grouping of parameters may be made based on a stored user interface specification 222, which defines how a user will interact with the parameters from the dataflow graph within the user interface on the client and how the user interface elements, such as the icons 224, 226, 228, 230, will be related to each other and arranged for presentation in the user interface. In some implementations, the user interface specification is an XML, document. The user interface specification may also identify the dataflow graph components and may identify particular components for which certain functions can be performed while the user is configuring the graph, such as viewing sample data, as described in more detail below.

In some cases, the user interface specification may include instructions for how parameters are to be displayed. For example, referring to FIGS. 2B and 2C, the user interface specification 222 may define a user interface 250 displayed to a user. Further, the user interface specification 222 may indicate that, in response to interacting with the source dataset icon 224, one parameter should be displayed in the user interface 250 as a text box 252 that the user may fill in, while another parameter should be displayed in the user interface 250 as a drop down list 254 with prepopulated values, still another parameter may be displayed in the user interface 250 as a radio button 256, etc. Thus, the user interface specification provides flexibility in how the parameters are to be presented to the user for customizing a dataflow graph in a way that can be tailored to a business and/or non-technical user.

In some cases, the user interface specification may constrain the order in which a business user populates the parameter values. Represented by the dotted lines, parameters associated with the sink 230 may not be visible to the user until the user meets some predefined condition. For example, the user may have to provide a particular parameter value or fill out a set of parameters before the data sink parameter set appears.

In some implementations, the user interface specification can also include variables which define characteristics of user interface elements (in contrast to parameters which define characteristics of the components of the dataflow graph). The variables can be used to control the order in which user interface elements are used by the business user, for example. A variable references at least one data value. In some examples, a variable references multiple data values, and each data value is defined as a property of the variable. Thus, a single variable can have multiple properties, each associated with data values.

The user interface 250 defined by the user interface specification can be presented in a way that the user interface elements (e.g., text box 252, drop down list 254, radio button 256) do not correspond directly to parameters used to customize a dataflow graph. Instead, some of the user interface elements can correspond to configuration options relevant to a user, for example, a business user and/or non-technical user who may not have knowledge of the parameters.

In these examples, the user interface 250 need not be associated with a particular component 224 of a dataflow graph. Further, the user interface 250 can be associated with multiple dataflow graphs and other data processing and data storage constructs.

For example, a user interface element can allow the user to change a configuration option having a business meaning, rather than a technical meaning. The configuration option could be an option for converting between types of currency used in a commercial transaction, or an option to update information associated with a particular category of product inventory, or another kind of option that does not correlate to the configuration of a single parameter. The user interface specification 222 can be defined in such a way that the business user/non-technical user can make changes to configuration options in terms that he/she understands, and changes to parameters are made through associations and dependencies defined in the user interface specification 222.

The user interface specification 222 can define how the configuration option corresponds to the configuration of the parameters of a dataflow graph as well as other data elements that can be configured through the user interface 250. For example, an interaction between a user and a user interface element may trigger a change to parameters in multiple dataflow graph components as well as changes to data stored in a database, a data file, a metadata repository, or another kind of data storage. The user interface specification 222 can define the relationship between the user interface element and data that changes in association with a change to the user interface element during the operation of the user interface 250.

The user interface specification 222 can also define the user interface elements based on data received from a database, a data file, a metadata repository, or another kind of data storage, or another kind of data source such as a web service. When the user interface 250 is displayed, the received data is used to determine the manner in which to display the user interface elements. In some implementations, during the operation of the user interface 250, data is received from an external source such as a database, a data file, a metadata repository, or another kind of data storage, or another kind of data source such as a web service, and the data received from an external source is defined in the user interface specification 222 to be associated with a parameter (e.g., the parameter is updated to include the data received from the external source).

The user interface could also display component output data associated with at least one flow of data represented by a link of the dataflow graph. For example, referring to FIG. 2C, data flows from one component 224 to another component 228. The flow of data between the components can be viewed in the user interface 250. In some examples, sample data (e.g., data retrieved for the purpose of testing, rather than for the purpose of processing or transformation) is provided to one component 224 to determine how the data is handled by the component 224.

Figure 2C:
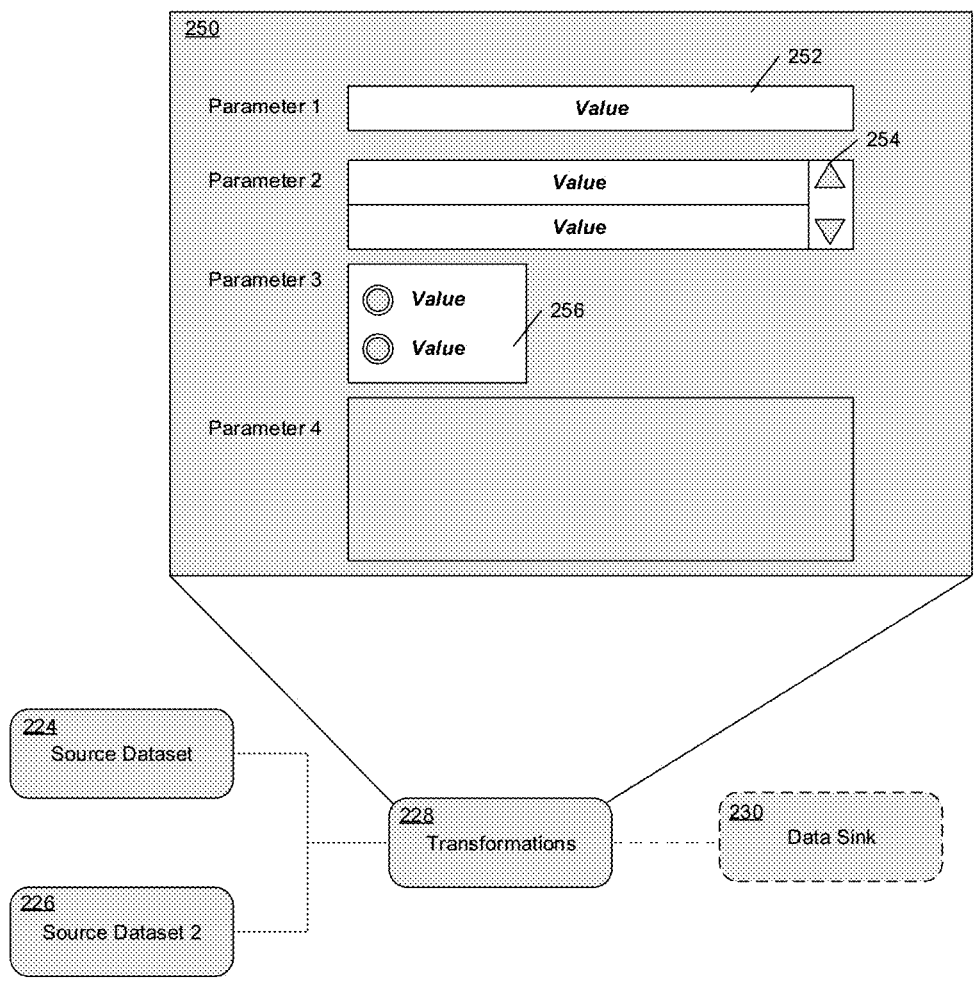

In a variation of FIG. 2C, user interface 250 (or multiple user interfaces) displays user interface elements for specifying values of parameters in each of parameterized collection applications 120 (FIG. 1), parameterized detection applications 122 (FIG. 1) and parameterized action applications 124 (FIG. 1). In this example, user interface 250 displays the user interface elements independent of specifying which user interface elements correspond to which parameterized application. Rather, the user interface elements are presented to enable the user to specify how to perform data collection an integration, e.g., on particular data streams, how to perform detection and how to perform actions.

Figure 3A:
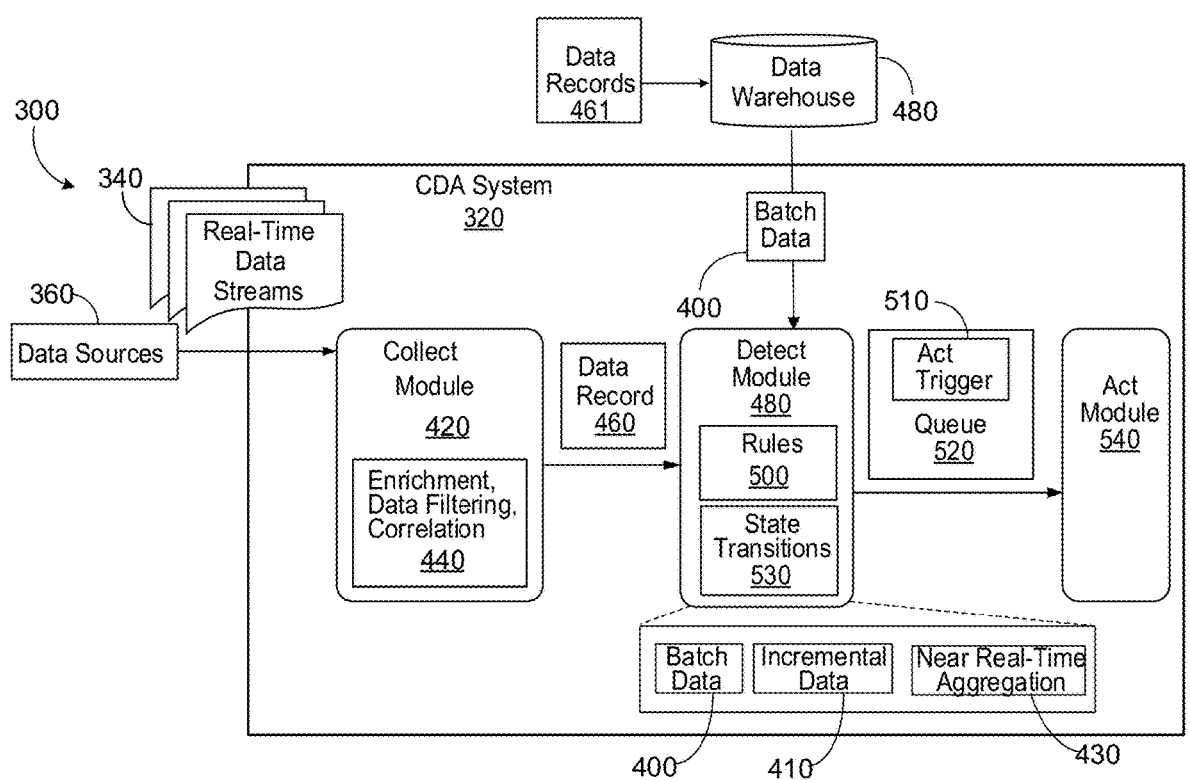
FIG. 3A is a diagram of a system for computing near real-time data record aggregates.

Referring to FIG. 3A, environment 300 includes Collect Detect Act (CDA) system 320 for collecting data records, detecting satisfaction of one or more predefined conditions (as specified in rules) in the data records and performing appropriate actions for the detected data records. In this example, execution system 108 of FIG. 1 is shown as CDA system 320 and the data flows through CDA system are shown. CDA system 320 intermittently (e.g., periodically or continuously) receives data from various data sources, e.g., different servers interconnected in a network. As the data is intermittently received, the system collects the data into a single data stream (e.g., by multi-publishing the received data to a queue) and joins the data together in near real-time (e.g., in one millisecond, two milliseconds, and so forth) in a single, wide record, e.g., by generating a wide record that includes the data multi-published to the queue. The data is collected in near real-time from the data sources, rather than being retrieved (in batch) from a data warehouse. This collected data includes data records, including, e.g., a record that includes data indicative of an occurrence of an event or an action (e.g., the making of a voice call or a length of a voice call) or data indicative of an occurrence of an event or an action. By joining together the data from these various data sources, the wide record includes different types of data records (e.g., Short Message Service (SMS) data records, voice data records, and so forth). CDA system 320 enriches this wide record with data record aggregations, data indicative of a non-occurrence of an event, state data and various dimensions, such as customer data (e.g., a customer profile), account data, and so forth. Environment 300 generates a wide record (e.g., a record that includes and/or points to various sub-records) of different types of data records, in near real-time, as the data records are received.

Typically, data collected from data streams does not include all the information needed by a CDA system for processing, such as user name and profile information. In such cases, the data (i.e., the data collected from the data streams) is enhanced by combining the profile data with the received data in the real-time data stream and by computing near real-time aggregates. By combining the profile data with data from the real-time data stream and by computing the near real-time aggregates, the search and retrieval system generates meaningful data records (e.g., that include the received near real-time data associated with a key, the profile data for that key and the near real-time aggregates for that key) tailored to the processing requirements of the search and retrieval system. Generally, the processing requirements include the various operations to be performed (and/or rules to be executed) by the system and various data required for performance of those operations. Additionally, this precomputation or generation of a data record that includes "all data records" or fields that are pre-populated with data corresponding to each of the data records in the data record (and/or a predefined set of fields) helps avoid and reduce congestion in network bottlenecks, e.g., at a time of processing the real-time data streams. This is because all the data required for processing is included in a single record (e.g., a record of records), e.g., thus eliminating or reducing data retrieval, computation and database queries at each stage or step in processing a data record or a collection of records. Additionally, by saving much of the enhancement data (e.g., profile data) in memory or in a cached index in the CDA system, the system is able to more quickly access that data, as it generates the pre-computed record (of records).

For example, the system described herein is configured to load into memory (or into an indexed cache) the enrichments and enhancement data at times when the system is under a decreased load, e.g., relative to the load at other times. Because the system has the flexibility to pre-load the enhancement data at times when the system is otherwise under decreased load, the system enables load distribution—by loading the enhancement data into memory at times of decreased load, e.g., rather than having to do so in real-time as the processing of the data records occurs (and which would be a period of increased load).

In an example, CDA system 320 processes over two billion data records per day for fifty million users and computes aggregates for each of the data record types. In this example, CDA system 320 receives real-time data streams 340 (e.g., a plurality of distinct data streams, each with a unique format) from data sources 360. As used herein, real-time includes, but is not limited to, near real-time and substantially real-time, for each of which there may be a time lag between when data is received or accessed and when processing of that data actually occurs, but the data is still processed in live time as the data is received. From real-time data streams 340, CDA system 320 intermittently receives data that includes data records, also called data items. The received data also include different types (e.g., different formats) of data records. In an example, a first one of real-time data streams includes data representing a first type/format of data record and a second one of real-time data streams includes data representing a second type/format of data record. CDA system 320 includes collect module 420 for collecting the different types of data records received in real-time data streams 340. Because collect module 420 acts on real-time data records, rather than data extracted from an EDW, CDA system 320 is able to provide an immediate response to data records (as they are received) and to the near real-time aggregation of data records, which also provides for immediate visibility of application results. Collect module 420 collects the data records into a single data stream and multi-publishes the data records to queue. In an example, collect module 420 collects the data records by using continuous flows to continuously process the received data records.

As data records from real-time data streams 340 continue to be intermittently received by collect module 420, collect module 420 detects (e.g., in the queue) two or more particular data records that share a common quality, such as being included in the data record palette or being associated with a particular user attribute (e.g., a user identifier (ID), a user key, and so forth). In an example, the common quality is corresponding values for a particular field (e.g., a user ID field) of the two or more particular data records, the two or more particular data records being of a specified data record type and/or the two or more particular data records being defined by the data record palette.

Collect module 420 creates a collection of data records that include the detected two or more particular data records. In this example, collect module 420 generates data record 460 that includes the collection of the detected data records. Collect module 420 also inserts enrichments 440 into data record 460, e.g., a wide record. Generally, an enrichment is data that is stored in a data warehouse (having been previously received or precomputed) that is related to a data record. For example, a data record may specify a number of SMS messages a user has sent and may also include a user ID for that user. In this example, data warehouse 380 receives data records 461 and stores data that includes (or is associated with) the same user ID. This stored data includes user profile data that includes, e.g., the latest handset type of the user. Collect module 420 attaches to or inserts into data record 460 customer profile data for a customer associated with a particular data record included in data record 460.

Collect module 420 filters the received data, e.g., such that only a subset of the received data is enriched and added to data record 460. Collect module 420 is configurable to filter based on keys (associated with records) and/or based on specified values of specified fields of the records. Collect module 420 also correlates the received data and/or data records such that records associated with a same or similar key are grouped together, e.g., to enable complex data record processing (e.g., the processing of records that are associated with a particular key and that are separated in time). In another example, collect module 420 correlates the data records based on records that have certain fields, certain values for certain fields and so forth. In this example, values of fields of correlated records are inserted or added into the wide record.

Collect module 420 also computes one or more aggregations (i.e., data record aggregations) for one or more of the data records included in data record 460. For a particular data record for a particular user (as specified by the user ID included in the data record), collect module 420 retrieves, from data warehouse 380, batch data 400 for that particular data record for that particular user. Batch data 400 includes a historical aggregation related to the particular data record, with the historical aggregation being a pre-computed aggregation of data record data from a prior time period, e.g., a period from a starting time to a particular time prior to performance of detecting data records. Generally, data record data includes data indicative of a particular quality, attribute or characteristic of a data record (e.g., an amount of data usage for a data usage data record). For example, a quality of a data record includes a particular field (that is included in the data record), a particular value of a field included in the data record, a particular user ID key included in or associated with a data record, an absence of a particular field or value of the particular field for the data record, and so forth. Based on data included in real-time data stream 340 for the particular data record for the particular user and on the historical aggregation, collect module 420 computes combined data record data, e.g., a near real-time aggregation for the data record. Collect module 420 enriches data record 460 with the combined data record data for the at least one particular data record.

In an example, one of the data records in data record 460 is data usage for John Doe, associated with User ID 5454hdrm. In this example, collect module 420 retrieves, from data warehouse 380, batch data 400 for the data record of "data usage" that is associated with user ID 5454hdrm. To compute a near real-time aggregation for this data record for this particular user, collect module 420 aggregates batch data 400 with incremental data 410 to compute near real-time aggregation 430 for this data record.

In this example, incremental data 410 includes a portion of the data received from real-time data streams 340 that pertains to the data record type being aggregated for that particular user. Incremental data 410 occurs from a time at which the historical aggregation was last computed to a near present time, e.g., when near real-time data streams are received. For example, batch data 400 specifies that user John Doe has used sixty-five megabytes of data in the last month and incremental data 410 specifies that user John Doe has used one megabyte of data in the last five minutes. By aggregating batch data 400 with incremental data 410, collect module 420 computes near real-time aggregation 430 for this particular data usage data record for customer John Doe. Collect module 420 inserts near real-time aggregation 430 into data record 460, e.g., as part of the record for this particular data record for this particular user. Collect module 420 also attaches to data record 460 an appendable lookup file (ALF) with the historical aggregation for the particular data record, e.g., as specified by batch data 400. Collect module 420 attaches the ALF with the historical aggregation to promote use of the historical aggregation in computing new near real-time aggregations, e.g., as new data records are received.

In this example, collect module 420 transmits data record 460 to detect module 480. Detect module 480 includes rules 500, including, e.g., rules for implementing various, different applications for different types of entities. Detect module 480 includes a single module for implementing the various applications and applications and for performing aggregations.

Detect module 480 computes one or more aggregations (i.e., data record aggregations) for one or more of the data records included in data record 460. For a particular data record for a particular user (as specified by the user ID included in the data record), detect module 480 retrieves, from data warehouse 380, batch data 400 for that particular data record for that particular user. Batch data 400 includes a historical aggregation related to the particular data record, with the historical aggregation being a pre-computed aggregation of data record data from a prior time period, e.g., a period from a starting time to a particular time prior to performance of detecting data records. Generally, data record data includes data indicative of a particular quality, attribute or characteristic of a data record (e.g., an amount of data usage for a data usage data record). For example, a quality of a data record includes a particular field (that is included in the data record), a particular value of a field included in the data record, a particular user ID key included in or associated with a data record, an absence of a particular field or value of the particular field for the data record, and so forth. Based on data included in real-time data stream 340 for the particular data record for the particular user and on the historical aggregation, detect module 480 computes combined data record data, e.g., a near real-time aggregation for the data record. Detect module 480 enriches data record 460 with the combined data record data for the at least one particular data record.

In an example, one of the data records in data record 460 is data usage for John Doe, associated with User ID 5454hdrm. In this example, detect module 480 retrieves, from data warehouse 380, batch data 400 for the data record of "data usage" that is associated with user ID 5454hdrm. To compute a near real-time aggregation for this data record for this particular user, detect module 480 aggregates batch data 400 with incremental data 410 to compute near real-time aggregation 430 for this data record.

In this example, incremental data 410 includes a portion of the data received from real-time data streams 340 that pertains to the data record type being aggregated for that particular user. Incremental data 410 occurs from a time at which the historical aggregation was last computed to a near present time, e.g., when near real-time data streams are received. For example, batch data 400 specifies that user John Doe has used sixty-five megabytes of data in the last month and incremental data 410 specifies that user John Doe has used one megabyte of data in the last five minutes. By aggregating batch data 400 with incremental data 410, detect module 480 computes near real-time aggregation 430 for this particular data usage data record for customer John Doe. Detect module 480 inserts near real-time aggregation 430 into data record 460, e.g., as part of the record for this particular data record for this particular user. Detect module 480 also attaches to data record 460 an appendable lookup file (ALF) with the historical aggregation for the particular data record, e.g., as specified by batch data 400. Detect module 480 attaches the ALF with the historical aggregation to promote use of the historical aggregation in computing new near real-time aggregations, e.g., as new data records are received.

In this example, CDA system 320 receives, from a client device of a user, data representing one or more rules defining an application. For example, the user may use the data record palette to define the rules. CDA system 320 generates, based on the received data, the one or more rules that define the application. CDA system 320 passes these one or more rules to processes configured to implement the one or more rules, e.g., detect module 480. Detect module 480 implements an application based on execution of rules 500 against data record 460. Detect module 480 also includes state transitions 530, including, e.g., data specifying a state in an application to which a user has transitioned or progressed. Based on state transitions 530, detect module 480 identifies which actions in an application are executed and/or which decision branches in the application to execute. For example, based on a particular user's state in an application—as specified by state transitions 530 for that user-detect module 480 identifies which component of an application have already been executed and which component of the application to execute next, in accordance with the user's application state.

Data record 460 includes different types of data records, such as SMS data records, voice data records, and so forth. Accordingly, rules 500 include rules with conditions for the various, different types of data records. Generally, a rule includes a condition, satisfaction of which causes execution of an action. In this example, one rule ("Rule 1") may have a condition of a user having sent thirty SMS messages in the last sixth months. Upon satisfaction of this condition, Rule 1 specifies an action of issuing the user a credit of $5. Another rule ("Rule 2") may have a condition of a user having used less than fifty megabytes of data over the last month. Upon satisfaction of this condition, Rule 2 specifies an action of offering the user a usage discount, e.g., to incentivize increased data usage. In this example, both Rule 1 and Rule 2 use different types of data records (i.e., SMS data records and Voice data records, respectively). Detect module 480 is able to execute a program that includes rules that are dependent on different types of data records, because data record 460 is a single wide record that includes different data record types. Additionally, detect module 480 is a single module that executes applications for multiple, different applications, because detect module 480 receives data record 460 which includes all data record types for all different operating levels. That is, detect module 480 is configured to execute a plurality of different applications against a single wide record, i.e., data record 460, rather than having different modules executing different applications against different data records (that each include the type of data appropriate for a respective application).

Upon detection of a data record (or an aggregation of data records) in data record 460 that satisfies at least one of the conditions in rules 500, detect module 480 publishes action trigger 510 to queue 520 for initiation of one or more actions (e.g., that are specified by the rules with the satisfied conditions). In an example, the action trigger includes data specifying which actions to execute, which application they are being executed for and a user (e.g., a user for whom the action is executed). Detect module 480 transmits queue 520 to act module 540 for execution of the action specified in action trigger 510. In this example, act module 540 is configured to execute various actions, such as issuing of credits to user accounts, transmitting messages, transmitting discount messages, and so forth.

Figure 3B:
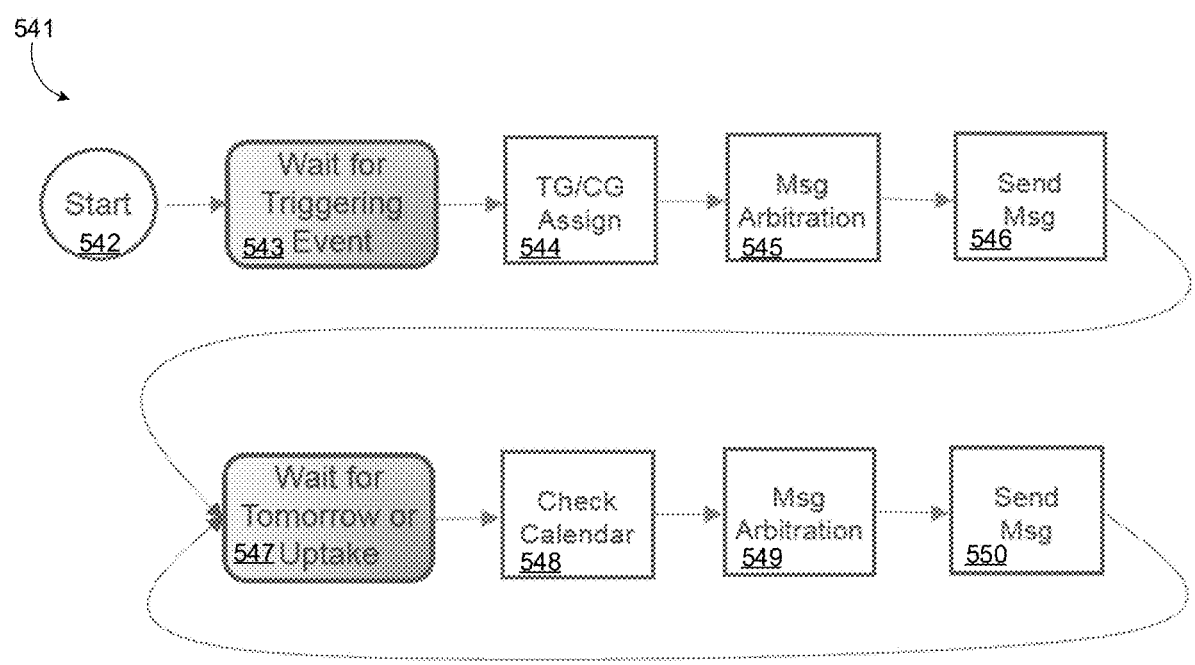
FIGS. 3B, 3C, 4, 5A, 5B are each a diagram of a system for processing keyed data.

Referring to FIG. 3B, diagram 541 illustrates an executable logic (e.g., for a campaign) lifecycle. In this example, the executable logic is part of a detection engine. In this example, a system does not start a campaign until a triggering event occurs. Generally, a triggering event includes an event that satisfies one or more specified conditions or attributes. The triggering event is based on an incoming event stream and a subscriber profile. The system delays calculation of control groups, as described below, until a triggering event occurs. Additionally, the system can configure the campaign to end early, e.g., if an acceptance event occurs. The system can chain together campaigns—such that after offer acceptance or expiration, another campaign can be triggered.

In this example, start node 542 represents the start of the campaign. In this example, start node 542 represents executable logic that specifies a start date and an end date for the campaign. The executable logic also specifies which rules (as part of a rule set, and referred to herein as "decision rules") are to be executed for the campaign. In this example, node 543 represents decision rules (e.g., executable logic) for detecting a triggering event, e.g., an event that signifies that the campaign should start. In this example, the decision rules include logic that is used to trigger a campaign, e.g., by specifying which event starts a campaign. The decision rules also include logic for specifying which offer to make, campaign duration and message priority. The decision rules also include logic for detecting when an offer is accepted.

At the start of the campaign, the system executes the decision rules on every received event. The system decides whether to trigger the campaign based on that event. The possible outcomes (of execution of the decision rules against the event) are to ignore the event, exit the campaign, ignore the event until tomorrow or trigger the campaign. As described in further detail below, the decision rules also specify what to do if a message cannot be sent. For example, the rules specify to cancel the campaign, trigger the campaign or to resume searching for a trigger at a subsequent time, e.g., tomorrow.

Once the campaign has been triggered, the system executes control group logic, as represented by node 544, to determine whether the event (e.g., the data record) will receive the offer or will be assigned to a control group that does not receive the offer. Control group assignments are just-in-time, e.g., because they are done only after a campaign triggers. Additionally, the system calculates control groups using a match panel cube, as described in further detail below.

Following target group (e.g., a group that receives the offer) or control group assignment, the system executes message arbitration, as represented by node 545. In this example, message arbitration refers to a process by which the system performs a lookup of relative message priorities. In this example, the system is configured to respect new message limits in the subscriber profile. For example, a subscriber profile may specify a predefined (e.g., a maximum) amount of "normal" messages per day that a subscriber can receive. The subscriber profile may also specify a predefined (e.g., maximum) amount of "urgent" messages a subscriber may receive in a given day. In this example, each message has an urgency and a priority. The various types of urgency include normal, urgent or unlimited. In this example, if there are too many messages to send at one time, the system will prioritize the messages, such that urgent messages are transmitted prior to normal messages. In this example, the decision rules specify a message send time. If the time is in the future, the system will wait before sending the message to allow a chance for a higher priority message to be send instead.

In an example, when a campaign is first triggered, the system executes message arbitration. If an initial message cannot be sent (e.g., because a limit on a maximum amount of messages has been exceeded), the triggering of the event may be cancelled. In this example, for subsequent messages, there is no option to cancel the campaign if message arbitration fails. In this example, the subscriber just does not see the message.

Part of the arbitration process is message (e.g., offer) priority lookup. In this example, the message priority and urgency is specified in a lookup (reference) file. The keys to the lookup field include a theme field, a type field and a priority key field. That is, each offer or message is pre-configured with a specified priority and urgency. In this example, based on an outcome of message arbitration, a message may be sent, as represented by node 546.

Following the sending of a message, the system is configured to perform a further wait action (e.g., by waiting for tomorrow or uptake (i.e., offer fulfillment)), as represented by node 547. The system performs this further wait action by executing additional decision rules. In this example, the decision rules are executed on every event. The rules are configured to identify whether to end the campaign based on that event (e.g., based on detection of occurrence of a target event). In this example, the target event is usually notification that fulfillment has happened. But, any event and conditions can be used to trigger a campaign stage end. In this example, the possible decision options are ignore event, exit campaign, and start new stage. Generally, a stage of a campaign refers to a distinct offer that is being offered through the campaign. In this example, when ending a campaign stage, the decision rules can start a new stage. The decision rules are also executed after a campaign stage has executed for a specified number of days (e.g., N days), e.g., if no fulfillment event is detected. When a campaign stage ends, the decision rules start a new stage. In this example, the possible options are to either exit the campaign or to start a new stage.

Following execution of the subsequent wait event, the system also performs one or more actions of executing calendar rules, as represented by node 548. For example, the calendar rules specify that after an initial message, the campaign is configured to send a reminder message every day. These rules can also be used to suppress the message on some days. Based on the calendar rules, the system determines whether to re-send a reminder. If the system determines that it is to resend the message, the system again performs message arbitration, as represented by node 549. Based on the outcome of message arbitration, the system may send the message again, as represented by node 550. Generally, the executable logic represented by the nodes in this figures can be configured by a business rules editor (e.g., as described in U.S. Pat. No. 8,069,129, the entire contents of which are incorporated herein by reference) or by an flowcharting user interface editor (e.g., as described in U.S. application Ser. No. 15/376,129, the entire contents of which are incorporated herein by reference).

Figure 3C:
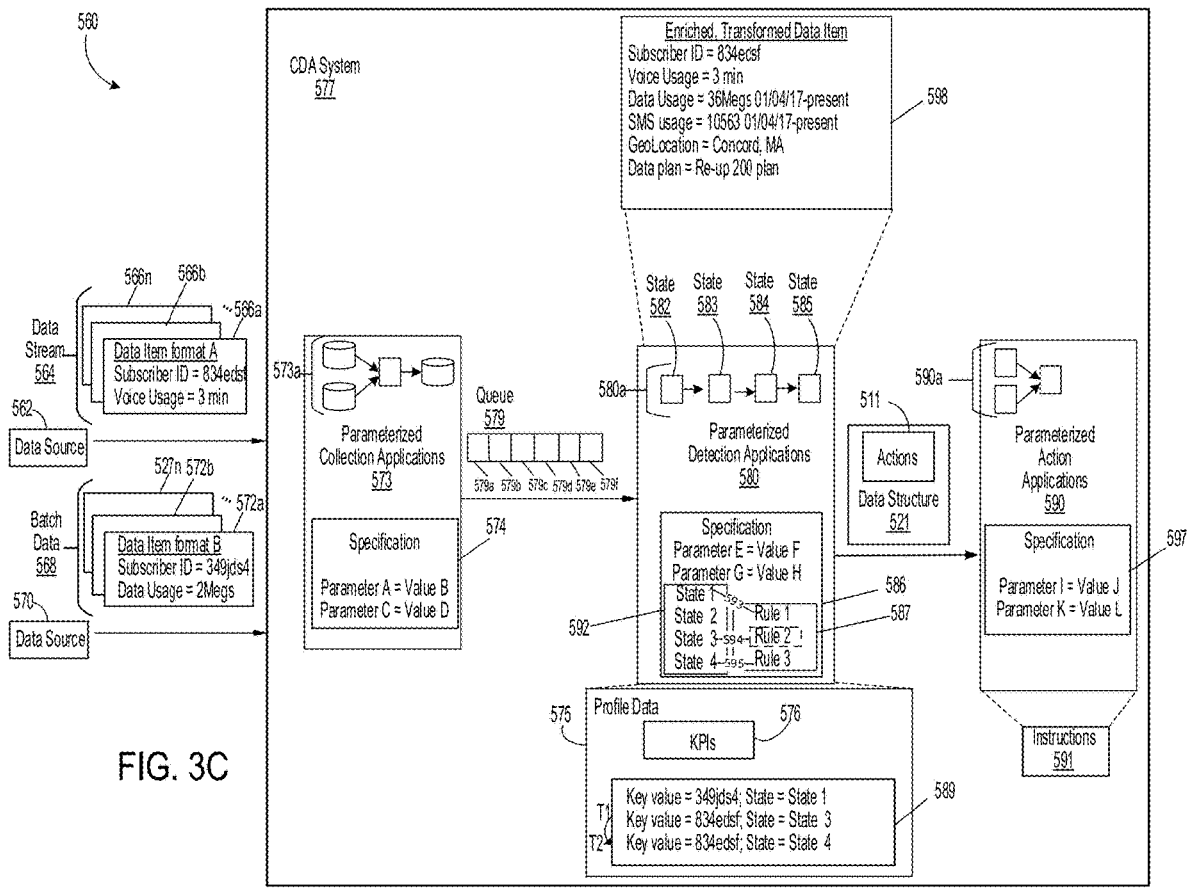

Referring to FIG. 3C, networked environment 560 includes data sources 562, 570 and CDA system 577. In this example, CDA system 577 includes parameterized collection applications 573, parameterized detection applications 580 and parameterized action applications 590. In this example, one of parameterized collection applications 573 includes dataflow graph 573a, including, e.g., nodes that each represent one or more data processing operations. One of parameterized detection applications 580 includes dataflow graph 580a, which includes nodes 582, 583, 584, 585.

In some examples, dataflow graph 580a includes a state diagram, e.g., as dataflow graph 580a specifies various executable logic to execute in various states. In this example, the state diagram can be parameterized, e.g., to enable input of values of various parameters in the state diagram. Additionally, a single key can be associated with multiple state diagrams (not shown here), e.g., to maintain state for the key across different dataflow graphs. Each node represents one or more portions of executable logic to be executed in a particular state (of the executable logic). As such, nodes 582, 583, 584, 585 are hereinafter referred to as states 582, 583, 584, 585, respectively. In this example, one of parameterized action applications 590 includes dataflow graph 590a.

In this example, parameterized collection applications 573 include specification 574 that specifies one or more parameters (e.g., parameters A and C) defining one or more properties of the parameterized collection applications 573 (or one of parameterized collection applications 573) and one or more respective values (e.g., values B and D) for those one or more parameters. For example, parameter A may be a parameter for specifying a data format and parameter C may be a parameter for specifying data sources from which to collect data items. In this example, value B (for parameter A) specifies a data format into which the collected data items are transformed. Value D (for parameter C) specifies data sources from which the data items are collected (e.g., for later transformation). In an example, transformation includes correlation. In this example, data records are transformed by correlating together those data records associated with a same key and then publishing to a queue a data record (e.g., a master record) that is indicative of the correlated records. In this example, parameterized collection applications 573 are also configured to perform enrichment, filtering and formatting. In this example, parameterized collection applications 573 enrich an event (e.g., a data record) itself, e.g., rather than enriching the data record with profile data—which is performed by parameterized detection applications 580. For example, an event for an SMS message is enriched by including data specifying where a cell phone tower that relayed the SMS message is located. In this example, parameterized collection applications 573 enrich the event with this data, e.g., by retrieving this data from one or more data sources—internal or external.

Parameterized detection applications 580 include specification 586 that specifies one or more parameters (e.g., parameters E and G) defining one or more properties of the parameterized detection applications 580 (or one of parameterized detection applications 580) and one or more respective values (e.g., values F and H) for those one or more parameters. For example, parameters E, G may be parameters included in rules executed by parameterized detection applications 580 (e.g., rules for detecting specified events) and values F, H are values of those parameters (e.g., values specifying different types of events to be detected). Specification 586 also includes rules 587 and respective conditions for the rules. Specification 586 also includes state data 592 that specifies the various states of a parameterized detection application, including, e.g., data flow graph 580a. In this example, state data 592 specifies that parameterized detection application 580a has four states, states 1-4, which correspond to states 582-585, respectively. In this example, certain of rules 587 are executed in certain states, in accordance with data structures 593, 594, 595 (e.g., pointers). For example, data structure 593 specifies that rule 1 is executed in state 1. No rules are executed in state 2. Rule 2 is executed in state 3 in accordance with data structure 594. Rule 3 is executed in state 4 in accordance with data structure 595.

Parameterized detection applications 580 store profile data 575 that includes KPIs 576 and keyed state data 589. Generally, a KPI includes data that is acquired by detection (e.g., of various events included in or represented in collected data records). As such, values of KPI are updated and changed on the fly and in real-time. For example, CDA system 577 defines a KPI to track data usage. In this example, as a new data record is received, parameterized detection applications 580 detect whether that new data record includes or specifies data usage events. If the data record specifies data usage events, then CDA system 577 updates a KPI (for the key associated with the data usage events) with data specifying the updated data usage. In this example, each KPI is a keyed KPI associated with a particular key. In an example, the KPIs are used in execution of the rules, e.g., to determine if various conditions of the rules are satisfied by determining whether contents of a KPI for a particular key satisfies a condition of a rule to be executed in a current state of specification 586 for that key. Additionally, a KPI may be calculated based on multiple events. For example, a KPI may be defined to specify when a user has used a specified amount of data and a specified amount of voice usage. In this example, the KPI is based on two events—the data events and the voice usage events. KPIs themselves may also be aggregated and the aggregated KPIs are used in detecting events and/or in detecting satisfaction of rule conditions. The KPIs are stored as part of the customer profile. Additionally, in some examples, the KPI is an attribute defined by a user and/or by a system administrator.

In this example, keyed state data 589 specifies a state of a parameterized detection application for each value of a key. In this example, data items received by CDA system 577 are each associated with a value of a key. For example, the key may be a unique identifier, such as a subscriber identifier. CDA system 577 maintains states of parameterized detection applications 580 for each of the key values. For example, the key value of "349jds4" is associated with state 1 of the parameterized detection applications 580. The key value of "834edsf" is associated with state 3 of the parameterized detection applications 580 at a first time (T1) and is associated with state 4 at a second time (T2).

In this example, parameterized action applications 590 include specification 597 that specifies parameters I, K defining one or more properties of parameterized action applications 590 and respective values J, L for those parameters. For example, parameter I may be a parameter specifying that profile data is used in customizing an action for a user. In this example, value J for parameter I specifies which profile data to use in the customization.

In operation, CDA system 577 executes one or more of parameterized collection applications 573 with the one or more values for the one or more parameters specified by specification 574 to perform processing of data records. In this example, the processing includes collecting, by parameterized collection applications 573, data items 566a, 566b . . . 566n in data stream 564 from data source 562. In this example, each of data items 566a, 566b . . . 566n is a keyed data item, e.g., a data item associated with a key. One or more of parameterized collection applications 573 also collects data items 572a, 572b . . . 572n (which are part of batch data 568) from data source 570. In this example, each of data items 572a, 572b . . . 572n is a keyed data item. In this example, a format of data items 566a, 566b . . . 566n differs from a format of data items 572a, 572b . . . 572n.

One or more of parameterized collection applications 573 transforms data items 566a, 566b . . . 566n and data items 572a, 572b . . . 572n in accordance with specification 574 to obtain transformed data items 579a . . . 579f. In this example, each of transformed data items 579a . . . 579f is transformed into a data format appropriate for parameterized detection applications 580. One or more of parameterized collection applications 573 populates queue 579 with transformed data items 579a . . . 579f and transmits the populated queue 579 to parameterized detection applications 580.

CDA system 577 executes one or more of parameterized detection applications 580 with the one or more values for the one or more parameters specified by specification 586 to process transformed data items 579a . . . 579f in queue 579, as follows. CDA system 577 may enrich a transformed data item with one or more portions of profile data 575 and/or with KPIs 576. For example, CDA system 577 generates enriched, transformed data item 598 by adding profile data (e.g., such as data usage, SMS usage, geolocation and data plan data) to transformed data item 579f. In this example, enriched, transformed data item 598 is associated with a particular value of a key ("834edsf"). Parameterized detection applications 580 identify a current state, with respect to the particular value of the key, of one or more of the parameterized detection applications 580. In this example, at time T1, the current state of one or more of the parameterized detection applications 580 is state 3, as specified in keyed state data 589. Parameterized detection applications 580 identify one or more of rules 587 in a portion of specification 586 to be executed in the current state. In this example, rule 2 is executed in state 3, as shown by the dotted line around rule 2 in FIG. 3C. Parameterized detection applications 580 execute the one or more rules identified (e.g., rule 2). Parameterized detection applications 580 determine that at least one of the one or more transformed data items (e.g., enriched transformed data item 598) satisfies one or more conditions of at least one of the one or more rules (e.g., rule 2) executed in the current state. Responsive to this determination, parameterized detection applications 580 generate data structure 521 specifying execution of one or more actions (represented by actions data 511). Parameterized detection applications 580 also cause specification 586, with respect to the particular value of the key (e.g., 834edsf), to transition from its current state to a subsequent state. In this example, the transition is shown as a transition from time T1 to time T2, in which the state of specification 586 transitions for key value 834edsf from state 3 to state 4. Parameterized detection applications 580 also transmit, to parameterized action applications 590, the generated data structure 521.

CDA system 577 executes parameterized action applications 590 with the one or more values for the one or more parameters specified by specification 597 to perform operations including: based on at least one of the one or more actions specified in data structure 521, sending one or more instructions 591 to cause execution of the at least one of the one or more actions.

In a variation, parameterized collection applications 573 access profile data (e.g., profile data 575) for each received data record and enriches the data record with that accessed profile data. In this example, parameterized detection applications 580 compare contents of the profile data to one or more rules and/or applications included in parameterized detection applications 580 to detect occurrence of one or more predefined events. Upon detection, parameterized detection applications 580 update the KPIs accordingly, e.g., with the detected information and/or with information specifying the detected event.

In yet another variation, there are multiple queues between the collection applications and the detection applications. For example, there may be a priority queue for certain types of events, e.g., events that should not be delayed in being processed. Other events may be delayed in processing. These other events are assigned to another queue, e.g., a non-priority queue, and an alarm is inserted into the queue to specify that the processing of these events is delayed. Generally, an alarm occurs when a chart sends itself a special type of event (e.g., an alarm event) that will arrive at a pre-calculated time in the future. Alarms are used whenever the chart logic wants to wait. By having the multiple queues, the system is able load balance processing of events and is also able to reduce a latency in processing events—by processing first those events in the priority queue and waiting to process events in the non-priority queue. In this example, the parameterized collection applications are parameterized and configured with rules for insertion of alarms and rule specifying various event types for which to associate with alarms.

Figure 4:
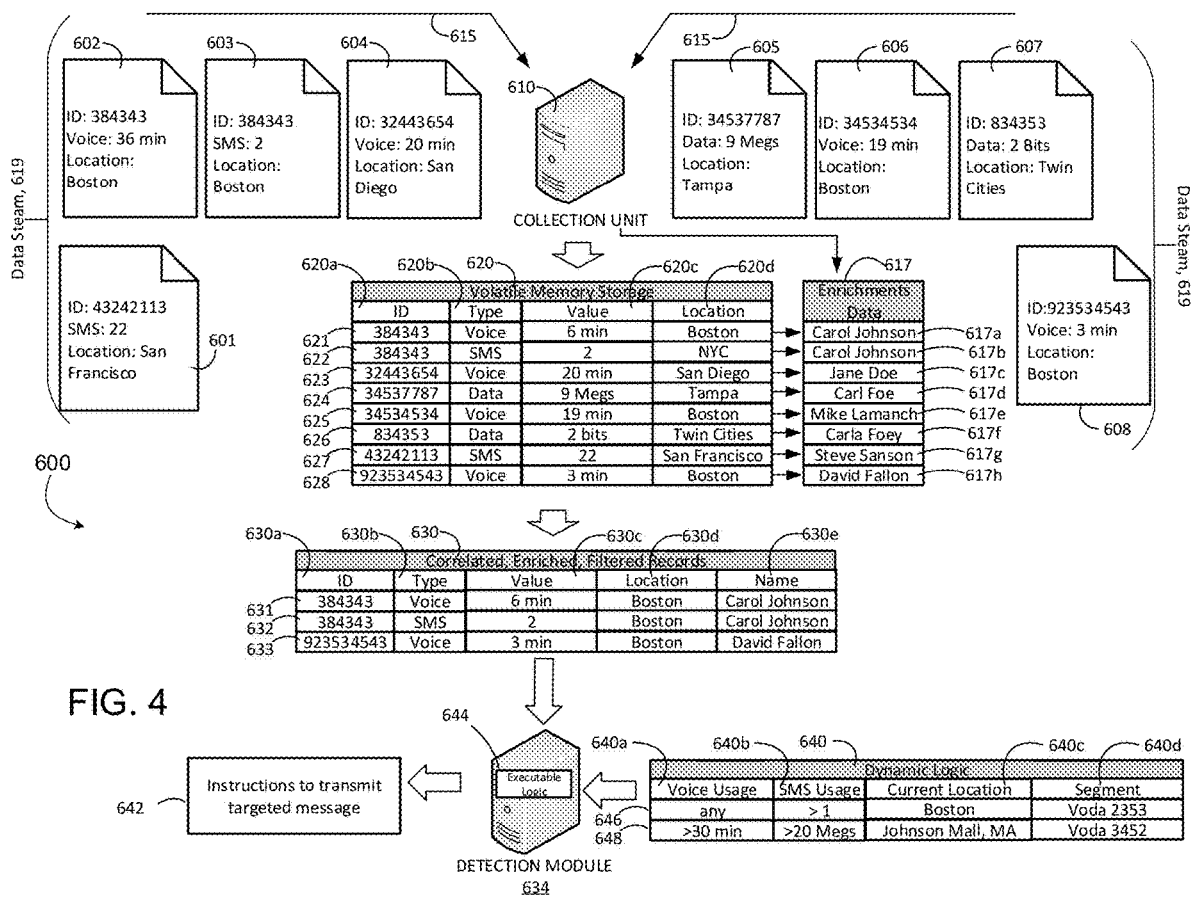

Referring to FIG. 4, system 600 includes collection unit 610 for receiving 615 data records 601-608, e.g., in batch and/or from real-time data streams. In this example, collection unit 610 stores records 601-608 in memory, e.g., in data structure 620 (e.g., an index) in memory. In this example, data structure 620 is not a static data structure. Rather, data structure 620 is a dynamic data structure that is updated and modified, intermittently, as new records are received in data stream 619. Additional, entries in data structure 620 are removed after an entry (e.g., a logical row) is processed, e.g., by being assigned to data structure 630 or by being filtered from data structure 620. Data structure 620 includes logical rows 621-628. In this example, each of logical rows 621-628 corresponds to one of data records 601-608. Data structure 620 also includes logical columns 620a-620d that each correspond to a field and/or a value of a field in data records 601-608. In this example, each logical row of data structure 620, such as logical rows 621-628, corresponds to a subset of relevant information extracted from a particular data record 601-608 by collection unit 610. Each logical column of data structure 620 conceptually defines a particular data attribute of a particular data record associated with a particular logical row. In an example where data structure 620 is an index, each of logical rows 621-628 is an indexed entry.

Collection unit 610 also stores data structure 617 in memory. In an example, data structure 617 represents a static data structure that is stored in a data store or repository. In this example, data structure 617 stores enrichments data, e.g., profile data. In this example, the enrichments data stored in data structure 617 can be added to received data records on-the-fly, e.g., by added or appending particular enrichments data to a logical row of data structure 620. Data structure 617 also defines which data types to include in data record 630, e.g., which data types are to be dynamically added to received records, on the fly and as those records are received. In this example, data structure 617 includes logical rows 617a-617h, with each logical row including enrichments data for a particular ID. In this example, data structure 617 includes a logical column for ID data (not shown). By matching ID data in data structure 620 with ID data in data structure 617, collection unit 610 generates enriched records for a particular ID, e.g., records that include the received data from the real-time data stream and are then enriched with enrichments data.

Collection unit 610 also filters and correlates data records 601-608 received in data stream 619. In a variation, collection unit 610 collects records received from a batch retrieval, e.g., from a data store. In this example, collection unit 610 filters records that include a non-Boston value in the "location" field. That is, collection unit 610 filters data records 601-608 to only include those data records with a value of "Boston" in the location field. Collection unit 610 also correlates together the remaining filtered records 602, 603, 606, e.g., by correlating record 602 with record 603—as both of these records are associated with the same ID. Collection unit 610 correlates records 602, 603 together by including logical rows 631, 632 that represent these records next to each other in data structure 630. In a variation, correlated records 602, 603 are merged into a single record. In still another example, collection unit 610 perform correlation by generating a correlated aggregation.

In a correlated aggregation, the value aggregated is not the same as the value returned. Instead, collection unit 610 uses various fields in records (separated in time) to perform the correlation. In this example, correlation is particularly complex because collection unit 610 joins together records that are separated in time, e.g., based on particular values of fields in those records. Below is an example correlation to be performed by collection unit 610:

For each customer, for each data record of type trade, where trade.action="buy", calculate the symbol for the largest trade.amount seen in the last 20 minutes.

In the foregoing example, the underlined portions represent portions of the aggregation definition that are parameters that can be specified. Below is a list of possible parameters for a correlated aggregation. In this example, the parameters can be specified as part of the collection application:

| Parameter Name | Parameter Description |
| --- | --- |
| Aggregation Name | The name for the aggregation, which can be used in charts. |
| Data record Type | The input data record type that triggers an update of this aggregation. |
| Key | The key for the aggregation. |
| Filter Expression | An optional expression that evaluates to a Boolean. When specified, only data records for which the computed value is true will be included in the aggregation. |
| Selection Function | This is the function used to determine which data record will be returned. Values for this parameter include: latest maximum, latest minimum, latest, oldest maximum, oldest minimum, oldest, and so forth. |
| Field or Expression | This field or expression is used to determine which data record in the Time Window should be used for the Selection Function. |
| Calculated Expression(s) | This is a field from the data record or an expression calculating a value from the fields in the data record. The result of this expression will be used as the value of the aggregation. We also support multiple calculated expressions, in which case the output is also a record consisting of those fields. If no calculated expression(s) are specified, the entire data record is used. |
| Time Window | This is the time period. In the UI, the user should be able to select the amount and the units (i.e. 10 minutes, 5 days, etc.). |

In this example, collection unit 610 uses the Field or Expression along with the Filter Expression and Selection Function to select the appropriate data record from the Time Window. Then, we calculate a value from that data record and use that as the value as the aggregation value. In an example, a data record has two fields—an amount field and a symbol field. For collection unit 610 to ascertain the symbol corresponding to the data record with the largest amount (in a given time period), then in the collection application the Selection Function is set to "latest maximum", the Field or Expression is set to "amount", and the Calculated Expression is set to "symbol".

In still another variation, collection unit 610 correlates data records that are separated in time, e.g., by collecting a particular data record associated with or that includes a particular key and then waiting a specified amount of time for another data record that includes/is associated with the same key. When collection unit 610 collects correlated data records (e.g., data records that are associated with a same key), collection unit 610 packetizes the correlated data records, e.g., by merging the data records into a single record and generating a data packet that includes the single, merged record. In an example, because the data records are separated in time, collection unit 610 may store in memory data indicative of a collected data record and wait a specified period of time to ascertain whether another data record is received with a key that matches the key of the data record for which data is stored (e.g., temporality in memory). Because of the volume of data records received by collection unit 610, collection unit 610 implements an in-memory grid (or another in-memory data structure) to track and store keyed data representing data records that have been received and (optionally) timestamps representing time at which those records are received. As new records are received, collection unit 610 identifies a key of a newly received records and looks up in the in-memory data grid whether there is a matching key in the in-memory data grid. If there is a matching key, collection unit 610 correlates the data records with the matching key, e.g., by merging the records into a single record. Collection unit 610 may also update the in-memory grid with data specifying that a second data record has been received for that key. Additionally, collection unit 610 is configured to delete or otherwise remove entries in the in-memory grid after a specified amount of time has elapsed from a time indicated in the timestamp.

In this example, data structure 630 represents the filtered, correlated records and includes logical rows 631-633 and logical columns 630*a*-630*e*. Data structure 630 includes a dynamic data structure, not a static data structure, that intermittently is updated, e.g., as new records are received. Entries (e.g., logical rows) are removed from data structure 630 once dynamic logic (as described in further detail below) is applied to a particular entry. Following the application of the dynamic logic to a particular entry, data structure 630 does not retain and continue to store that entry. In this example, logical column 630*e* represents the enrichment data, e.g., for a particular ID. Logical row 631 represents an enriched version of record 602 by including enrichment data associated with ID "384343."

Collection unit 610 transmits data structure 630 to detection module 634. In this example, detection module 634 executes executable logic 644, as described herein. Detection module 634 also executes dynamic logic (e.g., that perform dynamic segmentation), e.g., by executing logic included in dynamic logic data structure 640. In an example, dynamic logic includes executable logic that is configured to dynamically process incoming data records on the fly—as they arrive. In this example, data structure 640 includes logical rows 646, 648 and logical columns 640*a*-640*d* that specify rules. In this example, detection module 634 is configured to execute data structure 640 against data structure 630 to determine which records represented in data structure 630 satisfy logic defined by data structure 640. Upon detection of a record that satisfies the logic, detection module 634 executes one or more portions of executable logic 644 that are associated with a portion of the logic included in data structure 640 (e.g., a segment defined by data structure 640). That is, executable logic 644 has various portions (e.g., rules) that are associated with various portions of the dynamic logic. Not all portions of executable logic 644 are executable for all portions of the dynamic logic. Detection module 634 executes a portion of executable logic 644 on the detected record that satisfies a portion of the dynamic logic. For example, record 603 represented by logical row 632 satisfies the dynamic logic included in logical row 646 in data structure 640. In this example, a portion of executable logic 644 is defined to be executable for the logic defined by logical row 646 in data structure 640. Accordingly, detection module 634 executes that portion of executable logic 644 against record 603 (or against data included in logical row 632). Based on execution of the portion of executable logic, detection module 634 generates instruction 642 to transmit a targeted message (e.g., an offer to reload mobile minutes) to a client device associated with a user represented by the ID included in logical row 632 at logical column 630*a*.

In an example, the dynamic logic included in data structure 640 specifies various segments, e.g., population segments. For example, the logic included in logical row 646 specifies a particular segment. In this example, the segmentation performed by detection module 634 is dynamic, because the segmentation is performed "on-the-fly," as data records are received and processed, in real-time, by system 600. Traditionally, customer records are stored to disk (e.g., in a data repository) and then the customers are "segmented", e.g., by applying various segmentation rules to the customer records. This is an example of static segmentation, because a static set of customer records are being segmented. In contrast, here, there is no static set of records. Rather, records are continuously and/or intermittently being received by system 600. As the records are received, system 600 dynamically segments them, e.g., by using continuous flow to process the records on-the-fly, with part of the processing including segmentation. Because the records are being dynamically segmented, system 600 can detect when a user or client device enters a particular geographic location, e.g., a mall, and send the client device a targeted message at that time, while the user is still in mall. In an example, the dynamic segmentation rules can be specified through configuration of a parameterized application, e.g., one of the parameterized detection applications.

In an example, collection unit 610 or another component of a CDA system generates target groups (TG) and control groups (CG), e.g., against which dynamic logic is executed. Generally, a control group includes a set of users (e.g., subscribers) who match specified criteria of dynamic logic and therefore are candidates for inclusion in an particular grouping (e.g., for inclusion in a campaign), but have been explicitly left out of the grouping so their behavior can be compared to other users who actually are in the grouping (e.g., and therefore receive the campaign's offer)—the target group. In this example, collection unit determines the target and control groups on the fly dynamically and in real-time as data records are received. That is, rather than computing control and target groups from static data sets, collection unit 610 determines the target and control groups from dynamically changing data sets, e.g., that are intermittently updating and changing as new records are received.

In an example, a control group is defined as follows: data records are assigned by collection unit 610 to either the TG or the CG if they are associated with specified logic (e.g., are in a given campaign). In an example, a data record is associated with specified logic if a key for that data record is specified in being associated with the logic. In order to make sure that the TG and CG have similar characteristics and attributes, collection unit 610 generates and stores in memory a match panel to segment data records. A match panel (also referred to as a match panel cube) includes a multi-dimensional grid that represents the keys for which records are being received (e.g., includes the whole subscriber base), with each key (e.g., subscriber) assigned to one "cube" (cell). The dimensions describe different aspects associated with a key, such as data fields indicative of the following: average revenue per user (ARPU), geography (rural or urban), Age on Network, etc. Keys with the same values for the dimensions appear in the same cube of the match panel.

Determination of which keys (or data records) are in the TG or the CG can then be performed, e.g., by collection unit 610, for each cube of the match panel using specified logic, described later. Target group vs. control group membership decisions will also be made in a specified chart (e.g., generated from a collection application). Late-arriving records, if they impact the logic (of the campaign), are handled in the chart logic. For example, if the logic relies on data record A arriving before data record B, but there is some chance that, because of operational delays, data record B arrives first, the chart can be written to account for this possibility. If there is a possibility of time skew between the systems sending these data records, then the chart logic also accounts for the time skew. In an example, the logic for assigning keys (or records) to either the TG or the CG (or neither—in the data record that both the TG and CG are saturated) is executed by collection unit 610 as follows. If the logic is configured to not require a CG, collection unit 610 assigns the keys to the TG.

The logic is as follows: for each key, determine if that key is pre-specified (e.g., in a table and/or in memory) as belonging to the CG. If so, collection unit 610 assigns the key to the CG. For each cube of the match panel, collection unit 610 modifies entries in the CG as follows: A shortfall exists if less than a specified amount (e.g., a specified percentage) of a predefined grouping of keys (e.g., representing a campaign population) belonging to that cube is in the CG. If there is a shortfall, move TG keys in the cube to the CG for that cube. An excess exists if more than the specified amount of the predefined grouping of keys belonging to that cube is in the CG. If there is an excess, collection unit 610 marks these keys as neither in the TG nor the CG. In an example, collection unit 610 computes a measurement of how good the CG is, scored as green, yellow, or red. This measurement is a dynamic measurement that intermittently changes, because the CG is changing intermittently.

Figure 5A:
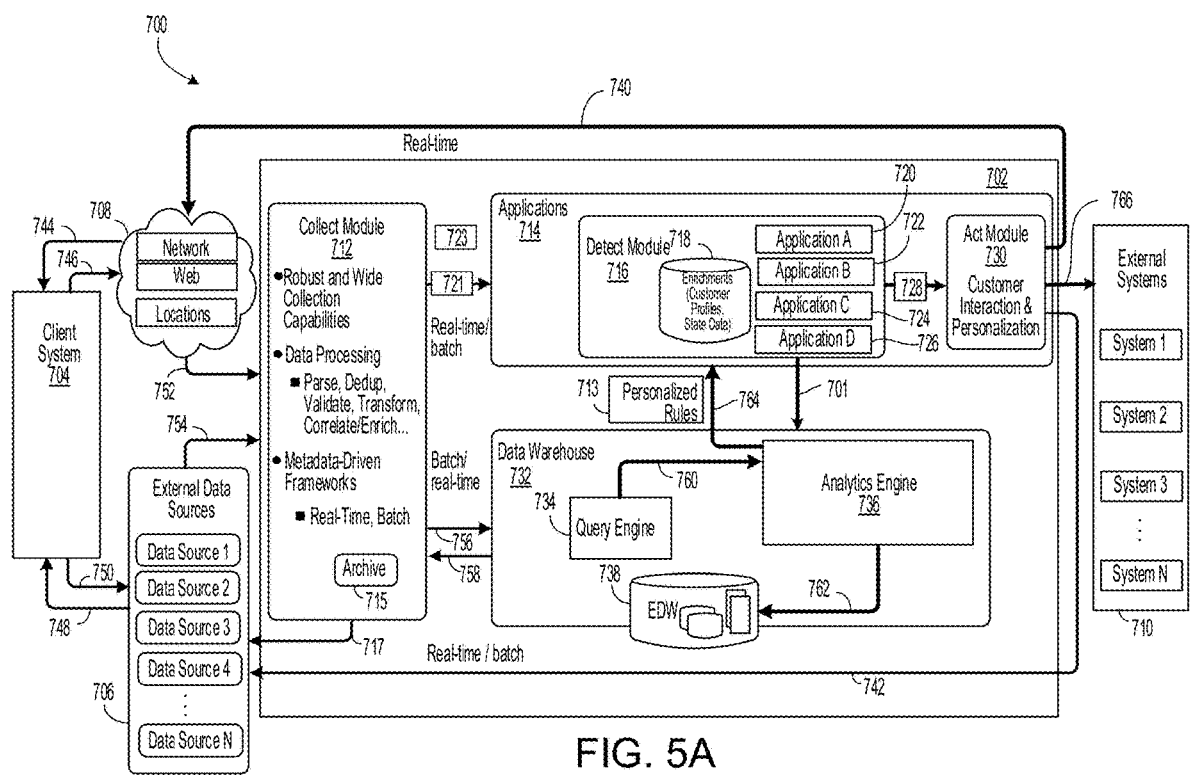

Referring to FIG. 5A, an example networked environment 700 for performing real-time CDA functionality is shown. In this example, networked environment 700 includes CDA system 702, client system 704, external data sources 706, network data sources 708 and external systems 710. CDA system 702 includes collect/integrate module 712 that, e.g., performs the functionality of the collect modules described above. In this example, collect module 712 stores (as shown by arrow 756) data in data warehouse 732. Collect module 712 stores the data in both near real-time (e.g., as the data is received) and in batch. Collect module 712 also retrieves (as shown by arrow 758) data from data warehouse 732, e.g., for enriching data records and for building a wide record. In this example, collect module 712 includes an in-memory archive 715 for archiving the data retrieved from data warehouse 732. In this example, collect module 712 may transmit some of the collected data back to external data sources 706, as shown by arrow 717, e.g., to promote data feedback and form a data feedback loop. CDA system 702 also includes applications 714, which in turn include detect module 716 and act module 730, each of which perform operations and functionality as described above.

In this example, detect module 716 includes in-memory data storage 718 for storing profile data (e.g., of user of CDA system 702) and also for storing state data (e.g., that specifies a state of execution of an application, a dataflow chart, a campaign (e.g., that includes a series of applications and/or dataflow charts), and so forth. As shown in this example, profiles are stored in memory, e.g., rather than being stored to disk, to reduce and/or eliminate latency in data retrieval and to enable real-time maintenance of state. In this example, detect module 716 performs enrichments, e.g., by enriching data record 723 with profile data stored in in-memory data storage 718. In this example, detect module 716 executes a specification for a parameterized detection application. The enriching performed by detect module 716 is in accordance with instructions specified by the specification of the parameterized detection application to retrieve, from memory 718, profile data associated with a key (e.g., profile data for a particular user) and to populate one or more fields of data record 723 (for that key) with the retrieved profile data.

Additionally, CDA system 702 is continuously or intermittently updating a user's profile, e.g., by updating the profile data in in-memory data storage 718. For example, if act module 730 sends a user an offer, CDA system 702 updates profile data for that user with data specifying that the offer was sent and which offer was sent. For example, each offer includes or is associated with a key or other unique identifier. The profile data also includes or is associated with a key or unique identifier. Once act module 730 sends an offer, CDA system 702 identifies the key associated with that offer and updates profile data associated with the same key with data specifying that the offer was sent.

Additionally, based on the profile data, CDA system 702 generates KPIs. In an example, a KPI is a measurable value that demonstrates how effectively a predefined object is being achieved. In an example, a KPI is generated by detect module 716 and is stored in detect module 716. In this example, a KPI includes data that specifies when an offer was sent to a customer, which customer the offer was sent to, whether that customer had a response to the offer, and so forth. In another example, the KPI also represents other metrics, e.g., such as how many times a user deposited more than $10.00 into an ATM or other predefined metrics or events. In this example, CDA system 702 receives input data records. CDA system 702 is configurable to specify which metrics are KPIs. As such, KPIs (and/or definitions thereof) are integrated as part of initialization of CDA system 702. In still another example, CDA system 702 updates the profile data and/or KPIs (for a particular key) with other data specifying each event that is represented by a particular received record for that particular key. As such, the profile data tracks and includes data representing all received events (for a particular user) and/or predefined events or types of events.

In another example, detect module 716 (or a parameterized detect application) generates one or more KPIs for a particular value of a key. In this example, the KPI specifies one or more values of data items associated with the particular value of the key. CDA system 702 receives data for the particular value of the key, with the received data being indicative of feedback with regard to one or more actions initiated by act module 730 and/or with the received data including incoming data records. In this example, detect module 716 updates the KPI for the particular value of the key with the feedback data and stores the KPI in in-memory data storage 718.

CDA system 702 transmits its KPIs to other systems, e.g., to enable those systems to track and manage offer effectiveness and/or customer journey. As previously described, the profile data—along with the KPIs—are maintained in memory, e.g., by the profile data being stored in memory and by KPI being stored as part of the profile data.

Additionally, detect module 716 is configured to add external data to in-memory profiles (that are stored in in-memory data storage 718). This external data is retrieved by CDA system 702 from one or more of external data sources 706. In this example, detect module 716 adds the external data to the in-memory profiles, e.g., to further reduce latency in building a record that includes enrichments and profile data, e.g., for detection of data records. In this example, detect module 716 performs in-memory, key-based processing (e.g., of collected data records). In this example, the processing is key-based processing because detect module 716 processes data records associated with a particular key (or identifier) and processes those keyed data records (e.g., data records associated with a particular key) according to the in-memory state (of an application or a series of applications) for that key, as described in U.S. Application No. 62/270,257. In this example, collect module 712 transmits record 723 to queue 721 for retrieval by detect module 716. In this example, collect module 712 transmits data and/or data records to detect module 716 in both batch and in real-time (e.g., as data records are received by collect module 712). Collect module 712 transmits data in batch to detect module 716, e.g., by transmitting (as part of record 723) batch data retrieved from one or more data repositories.

In this example, detect module 716 executes various rules (e.g., rules specified by various applications and/or flow charts). Based on execution of these rules, detect module 716 determines if state (e.g., for a particular key) needs to be updated. For example, based on execution of rules, a state (for a particular key) of an application may transition from one state to another state. When this example, detect module 716 updates the state for that key accordingly. In an example, detect module 716 stores state as a shared variable, e.g., via persistent in-memory keyed data storage, that is separated from any particular running dataflow graph or application. This reduces latency required in determining state, e.g., as each application and/or module can retrieve the in-memory value of that shared variable.

Detect module 716 also includes applications 720, 722, 724, 726, each of which is for performing various types of data processing. In this example, collect module 712 generates data record 723, e.g., from one or more collected data records and by including the collected data records as sub-records in data record 723 and by also enriching data record 723 with profile data and/or other stored data. Detect module 716 transmits data record 723 to each of applications 720, 722, 724, 726, each of which is configured to perform data processing and to apply rules for performing data record detection. In conventional ways of performing data record detection, a separate data record would be generated and transmitted to each application (e.g., to be in a format that is appropriate for each application), resulting in an increase in system resources, increased memory storage and an increase in system latency, e.g., relative to an amount of system resources consumed, memory consumed and resultant latency when a single wide record of data records (e.g., record 723) is transmitted to each of applications 720, 722, 724, 726, as described in U.S. Application No. 62/270,257. However, when each application is already integrated into a particular system or module, each application shares a common format and therefore a single record can be transmitted to each of the applications.

Based on execution of one or more of applications 720, 722, 724, 726, detect module 716 detects one or more predefined data records. For each detected data record, detect module 716 publishes an action trigger (e.g., instructions to perform or cause performance of one or more actions) to queue 728, which in turn transmits the action trigger to act module 730. Based on contents of the action triggers, act module 730 causes execution of one or more actions (e.g., such as sending of emails, text messages, SMS messages, and so forth). In some examples and based on contents of the action trigger, act module 730 generates a message or contents and customizes that message/content for a user to whom the message/content is directed. Act module 730 transmits (as shown by arrow 766) that customized message to one or more of external systems 710, which then transmit the message/contents or cause further actions to be performed based on the customized message.

In this example, data warehouse 732 includes query engine 734, data warehouse 738 and analytics engine 736. Query engine 734 queries data (e.g., data indicative of data records detected, data indicated of data records processed, and so forth) from detect module 716, data warehouse 738 or other data sources and transmits (as shown by arrow 760) that queried data to analytics engine 736 for performance of data analytics. In this example, analytics engine 736 stores (as shown by arrow 762) the data analytics in data warehouse 738. In addition to performing data record detection, detect module 716 is also configured to process warehoused data (e.g., data stored in data warehouse 738 or another data store) to perform various analytics. In this example, analytics engine 736 uses various personalization rules 713 that specify which rules are applied to data records associated with which keys. In this example, the personalization rules also include segmentation rules that specify how instructions are personalized or targeted for records associated with various predefined segments. Analytics engine 736 transmits (as shown by arrow 764) personalization rules 713 to applications 714, e.g., for execution of the personalization rules.

In this example, act module 730 transmits (as shown by arrow 740) data and/or messages to network data sources 708, which then feed (as shown by arrow 752) data back into CDA system 702. In an example, act module 730 transmits the customized messages to network data sources 708, which then re-transmit (as shown by arrow 744) these customized messages to client system 704, which in turn sends (as shown by arrow 746) an acknowledgement message (not shown) to network data sources 708, which then transmit (as shown by arrow 752) the acknowledgement message back to CDA system 702 as feedback. As such, networked environment 700 implements a feedback loop (via one or more of the paths shown by arrows 740, 744, 746, 752) that enables CDA system 702 to audit or track that messages are received.

In this example, act module 730 also transmits (as shown by arrow 742) data (e.g., customized messages or other customized data) to external data sources 706 to execute a data feedback loop. In turn, one or more of external data sources 706 transmit (as shown by arrow 748) the data (received from act module 730) to client system 704, which in turn may send (as shown by arrow 750) an acknowledgement back to one or more of external data sources 706, which sends (as shown by arrow 754) that acknowledgement back to CDA system 702 as feedback. As such, networked environment 700 implements another feedback loop (via one or more of the paths shown by arrows 742, 748, 750, 754). In this example, analytics engine 736 or another module of CDA system 702 tracks the end-to-end customer journey, e.g., by tracking whether an offer was delivered as it should have been (e.g., offer execution), the user's response to the offer, offer fulfillment and so forth. In this example, analytics engine 736 tracks the customer journey (e.g., offer delivery and offers fulfillment) through one of the above-described feedback loops and/or by obtaining data from multiple systems, e.g., from external data sources 706, external systems 710 or other external systems that track offer fulfillment and delivery.

In some examples, CDA system 702 may assess data received as part of one of the above-described feedback loops. For example, the received data may specify the effectiveness of an offer or an action output by an act module. Based on this received data, CDA system 702 assesses whether the parameter values (e.g., input by the user) lead to the desired reaction of the system, e.g., lead to the desired actions being executed. Using this feedback, CDA system 702 or the user may modify or adjust one or more parameter values of the collection, detection or action applications. For example, the detection application may be configured with parameter values specifying the detection of events (or data records) that indicate that a user's data plan has less than a threshold amount of remaining data. In response to detecting this event, the action application may be configured with one or more parameterized values specifying specific actions or output to be generated. In this example, the output may be a message notifying the user of a special promotional opportunity to reload or purchase more data. Using one of the above-described feedback loops, CDA system 702 tracks an effectiveness of the output, e.g., by tracking offer fulfillment. In an example, the output, from the act module, includes a key (or other identifier) that uniquely identifies the output or a user to whom the output is directed or transmitted. Actions with regard to the output (e.g., clicking on a link or other selectable portion in the output) are tracked (e.g., by external systems), e.g., by cookies that include the key or identifier (or another identifier associated with the key for the output), by associating the actions with digital signatures that include the key or identifier of the output, and so forth.

In this example, based on the data received from the feedback loop, CDA system 702 may identify that a particular output is not particularly effective. For example, the output may not be resulting in at least a threshold amount of users purchasing additional data. Based on the feedback data, CDA system 702 or the user may adjust one or more parameter values of the detection application (e.g., to specify detection of different or varied events) and/or of the action application (e.g., to specify varied or different output in response to a detected event). In this example, CDA system 702 executes a correction loop that adjusts the parameter values by changing the values to obtain the correct actions to be executed after determining that the executed action was not correct (e.g., did not achieve the desired result) or was not correctly executed. In some example, the correction loop includes a set of rules that are heuristic based and that specify modifications to one or more of the applications to modify and/or obtain specified results.

In another example, detect module 716 sends feedback directly to data warehouse 732, as shown by arrow 701. For example, detect module 716 may send to data warehouse 732 data indicative of a campaign's success. Detect module 716 may also send to data warehouse 732 data (e.g., feedback data) indicative of paths taken (in the detection applications), decisions made by the detections applications, and branching logic followed by the detection applications. In this example, CDA system 702 may execute, on the feedback data received by data warehouse 732 from detect module 714, one or more of a machine learning algorithm, a heuristic or a neural network. Based on this execution, detect module 716 may update values of one or more parameters in the detection applications or the type of parameters included in the detection applications. For example, if a particular area of branching logic is being underutilized (as indicated by the feedback data), a neural network could utilize the feedback data specifying which logic is being accessed and, based on that feedback data, adjust the parameter for the branching logic that is being underutilized to promote traversal of that logic.

The above described feedback loop and correction loop may also executed in the following manner to ensure proper operation of underlying system, e.g., to ensure that the one or more actions are executed in a correct manner, i.e., as desired. The one or more actions may relate to data processing tasks or network communications such as one or more of sending a text message to an external device, sending an email to an external system, opening a ticket for a work order in a case management system, cutting a mobile telephone connection immediately, providing a web service to a targeted device, and transmitting a data packet of the one or more transformed data items with a notification, and executing a data processing application that is hosted on one or more external computers on the one or more transformed data items. In some examples, the one or more actions include providing a user with an offer, e.g., an extra ten voice minutes or extra data. In this example, the system described herein is configured to communicate with a provisioning system (e.g., a system that maintains or controls minutes and/or data usage—such as a telephone network) to indicate to the provisioning system that the user has the additional voice minutes and/or data. In another example, the one or more actions include the system providing a benefit to a user, such as, e.g., providing money. In this example, the system is configured to provision money through a financial transaction to a user's account maintained at a financial entity. In another example, the one or more actions include downgrading a user's service when the user is roaming to stop the user from incurring a roaming bill.

The underlying system and/or the user may receive, in a feedback loop, a feedback message indicating whether the one or more actions (i) were successfully completed, or (ii) failed. The one or more actions may be considered failed if a portion of one of the one or more actions was not completed. The feedback message may optionally indicate which portion of the one or more failed actions was not completed. For example, the feedback message may indicate that the data processing application that is hosted on one or more external computers was or was not properly executed on the one or more transformed data items, e.g. some data processing task of the application were not performed on some of the data items. The feedback message may indicate which data processing tasks (e.g. which part of a programming code) was not executed. For example, the action of cutting a mobile telephone connection immediately may not have been executed properly, because the mobile telephone connection was cut only after a certain delay, which exceeds a predetermined delay considered allowable. The feedback message may indicate this certain delay. The feedback message may also indicate result data (e.g. the certain delay or a result generated by the data processing application) of the successfully completed and/or failed one or more actions.

The result data may be compared with predetermined data (e.g. the predetermined delay considered allowable or desired result to be generated by the data processing application) associated with a successful completion of the execution of the one or more actions. It may then be determined that the execution of the one or more actions was successfully completed, or that the execution of the one or more actions failed, based on the comparison. The execution of the one or more actions may be determined as successfully completed if the result data deviates from the predetermined data less than a predetermined amount (e.g. in form of an absolute value or in form of a percentage), and wherein the execution of the one or more actions is determined as failed if the result data deviates from the predetermined data at least by the predetermined amount.

That is, the correct execution of the one or more actions may be represented by the predetermined data and/or the predetermined amount. In view of the above mentioned possible actions to be executed, such deviations of the result data from predetermined data may occur in terms of receipt confirmation data, transmission time or sent character number of the text/email message, ticket number of the ticket, time required to cut the mobile telephone connection, available network bandwidth for the web service, amount of data transmitted for the data packet, data processing tasks executed in the data processing application on the external device or similar parameters or characteristics that are characterizing the action.

Subsequently, the one or more specified values for one or more parameters of the first, second, and/or third parameterized application may be changed (by the system 702 or by the user) based on the result data and the first, second and/or third parameterized application may be re-executed by the system with the changed one or more specified values. In order to provide a further possibility for the user to assess and/or initiate the proper operation of the underlying system, one or more of the following interactions may be provided during operation of one or more user interfaces: displaying one or more user interface elements for specifying the predetermined data and the predetermined amount; outputting, via one or more displayed user interface elements, whether the one or more actions (i) were successfully completed, or (ii) failed; and outputting, via one or more displayed user interface elements, the result data. The user interface may receive (e.g., via icons as graphical elements) the predetermined data and the predetermined amount from the user.

Alternatively, one or both of the predetermined data and the predetermined amount are stored in a memory accessible and retrieved by the system. The user interface may graphically output (e.g. via icons as user interface elements) whether the one or more actions (i) were successfully completed, or (ii) failed. The user interface may graphically output (e.g. via icons as user interface elements) the result data for inspection by the user or for automatic use by the system. Via one or more displayed (graphical) user interface elements, user-specified changed one or more specified values for one or more parameters of the first, second, and/or third parameterized application are received (which may be based on the result data) and the first, second and/or third parameterized application may be automatically re-executed by the system (e.g., system 702) with the changed one or more specified values. The sending of the one or more instructions to cause (re-)execution of the one or more actions is performed automatically by the third parameterized application by using the output specifying execution of the one or more actions as input. The one or more instructions may be sent via a network connection to cause (re-)execution of the one or more actions on an external device.

The user interface may provide a graphical element, which, upon user-initiated activation of the graphical element, automatically initiates the re-execution with the changed values. For example, the user may be provided with the result data on the user interface and may recognize or be provided with the information that the result data is not as desired according to a correct execution of the one or more actions. The user or the system (e.g., system 702) may then initiate, in a correction loop, the re-execution of the action with the changed values, wherein the changed values are calculated by the system (or input by the user) based on the result data such that they ensure the correct/desired execution of the action. This may assist in ensuring proper operation of the underlying system, e.g., by ensuring that the one or more actions are executed correctly (i.e., as desired).

As described herein, CDA system 702 provides end-to-end operational robustness (e.g., as CDA system 702 can be leveraged to process data for warehousing/analytics, as well as for operational systems) and virtually unlimited scalability on commodity hardware, e.g., due to reuse of the application, due to in-memory state and profile, and due to a wide record of data records being generated and then multi-published to various applications, including, e.g., applications 720, 722, 724, 726.

Figure 5B:
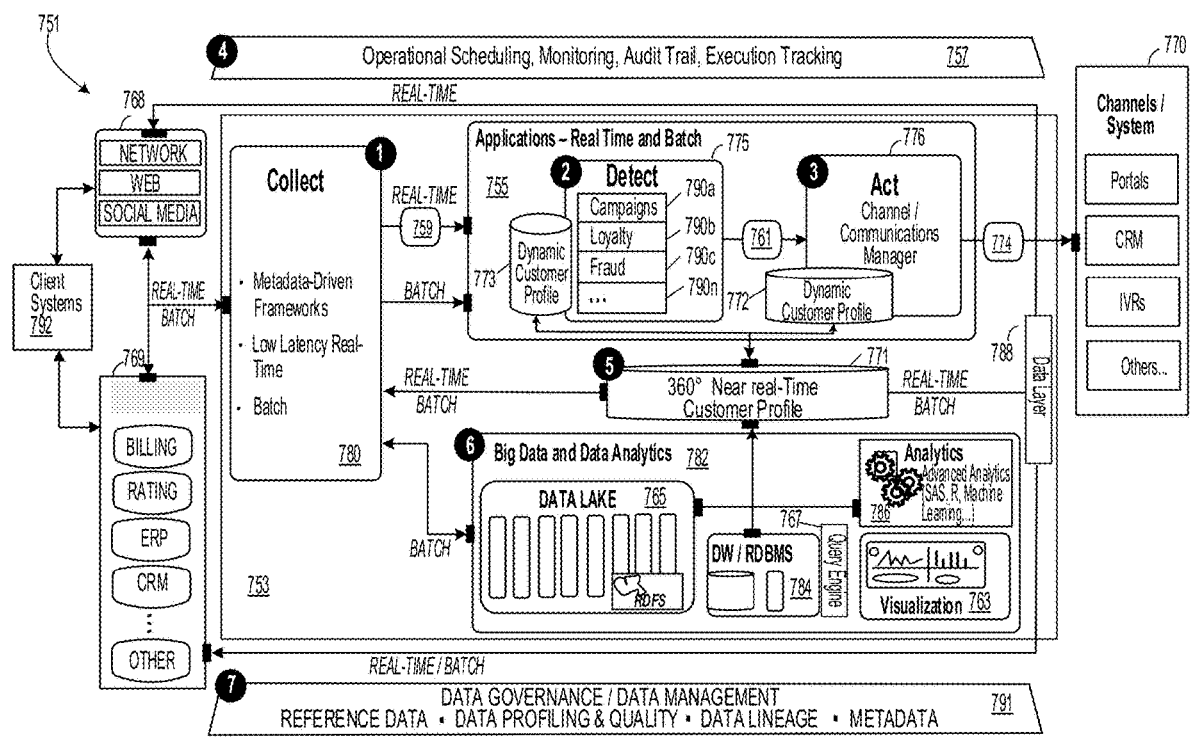

Referring to FIG. 5B, networked environment 751 is a variation of networked environment 700 described in FIG. 5A. In this example, networked environment 751 includes client systems 792, networked systems 768, external input systems 769 (for streaming or inputting data), external output systems 770 (for receiving output data) and CDA system 753 with collect application 780, applications 755 (which include detect application 775 and act application 776), profile data structure 771 and data analytics application 782. In this application, data analytics application 782 includes data repository 765 (e.g., a data lake) for storing data (e.g., in a native format), data warehouse 784, analytics application 786 (e.g., an analytics engine for implementing machine learning and data correlation), and visualization data 763 (e.g., data for generating visualizations of data analytics, profile data, and so forth). Data analytics application 782 also includes query engine 767 for querying data repository 765, data warehouse 784, profile data structure 771, and so forth, e.g., to query data for processing or analysis by analytics application 786 and/or for inclusion in visualization data 763. In an example, profile data structure 771 is stored in volatile memory (e.g., to reduce a memory storage requirement and to decrease latency in retrieval of profile data, e.g., relative to a latency in retrieval of profile data when the profile data is stored to disk) and/or is stored in non-volatile memory (e.g., in data repository 765 and/or data warehouse 784). CDA system 753 also includes data layer 788 (e.g., a services layer) for transmitting (e.g., in batch or in real-time) portions of near real-time profile data from profile data structure 771 to external output systems 770 and/or to external input systems 769 (e.g., in batch or in real-time).

In operation, one or more of client systems 792 transmit data (e.g., data packets) that include events (or are indicative of events) to networked systems 768 and to external input systems 769. In an example, one of client systems 792 is a smartphone. One of external input systems 769 is a telecommunications system of a telephony company. In this example, the smartphone sends a text message. When sending the text message, the smartphone also sends data (specifying that a text message was sent) to the telecommunications system. In this example, the data specifying that the text message was sent is an event. In turn, the telecommunications system transmits the event to collect application 780. Generally, collect application 780 is configured to collect data records (e.g., in batch and/or in real-time) from data sources and from data streams. In this example, collect application 780 transmits received data records to applications 755. In this example, collect application 780 transmits the received data records in batch and in real-time by populating queue 759 with collected data records.

In this example, detect application 775 is configured to execute various rule sets 790a, 790b, 790c . . . 790n. In this example, each rule set executes a particular campaign, loyalty program, fraud detection program and so forth. Detect application 775 executes the various rule sets on the data record received from collect application 780. In this example, detect application 775 includes profile repository 773 for dynamically updating a user profile (e.g., in memory) with data included in a received data record. In this example, profile data structure 771 intermittently pushes profile data (e.g., associated with particular keys and/or with all keys) to profile repository 773, which stores the profile data in memory to reduce retrieval time of the profile data by detect application 775, e.g., when the profile data is required for execution of the rule sets and/or for determining whether one or more conditions of a rule set is satisfied. As detect application 775 receives new data records, detect application 775 updates profile repository 773 with profile data for appropriate profiles (e.g., by matching keys associated with received data records to keys associated with profile data stored in profile repository 773). In an example, particular fields in a data record include profile data. In this example, profile repository 773 is updated with contents of those fields (e.g., for appropriate keys). Intermittently, profile repository 773 pushes its updated profile data to profile data structure 771 to update profile data structure 771.

Based on execution of one or more rule sets, detect application 775 identifies one or more actions to be executed. In this example, detect application 775 publishes to queue 761 instructions to cause execution of those one or more actions. The instructions in queue 761 are transmitted to act application 776, which includes profile repository 772, which stores profile data in memory. In this example, profile repository 772 intermittently retrieves profile data from profile data structure 771 and stores the retrieved profile data in memory. Profile repository 772 does so to enable retrieval of profile data by act application 776 with reduced latency, relative to a latency of retrieval of the profile data disk. For each of the actions specified in the instructions, act application 776 either executes the action or causes execution of the act (e.g., by populating queue 774 with execution instructions and transmitting those execution instructions in queue 774 to external output systems 770). In either example, act application 776 uses profile data in profile repository 772 to customize the executed actions (e.g., with profile data specific to a recipient of the actions) or to customize the execution instructions (e.g., by adding profile data specific to a recipient of the actions). By storing the profile data in profile repository 772 in memory, rather than storing it to disk, act application 776 retrieves the profile data with reduced latency, relative to a latency in retrieving the profile data from disk. Based on this reduced latency, act application 776 can add profile data in near real-time to the instructions and/or to the actions. In some examples, act application 776 updates profile repository 772 with new profile data (e.g., data specifying that an offer was sent to a particular user). Profile repository 772 intermittently pushes to profile data structure 771 updates to the profile data and/or a copy of the profile data stored in profile repository 772. Based on updates and/or profile data received from profile repositories 773, 772, profile data structure 771 maintains a near real-time customer profile. In this example, profile data structure 771 also receives profile data from data warehouse 784, further enabling profile data structure 771 to maintain a version of profile data for particular and/or all keys.

In this example, CDA system 753 is configured to push (e.g., in batch and/or in real-time) profile data in profile data structure 771 to collect application 780, which in turn transmits the profile data to external input systems 769 and/or networked systems 768. CDA system 753 is also configured to push (e.g., in batch and/or in real-time) profile data from profile data structure 771 to data layer 788 for transmittal to external output systems 770, networked systems 768 as shown by data flow 757 (e.g., to enable operational scheduling, monitoring, audit trails and execution tracking based on data included in the profile data, such as, data specifying what actions were executed and when those actions were execution) and to external input systems 769 as shown by data flow 791 (e.g., to enable data governance and data management, such as, data profiling and quality and data lineage based on metadata and reference data included in the profile data). In this example, profile data stored in profile data structure 771 includes data lineage data and data representing transformations and other operations performed on one or more portions of profile data (e.g., associated with a particular key).

In this example, collect application 780 and data analytics application 782 are configured to transmit data to each other in batch. By doing so, collect application 780 pushes to data analytics application 782 collected data records and other data received from systems 768, 769 for storage in data repository 765 and/or data warehouse 784. Similarly, data analytics application 782 transmits to collect application 780 analytics data and/or other stored data, e.g., for subsequent transmission to one or more of systems 768, 769, e.g., to promote integration of data across the various systems.

Figure 6:
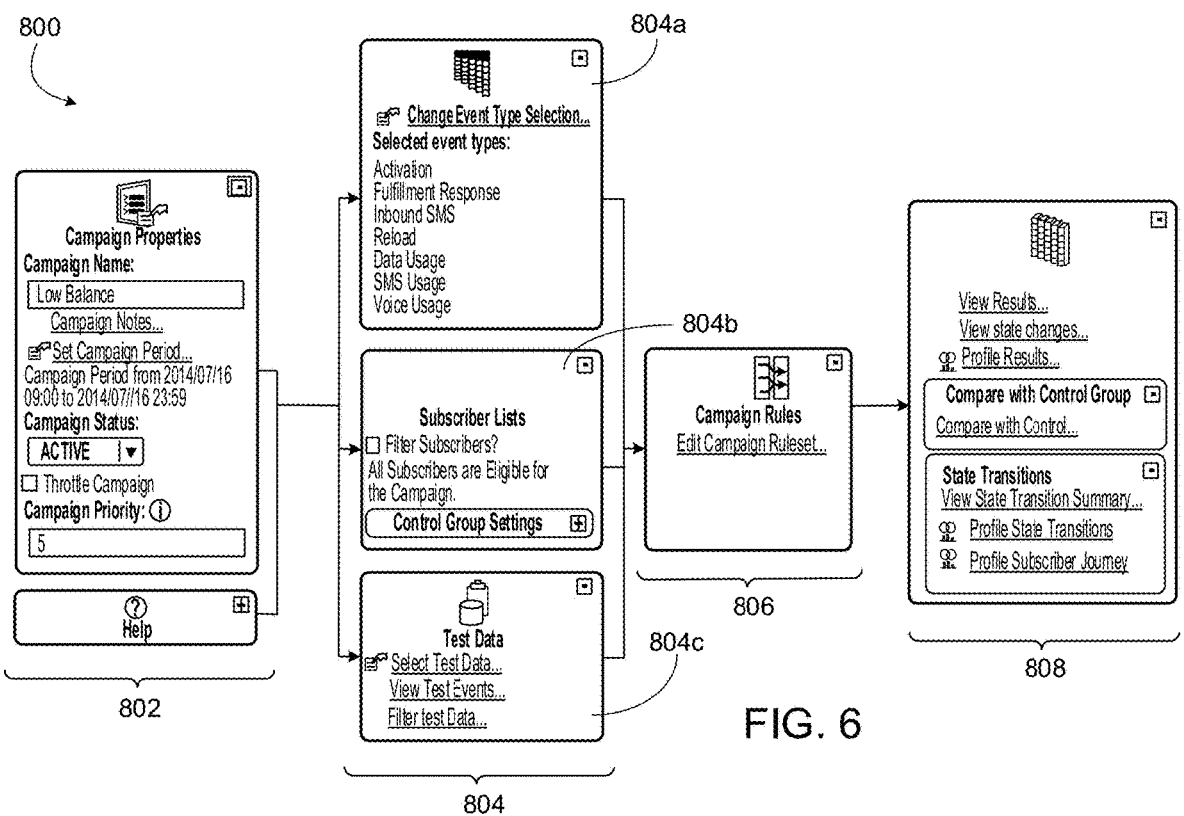
FIGS. 6, 7, 8, 9 are each an example of a graphical user interface for configuration of parameterized logic.

Referring to FIG. 6, graphical user interface 800 shows a flexible wizard for configuring a detection module, e.g., by defining an initial setup of a program for performing detection, e.g., by configuring parameters such as the duration of a campaign or program, data records, data sources, and definitions of target populations. In this example, graphical user interface 800 includes portion 802 for specifying one or more properties of the program (e.g., a program for campaign execution), portion 804 for specifying one or more properties and/or parameter values defining events to detect, portion 806 for specifying one or more properties and/or parameter values for performing detection and portion 808 for specifying state transitions (e.g., which is part of detection) one or more properties and/or parameter values for viewing results.

In this example, portion 804 includes sub-portions 804a, 804b, 804c for specifying values of various parameters (e.g., included in parameterized logic or parameterized applications) for performing detection. For example, sub-portion 804a enables a user to specify which types of data records (e.g., data records or data records having particular properties) are to be detected. Sub-portion 804b enables a user to specify those keys for which detection is not performed, e.g., to filter our records associated with particular keys. Sub-portion 804c enables a user to specify which records are to be used as test records, e.g., to test in real-time the processing of the data records by the application. Portion 806 enables configuration of which rules and/or logic are to be executed by detect module.

Figure 7:
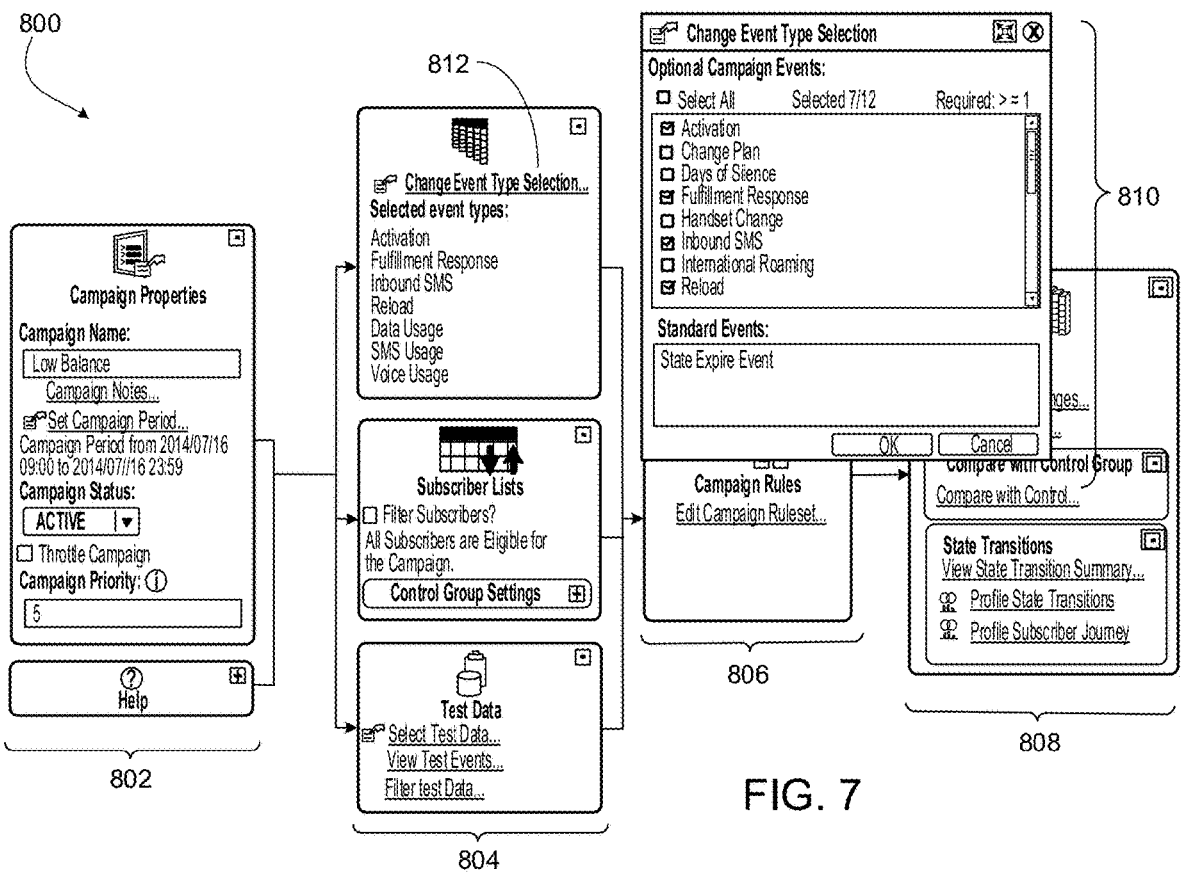

Referring to FIG. 7, a variation of FIG. 6 is shown. In this example, portion 804 includes selectable portion 812 (e.g., a link), selection of which causes display of overlay 810. In this example, overlay 810 includes one or selectable portions (e.g., checkboxes) for specifying which data records are processed (e.g., by applying rules) against these data records. In this example, the data entered into overlay 810 specifies parameter values functionally in the manner described with regard to FIG. 2C, e.g., in the same manner in which interface 250 functioned to set parameter values for an underlying graph and/or parameterized application (or parameterized logic) and/or application.

Figure 8:
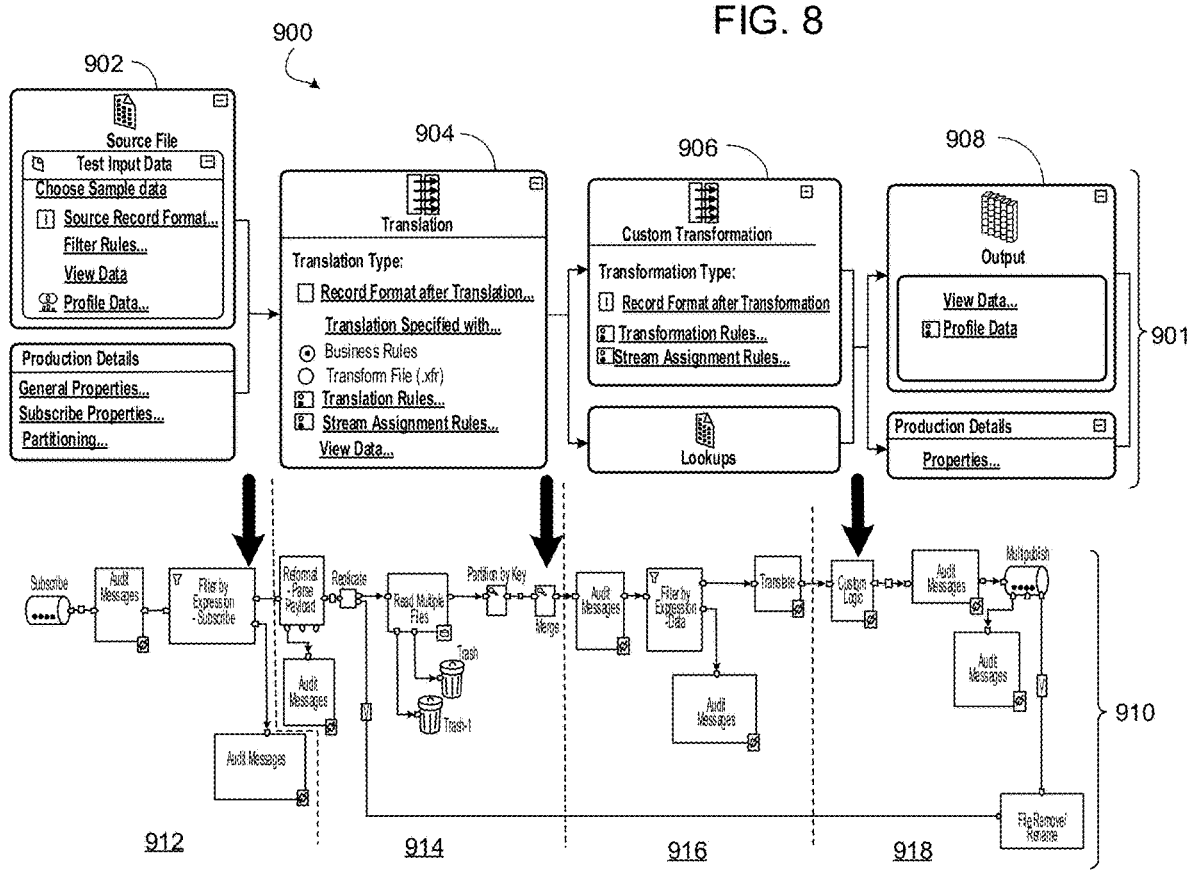

Referring to FIG. 8, graphical user interface 900 provides for configuration of a collect module and shows a correspondence between portions 902, 904, 906, 908 of configuration interface 901 and portions 912, 914, 916, 918 of dataflow graph 910 for which values of parameters are set through configuration interface 901, e.g., implementing the functionality described above with regard to FIGS. 2A-2C. In this example, graphical user interface 900 shows a generic application that can be configured by non-developers. In this example, dataflow graph 910 includes an application for collecting, transforming and enriching data records received from a plurality of sources. In this example, dataflow graph 910 includes an application with various parameters, the values of which are set through configuration interface 901. Upon specification of values of values of parameters of dataflow graph 910, a CDA system generates an instance of dataflow graph, e.g., an instance of dataflow graph 910 in which the values of parameters in dataflow graph are set to be those values specified by configuration interface.

In this example, portion 902 of configuration interface 901 specifies which source files are collected by a configuration module. Input into portion 902 specifies values for parameters included in portion 912 of dataflow graph 910. Based on selection of one or more selectable portions in portion 902, a user specifies sources for collection of data and data records. Portion 904 specifies translations, e.g., reformatting. As described herein, the CDA system handling the complexities of arbitrarily large data volumes, low latency, and multiple data formats. In this example, portion 904 provides for the handling of the multiple data formats. Input into portion 904 specifies values for parameters included in portion 914 of dataflow graph 910. Input into portion 906 specifies data transformations, e.g., enrichments and adding of profile data to a wide record. In this example, portion 906 corresponds to portion 916 of dataflow graph 910 and specifies values for one or more parameters included in portion 916 of dataflow graph 910. In this example, portion 908 includes one or more selectable portions for specifying values of one or more parameters included in portion 918 of dataflow graph 910. Portion 908 is for specifying values of parameters pertaining to the output of the data, e.g., and what data is to be output and instructions for transmittal to various devices.

Figure 9:
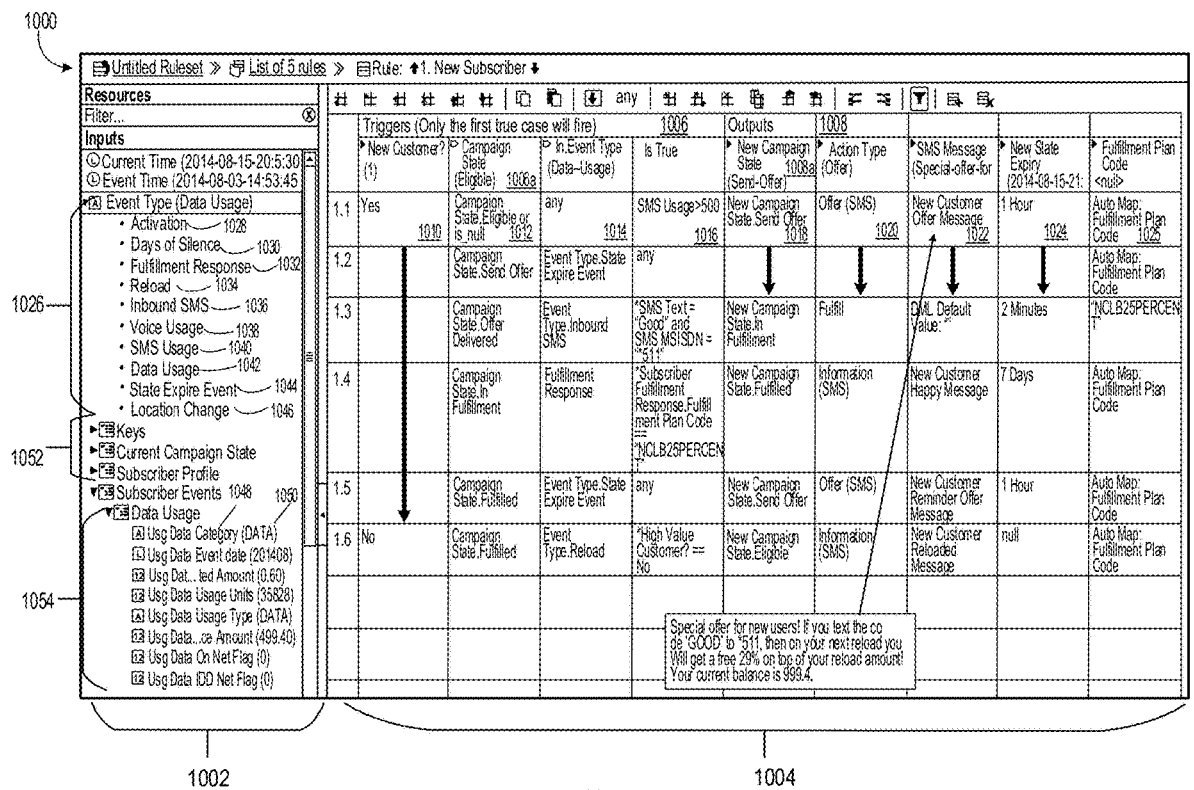

Referring to FIG. 9, graphical user interface 1000 displays controls for configuring a detect module. Graphical user interface 1000 includes portion 1002 for display of inputs available in graphical user interface 1000, e.g., that are inputs to defined logic. In this example, portion 1002 defines a palette, as described in U.S. Application No. 62/270,257. The palette includes all data records included in the wide record (e.g., that is generated from the collected records received by a CDA system). In this example, the palette includes inputs 1026, 1054 (e.g., data records) and enriched inputs 1052 (e.g., enriched data records). Generally, an enriched input includes an input that is based on data retrieved or collected from a data store or in-memory store, e.g., rather than data that is received externally from the system. In this example, inputs include pre-computed aggregations, e.g., as described U.S. Application No. 62/270,257. For inputs 1026, there are various types of inputs, including, inputs 1028, 1030, 1032, 1034, 1036, 1038, 1040, 1042, 1044, 1046, 1048, 1050. Each of these types of inputs is included in the wide record. Each of the inputs displayed in portion 1002 are selectable (e.g., via a drag and drop) for input into a cell in portion 1004, e.g., for use in defining logic.

Graphical user interface 1000 also includes portion 1004 for generation of logic (e.g., rules) to be executed by a detect module. In an example, portion 1004 includes a business rules editor. In this example, portion 1004 displays visualizations of one or more parameterized applications, e.g., a detection application and an action application. Portion 1004 also displays editable cells for specifying values of parameters in the parameterized application(s). In an example, the business rules editor and/or portion 1004 is used in defining a specification, e.g., upon input of values of parameters for the parameterized application(s). That is, the input into portion 1004 and the rules specified by portion 1004 together form a specification.

In this example, portion 1004 includes logic portion 1006 for specifying one or more triggers or conditions, the satisfaction of which causes execution of one or more actions (e.g., by causing implementation of an output). Logic portion 1008 specifies various outputs to be initiated and/or executed upon satisfaction of the conditions or triggers. In this example, logic portion 1006 includes state portion 1006a that specifies one or more state triggers, e.g., conditions specifying that when a state for a particular key corresponds to a specific value or type of state that the detect module should execute corresponding actions for that condition. Logic portion 1008 also includes state portion 1008a that specifies a new state to which the logic transitions, e.g., upon satisfaction a corresponding trigger.

In this example, logic portion 1006 includes logic sub-portions 1010, 1012, 1014, 1016, each of which specify one or more conditions. For example, logic sub-portion 1010 specifies a condition of a user associated with the keyed data being processed be a new user. Logic sub-portion 1012 specifies a condition of a state of the keyed data having a value of "CampaignState.Eligible" of "is_null." Logic sub-portion 1014 specifies a condition that the keyed data being processed be of any data record type. Logic sub-portion 1016 specifies a condition that SMS usage be greater than 500. In this example, the combination of logic sub-portions 1010, 1012, 1014, 1016 together form a trigger, the satisfaction of which causes a detect module to execute and/or implement the corresponding outputs. In this example, logic sub-portions 1010, 1012, 1014, 1016 correspond to logic sub-portions 1018, 1020, 1022, 1024, 1025, which together specify a specific output. A detect module generates instructions indicative of the specific output and sends those instructions to the act module, e.g., to cause an implementation of the output and/or to customize the output and to send data indicative of the customized output (or the customized output itself) to an external system for execution. In this example, logic sub-portion 1018 specifies that a state of the executable logic is updated to a value of "NewCampaignState.SendOffer." Logic sub-portion 1020 specifies an action that an SMS message is sent. Logic sub-portion 1022 specifies the contents of the message. Logic sub-portion 1024 specifies an expiration date or value during which the message is active. Logic sub-portion 1025 specifies a fulfillment plan code. In this example, the combination of logic sub-portions 1018, 1020, 1022, 1024, 1025 together form the output that is implemented, e.g., upon satisfaction of the conditions specified in logic sub-portions 1010, 1012, 1014, 1016.

In an example, the palette displayed in portion 1002 is used in generating the logic included in logic sub-portions 1012, 1016, 1018, 1020, 1022, 1024. For example, the logic in logic sub-portion 1016 is generated by dragging and dropping data record 1040 into logic sub-portion 1016 (which in this example includes an editable cell). A user would then further edit logic sub-portion 1016 by entering text of ">500" into the editable cell that is logic sub-portion 1016. In this example, data record 1040 corresponds to a parameter in an associated dataflow graph or application. A user editing logic sub-portion 1016 then inputs a value for that parameter, namely, a value of ">500". Using the logic displayed in portion 1004, a CDA system generates an application or dataflow diagram to implement the logic, e.g., by setting values of parameters in parameterized logic to be those values displayed in portion 1004. In some examples, the executable logic may be specified as a flow chart, rather than being specified in a table.

Figure 10:
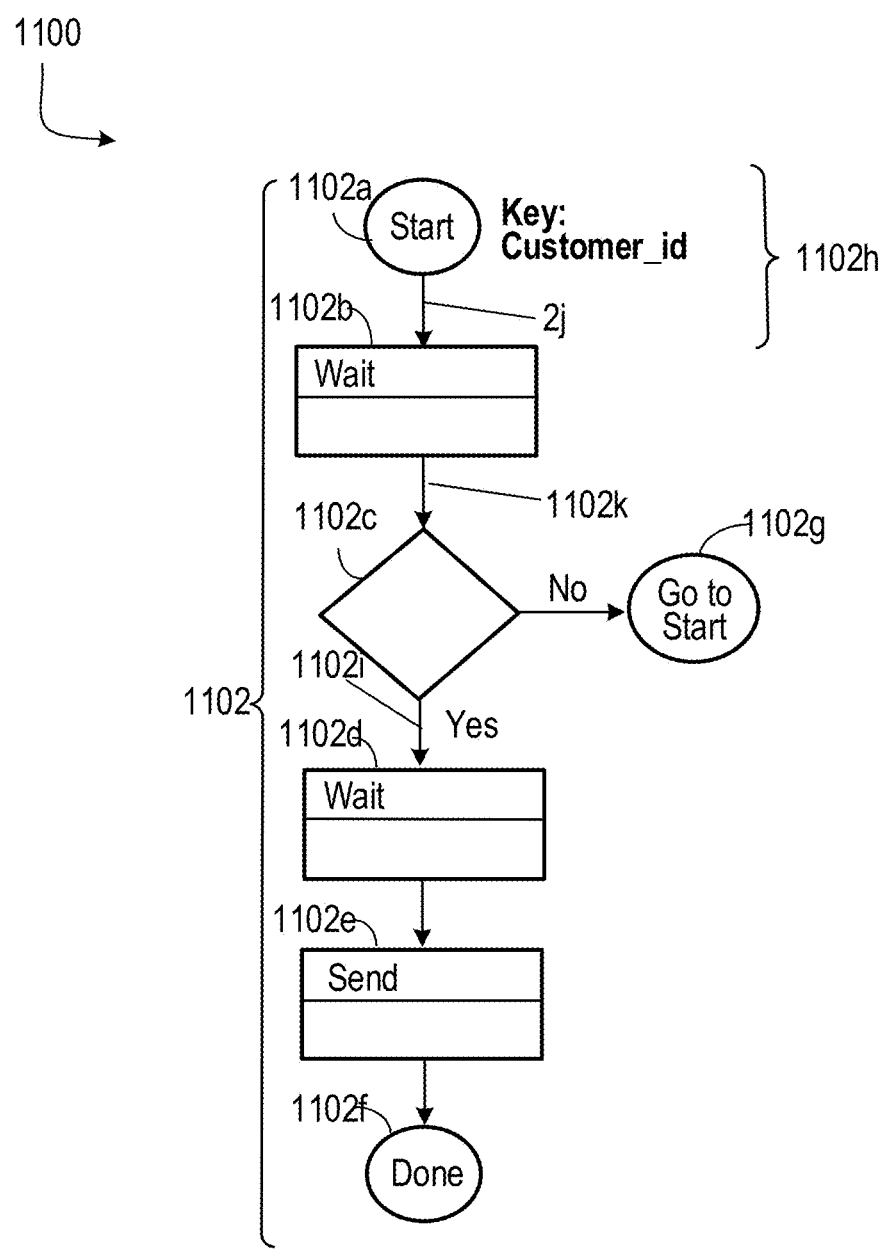
FIG. 10 is a diagram of a flowchart.

Referring to FIG. 10, specification 1100 includes flowchart 1102 with nodes 1102a-1102g. Generally, a chart includes an application, e.g., a parameterized application, for processing data records. In this example, the specification (e.g., input) of values for parameters of the parameterized application generates the specification. As described above, a specification represents executable logic and specifies various states of the executable logic, based on a state reached from executing the executable logic on prior data items. Generally, executable logic includes source code and other computer instructions. Each node in the chart represents one or more portions of the executable logic. For example, a node includes one or more logical expressions (hereinafter "logic") from which the executable logic is generated. In another example, a node corresponds to one or more particular portions of executable logic, when the executable logic is in a particular state. In this example, the executable logic in the chart is generated using the palette (described above), e.g., to select various inputs for inclusion in one or more nodes of the chart.

This application (represented by the chart) includes a graphic unit of logic for reacting to input data records and producing output data records, e.g., a data record generated based on logic included in a specification. Generally, a graphic unit of logic includes logic that is at least partly generated graphically, e.g., by dragging and dropping various nodes from an application (not shown) to a window for building a chart. In an example, a node includes logic (not shown) that specifies how input data records are processed, how to set values for variables used by the executable logic, which output data records to generate, e.g., upon satisfaction of conditions specified by the logic, and so forth. In an example, a node is programmable by a user inputting values of parameters and/or of variables used in the logic of a node.

The chart itself is executable, as the logic in the nodes is compiled into executable logic and as each node corresponds to one or more portions of that executable logic. For example, the system transforms the specification (and/or a chart in the specification) by compiling the logic in the nodes into executable logic. Because the chart itself is executable, the chart itself is capable of processing data records and of being stopped, started and halted. The system also maintains state for flowchart 1102, e.g., by tracking which one of nodes 1102a-1102g is currently being executed. A state of flowchart 1102 corresponds to a state of executable represented by flowchart 1102. For example, each node in flowchart 1102 represents a particular state of the executable logic (in which one or more portions of the executable logic are executable in that state). When flowchart 1102 is being executed for numerous values of a key, the system maintains a state of flowchart 1102 for each value of the key, e.g., by maintaining state for each instance—as described in further detail below. In this example, flowchart 1102 includes a state transition diagram in which each incoming data record drives transitions between nodes and data records are evaluated based on a state reached from processing prior data records. The links between nodes in flowchart 1102 represent the temporal flow of the logic.

Node 1102a represents a start of the executable logic. Following completion of node 1102a, the state of flowchart 1102 transitions to node 1102b, which represents one or more other portions of the executable logic. Node 1102b includes a wait node (hereinafter wait node 1102b). Wait node 1102b represents a wait state in which a portion of executable logic (corresponding to wait node 1102b) waits for an input data record satisfying one or more conditions. In an example, a wait state may be part of another state of flowchart 1102, e.g., a state in which the system executes a wait node (to implement a wait state) and then executes one or more other nodes. Following completion of the portion of executable logic represented by wait node 1102b, the system exits the wait state and executes node 1102c, which represents executable logic for implementing a decision. In this example, node 1102c includes a decision node. Generally, a decision node includes a node that includes logic for execution of a decision (e.g., logic that evaluates to a Boolean value).

Based on an outcome of the decision, the state of flowchart 1102 transitions to node 1102g (which causes state to transition back to node 1102a) or to node 1102d, which is another wait node. Following completion of the portion of executable logic represented by wait node 1102d, the state of flowchart 1102 transitions to node 1102e, which includes a send node. Generally, a send node includes a node that represents executable logic for causing data transmission to another system. Following completion of execution of the portion of executable logic represented by node 1102e, the state of flowchart 1102 transitions to node 1102f, which includes a done node. Generally, a done node represents that execution of the executable logic is complete.

In an example, a wait node represents a transition between states, e.g., a transition from one state to another state, the start of which is the wait node. In this example, flowchart 1102 differs from a state transition diagram, because not every node in flowchart 1102 represents a wait node that represents a state transition. Rather, some nodes represent actions to be performed, e.g., when flowchart 1102 is already in a particular state. In some examples, the system processes flowchart 1102 to generate a state machine diagram or state machine instructions.

In this example, flowchart 1102 includes two states, a first state represented by nodes 1102b, 1102c, 1102g and a second state represented by nodes 1102d, 1102e, 1102f. In this first state, the system waits for particular data records (as represented by node 1102b) and then executes node 1102c, which in turn causes a transition (of specification 1100 and/or of chart 1102) to the second state (the start of which is represented by node 1102d) or causes execution of node 1102g. Once in the second state, the system again waits for particular data records (as represented by node 1102d) and then executes nodes 1102e, 1102f. By including nodes other than wait nodes, flowchart 1102 includes a logic graph of temporal processing of data records. In this example, chart 1102 includes link 2i, which represents a transition of chart 1102 from the first state to the second state and also represents a flow of data from node 1102c to node 1102d.

Chart 1102 also includes link 1102j between nodes 1102a, 1102b and link 1102k between nodes 1102b, 1102c to represent a user-specified execution order for a portion of executable logic in the first state, which corresponds to nodes 1102a, 1102b, 1102c. In this example, the portion of executable logic in the first state (hereinafter "first state executable logic") includes statements (e.g., logical statements, instructions, and so forth (collectively referred to herein as "statements," without limitation)). Generally, an execution order includes an order in which executable logic and/or statements are executed. Each of nodes 1102a, 1102b, 1102c corresponds to one or more of those statements (e.g., to one or more portions of the first state executable logic). As such, link 1102j represents an execution order of the first state executable logic by representing that the statements in the first state executable logic represented by node 1102a are executed by the system before execution of other statements in the first state executable logic represented by node 1102b. Link 1102k also represents an execution order of the first state executable logic by representing that the statements in the first state executable logic represented by node 1102b are executed by the system before execution of other statements in the first state executable logic represented by node 1102c.

Specification 1100 also includes key 1102h that identifies that flowchart 1102 processes data records that include key 1102h or are associated with key 1102h. In this example, a custom identifier (ID) is used as the key. The key 1102h can correspond to one of the fields of a data record (i.e., a data record field), e.g., such as a subscriber_ID field, a customer_ID field, a session_ID field and so forth. In this example, the customer_ID field is a key field. For a particular data record, the system determines a value of a key for that data record by identifying the value of the key field for that data record.

In this example, flowchart 1102 subscribes to data records that are of a specified type (e.g., specified when flowchart 1102 is configured). In this example, flowchart 1102 subscribes to data records that include key 1102h. In this example, flowchart 1102 and the data records share a key. Generally, a flowchart subscribes to types of data records by including logic to process those data records that include the key of the flowchart. When data record processing begins, the system starts new flowchart instances for each new value of the key for that flowchart, e.g., by maintaining state of the executable logic (represented in the flowchart) for each new value of the key. The system performs data record processing by configuring the flowchart instances (and thus the underlying executable logic) to respond to data records for a particular key value. In an example, a flowchart subscribes to customer short message service (SMS) data records. The flowchart instance for a particular customer ID manages data records for that customer. There can be as many flowchart instances as there are customer IDs encountered in the incoming data records. In some examples, the system described herein provides a user interface for configuration of flowchart 1102, e.g., to enable a user to easily input values into various components of the flowchart.

Figure 11:
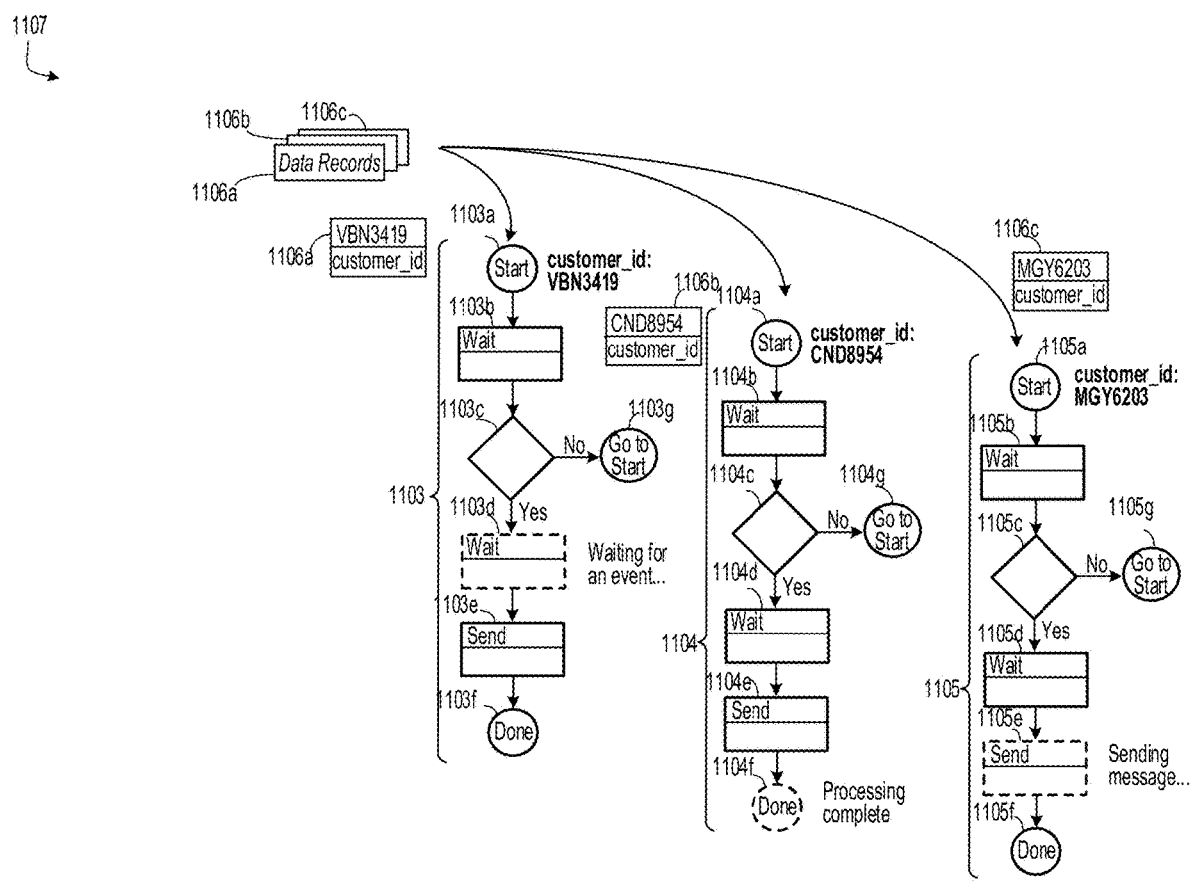
FIG. 11 is a diagram of flowchart instances.

Referring to FIG. 11, diagram 1107 illustrates flowchart instances 1103, 1104, 1105, e.g., which are generated by the system from flowchart 1102 (FIG. 10), and data records 1106a, 1106b, 1106c. That is, new copy or instance of flowchart 1102 is created for each new key detected in data records 1106a, 1106b and 1106c.

Each of flowchart instances 1103, 1104, 1105 is associated with a "customer_id" key. Flowchart instance 1103 processes data records that include a value of "VBN3419" in its "customer_id" field, which in this example is the key field. Flowchart instance 1104 processes data records that include a value of "CND8954" in its "customer_id" field. Flowchart instance 1105 processes data records that include a value of "MGY6203" in its "customer_id" field. In this example, a system does not re-execute the executable logic for each flowchart instance. Rather, the system executes the executable logic and then implements the flowchart instances by maintaining state for respective values of the keys. Accordingly, an example of "a flowchart instance processing data records" is the system executing the executable logic (that is represented by a flowchart), maintaining state for each value of a key and processing data records associated with a particular value of the key (based on a state of the state machine for that particular value of the key).

In this example, flowchart instance 1103 includes nodes 1103a-3g, which correspond to nodes 1102a-1102g in FIG. 10, respectively. Flowchart instance 1104 includes nodes 1104a-4g, which correspond to nodes 1102a-1102g in FIG. 10, respectively. Flowchart instance 1105 includes nodes 1105a-1105g, which correspond to nodes 1102a-1102g in FIG. 10, respectively.

Flowchart instances are themselves executable. After the system receives an input data record associated with a particular value of a key, a flowchart instance for that particular value of the key processes the input data record, e.g., by a system executing one or more portions of executable logic corresponding to a flowchart instance (or to one or more nodes of the flowchart instance). The flowchart instance continues processing the input data record, until the input data record reaches a done node or a wait node. In this example, the flowchart instance continues processing the input data record, e.g., by the system continuing to process the input data record until a portion of the executable logic corresponding to a done node or a wait node is reached. If an input data record reaches a wait node, the flowchart instance pauses until a certain amount of time passes or an appropriate new input data record arrives. Generally, an appropriate data record includes a data record that satisfies one or more specified conditions or criteria (e.g., included in the logic of a node). If an input data record reaches a done node, execution of the flowchart instance is complete.

A flowchart instance has its own lifecycle. As data records arrive, a current state or status of the flowchart instance changes: data records trigger decisions, or a return to a start of the flowchart instance, or a message sent to a customer. The flowchart instance for the customer ends when a data record reaches a done node.

In this example, the system starts flowchart instance 1103 for a "VBN3419" value of the key field (e.g., customer_id=VBN3419). Flowchart instance 1103 processes a subset of data records 1106a, 1106b, 1106c that include a customer_id of VBN3419. In this example, flowchart instance 3 processes data record 1106a, with a value of "VBN3419" in the customer_id key field. Nodes 1103a, 1103*b*, 1103*c* of flowchart instance 1103 process data record 1106*a*. A current state of flowchart instance 1103 is that of waiting for a data record, as represented by the dashed line of node 1103*d*. Upon reaching node 1103*d*, flowchart instance 1103 waits for another data record with customer ID=VBN3419 to process through nodes 1103*d*, 1103*e*, 1103*f* of flowchart instance 1103.

The system starts flowchart instance 1104 for a "CND8954" value of the key (e.g., customer_id=CND8954). Flowchart instance 1104 processes a subset of data records 1106*a*, 1106*b*, 1106*c* that include a customer_id of CND8954. In this example, flowchart instance 4 includes wait nodes 1104*b* and 1104*d*. Each data record can only satisfy the condition of one wait node per flowchart instance. Accordingly, flowchart instance 1104 processes data record 1106*b* with a customer_id=CND8954 through node 1104*b* to node 1104*d* and then waits for a second data record with the same key before proceeding to node 1104*f*. The system starts flowchart instance 1105 for a "MGY6203" value of the key (e.g., customer ID=MGY6203). Flowchart instance 1105 processes a subset of data records 1106*a*, 1106*b*, 1106*c* that include a customer_id of MGY6203. In this example, flowchart instance 1105 processes data record 1106*c* with a customer_id=MGY6203 through nodes 1105*b*-1105*d* and then waits for a second data record with the same key before proceeding to node 1105*e*, in which a message is sent. In this example, the system does not stop at a non-wait node and thus does not stop at node 1105*e*, but rather sends the message and then proceeds to node 1105*f*.

In a variation of FIG. 11, the system generates more than one flowchart instance for a single key value. For example, there can be a number of flowchart instances for the same customer that have different start and end dates, or a number of flowchart instances for the same customer for different marketing campaigns.

In this example, the system maintains states for the instances by storing, in a data repository or in an in-memory data grid, state data, e.g., data indicative of which node is currently being executed for each instance. Generally, state data includes data indicative of a state. In this example, an instance is associated with value of the key. The data repository or the in-memory data grid stores the values of the key. The system maintains state for the instances by storing state data for each value of the key. Upon completion of processing a data record for a particular value of the key, the system updates the state data, in the data repository, to specify that the next node (in flowchart 1102) represents a current state for that value of the key. Then, when another data record arrives, the system looks-up, in the data repository, the current state for that value of the key and executes portions of executable logic corresponding to a node that represents the current state of the executable logic for that value of the key.

Figure 12:
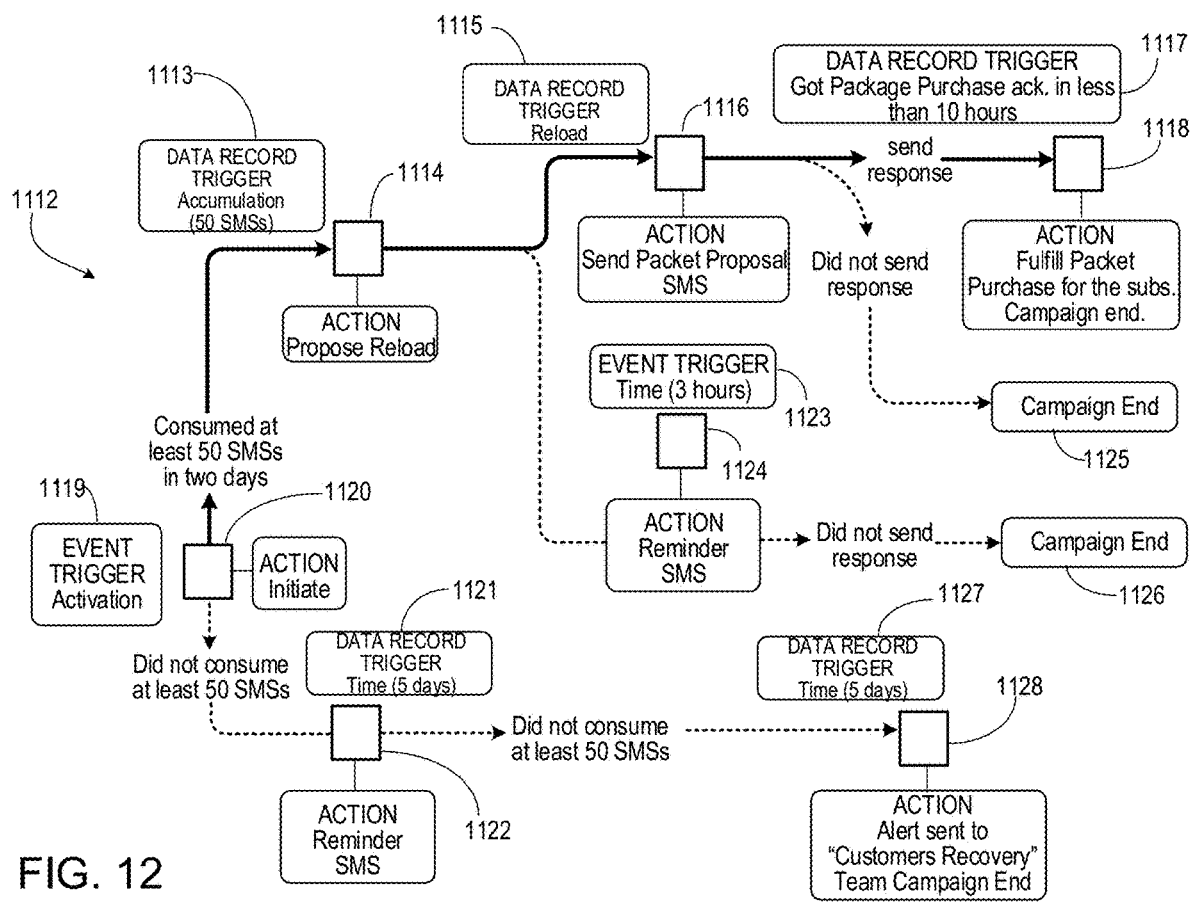
FIG. 12 is a diagram of near real-time logic execution with a wide record.

Referring to FIG. 12, logical flow 1112 is based on execution of logic (e.g., rule-based logic generated using the above-described palette) that uses a wide record generated using the above-described techniques in its execution. In this example, logical flow 1112 specifies various data record triggers and actions, based on data records included in the data record for one or more particular subscribers. Logical flow 1112 includes various decision points (e.g., "did a subscriber consumer fifty SMS messages?"). For a particular key, detect module decides which branch of logical flow 1112 to traverse based on the data records (or lack thereof) included in the data record for the subscriber and based on a state of the executable logic for that key. Generally, state refers to a particular component (for example, a particular data record trigger or a particular action) to the logic has transitioned during execution of the logic. For example, the state specifies which data record trigger or action in the logic is currently being executed for a particular key. In some examples, detect module waits for specified periods of time before selecting a branch in logical flow 1112. By waiting for these specified periods of time, detect module analyzes new data records that are inserted into the data records.

In this example, logical flow 1112 includes data record trigger 1119 that specifies that upon activation of service for a particular subscriber, act module performs initiation action 1120 of monitoring an amount of SMS messages consumed by the particular subscriber in two days. In this example, data record trigger 1119 is a condition precedent of a rule being executed by logical flow 1112. Upon satisfaction of data record trigger 1119, act module executes initiation action 1120. Detect module determines when a particular subscriber satisfies data record trigger 1119 by detecting an activation data record in the wide record and determines a subscriber (via subscriber_ID) associated with the activation data record.

In this example, when the subscriber has consumed at least fifty SMS messages in the last two days (e.g., as specified by a SMS usage data record aggregate in the data record), data record trigger 1113 is executed. Data record trigger 1113 executes proposed reload action 1114, which causes act module to prompt this particular subscriber to reload. When the subscriber does perform a reload, the entry in the data record for that particular subscriber is updated with a data record representing the reload. This updating of the data record causes logical flow 1112 to execute data record trigger 1115, which specifies that upon successful reload to execute action 1116 to send a packet proposal SMS to the subscriber. Generally, a packet proposal is a proposal to purchase a package or bundle service.

When the user sends a response to the package proposal SMS, the data record is updated with a data record that represents the response and that represents the response being received in less than three hours. Detect module detects the update in the data record and cause data record trigger 1117 to execute. Data record trigger 1117 specifies that when the response is received in less than ten hours to execute action 1118 of ending the campaign (for that particular subscriber), as the subscriber as fulfilled the package purchase. When the entry for the particular subscriber in the data record specifies that the particular subscriber did not send a response to action 1116, logical flow 1112 also specifies action 1125 of ending the campaign for that particular subscriber.

In an example, the entry for the particular subscriber in the data record specifies that the subscriber did not perform a reload, e.g., via an absence of a reload data record or via a derived data record that specifies an absence of the reload. In this example, logical flow 1112 specifies data record trigger 1123 of waiting for three hours, e.g., to monitor whether the user performs the reload in the next three hours. After the three hours, data record trigger 1123 causes reminder action 1124 to be performed of sending a reminder SMS to reload to the subscriber. If the subscriber does not respond to the reminder SMS, logical flow 1112 specifies action 1126 of ending the campaign for that particular subscriber.

In response to action 1120, an entry for the particular subscriber may specify that the subscriber did not consume at least fifty SMSs in the last two days. The entry may specify this via a derived data record that specifies a lack of consumption of fifty SMSs or via a SMS usage aggregate data record that specifies that the consumption was less than fifty SMSs. In this example, logical flow 1112 includes data record trigger 1121 of waiting five days and then implementing action 1122 of sending a reminder SMS. If after sending the reminder, the subscriber still has not consumed fifty SMSs within another five days (e.g., as specified by data records for that subscriber in the data record), logical flow 1112 specifies data record trigger 1127 of performing action 1128 of sending an alert to the a customer recovery team (e.g., to notify the team that the consumer is not using the service) and ending the campaign for that particular subscriber.

Figure 13:
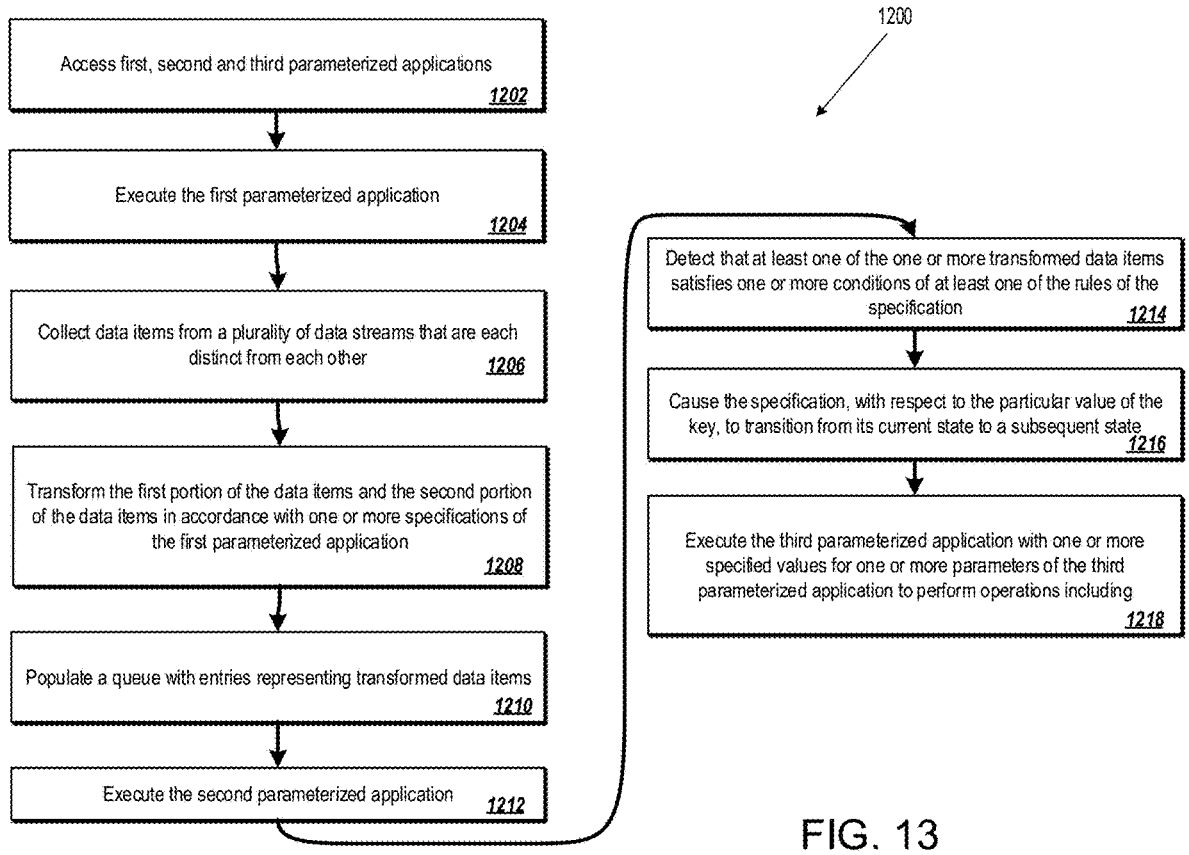
FIG. 13 is a diagram of an example process of processing keyed data with parameterized logic.

Referring to FIG. 13, a system (e.g., a CDA system as described herein, e.g., system 100) implements process 1200 in processing data items in a plurality of distinct data streams. In operation, the system accesses (1202) first, second and third parameterized applications (e.g., parameterized applications). In this example, each of the parameterized applications includes one or more parameters defining one or more properties of that parameterized application.

The system (or the collect module 114 of the system described above) executes (1204) the first parameterized application with one or more specified values for one or more parameters of the first parameterized application to implement a collect module (e.g., the collect module 114 of the system described above) for processing of data records. In an example, the first parameterized application includes dataflow graph 910 (FIG. 9). In this example, values of one or more parameters of dataflow graph 910 are specified by input of values into one or more of portions 902, 904, 906, 908. In this example, portions 902, 904, 906, 908 provide for input of one or more values into one or more selectable and/or editable areas of portions 902, 904, 906, 908. These selectable and/or editable areas are mapped or otherwise associated with parameters of dataflow graph 910, e.g., to enable the setting of values of these parameters.

The system (or the collect module 114 of the system described above) performs the processing by collecting (1206) data items (e.g., data records) from a plurality of data streams that are each distinct (e.g., different) from each other. In this example, a format of a first portion of the data items collected from one stream differs from a format of a second portion of the data items collected from a different stream. Additionally, a data item is associated with a value of a key and thus can be referred to as keyed data. The system (or the collect module 114 of the system described above) also transforms (1208) the first portion of the data items and the second portion of the data items in accordance with one or more specifications of the first parameterized application. In an example, the system transforms the data items (or portions thereof) by formatting the data into a format appropriate for a collect module, a detect module and/or an act module (e.g., the collect module 114, detect module 116 and/or act module 118 described above). By doing so, the system solves the problem of data integration and preparation for data record management without the need for additional technologies as described above. This capability simplifies and accelerates end-to-end integration, as previously described. In particular, the received data records need to only be formatted and verified once (e.g., by a collect module 114) and then can be processed by the collect module, the detect module and the act module (e.g., the collect module 114, detect module 116 and/or act module 118 described above). In conventional methodologies, separate systems perform the collection, detection and action. As such, the data needs to be formatted for the collection aspect, then formatted again into a format that is appropriate for the detection aspect and formatted yet again for a format that is appropriate for the action aspect. This repetitive formatting and re-formatting introduces significant latency into performance of collection, detection and action, and recording real-time action (or near real-time) as data records are received. This repetitive formatting and re-formatting also consumes significant bandwidth and system memory resources. Accordingly and contrary to conventional methodologies, the systems described herein provide for decreased bandwidth and memory consumptions, as well as decreased latency times in processing—which provide for execution of real-time actions.

The collect module also performs transformation by parsing, validating and enriching (as appropriate) with more slow changing data (e.g., profile data from a data store) the received data records. As previously described, this enrichment includes generation of all data records in the data record palette (or a subset thereof) to enable real-time execution of logic against the received data records, without latency of performing database lookups to retrieve data required for logic execution. The system stores these validated and enriched data records in memory, e.g., to enable real-time detection. The system also stores these validated and enriched data records to disk for archiving and to assure graceful recover. The collect module is configured to process numerous data sources (and/or virtually any data source), thereby enabling fast and independent integration into a CDA system, while handling the complexities of arbitrarily large data volumes, low latency and multiple data formats. Following transformation of the collected data records, the collect module populates (1210) a queue with entries representing the transformed data items. The queue then transmits the data items to a second parameterized application, e.g., the detect module.

In this example, the system executes (1212) the second parameterized application, e.g., to implement the detect module (e.g., detect module 116 described above). In particular, the system executes the second parameterized application with one or more specified values for one or more parameters of the second parameterized application to process the transformed data items in the queue. In this example, the second parameterized application represents a specification including rules and respective conditions for the rules. Additionally, states of the specification are maintained for respective values of the key.

In an example, processing of the transformed data items in the queue includes the following. For one or more transformed data items associated with a particular value of the key, the system (and/or a detect module of the system) detects (1214) that at least one of the one or more transformed data items satisfies one or more conditions of at least one of the rules of the specification. Responsive to detecting, the detect module generates an output specifying execution of one or more actions and publishes that output to a queue. For example, the output may be a message or an offer for a user. In an example, the output is tracked by the CDA system, as well as one or more user actions (or an absence thereof) with regard to the output. The tracking of these user actions provide a feedback lookup to the CDA system, in which the CDA system tracks the output and then receives data (e.g., from an external system or from the CDA systems itself) that specifies delivery of the output, one or more user interactions with the output, one or more actions with regard to the output, and so forth. The detect module also causes (1216) the specification, with respect to the particular value of the key, to transition from its current state to a subsequent state. For example, portion 1004 of FIG. 9 displays state portion 1006*a* that is indicative of a current state of executable logic. Portion 1004 also displays state portion 1008*a* that is indicative of a subsequent state or a state to which the executable logic transitions.

In this example, the system also executes (1218) a third parameterized application with one or more specified values for one or more parameters of the third parameterized application to perform operations including: sending one more instruction to cause execution of the one or more actions. In this example, the third parameterized application implements the act module. As previously described, this act module customizes the output and sends it to a user and/or transmits the customized output to an external system.

The techniques described above can be implemented using software for execution on a computer. For instance, the software forms procedures in one or more computer programs that execute on one or more programmed or programmable computer systems (which can be of various architectures such as distributed, client/server, or grid) each including at least one processor, at least one data storage system (including volatile and non-volatile memory and/or storage elements), at least one input device or port, and at least one output device or port. The software can form one or more modules of a larger program, for example, that provides other services related to the design and configuration of charts and flowcharts. The nodes, links and elements of the chart can be implemented as data structures stored in a computer readable medium or other organized data conforming to a data model stored in a data repository.

The techniques described herein can be implemented in digital electronic circuitry, or in computer hardware, firmware, software, or in combinations thereof. An apparatus can be implemented in a computer program product tangibly embodied or stored in a machine-readable storage device (e.g., a non-transitory machine-readable storage device, a machine-readable hardware storage device, and so forth) for execution by a programmable processor; and method actions can be performed by a programmable processor executing a program of instructions to perform functions by operating on input data and generating output. The embodiments described herein, and other embodiments of the claims and the techniques described herein, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method or parts thereof may use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Sun, Linux, and Macintosh may also be used. Computer users can view information available on servers or networks on the Web through the use of browsing software, such as Firefox, Netscape Navigator, Microsoft Internet Explorer, or Mosaic browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description and the claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of embodiments of the invention have been described. Nevertheless, it will be understood by one of ordinary skill in the art that various modifications may be made without departing from the spirit and scope of the claims and the techniques described herein.

What is claimed is:

1. A method for processing keyed data items that are each associated with a value of a key, the processing including collecting the keyed data items, determining, based on contents of at least one of the keyed data items, satisfaction of one or more specified conditions for execution of one or more actions and causing execution of at least one of the one or more actions responsive to the determining, the method including:
   accessing first, second and third parameterized applications that include respective first, second and third specifications;
   wherein the first specification specifies one or more parameters defining one or more properties of the first parameterized application and one or more respective values for those one or more parameters;
   wherein the second specification specifies one or more parameters defining one or more properties of the second parameterized application and one or more respective values for those one or more parameters, wherein the second specification includes rules and respective conditions for the rules;
   wherein the third specification specifies one or more parameters defining one or more properties of the third parameterized application and one or more respective values for those one or more parameters;
   maintaining states of the second specification for respective values of the key, with a state for a particular value of the key specifying one or more portions of the second specification to be executed by the second parameterized application in that state;
   executing the first parameterized application with the one or more values for the one or more parameters specified by the first specification to perform processing including:
      collecting data items from one or more data sources and one or more data streams, a plurality of data sources or a plurality of data streams, wherein a format of a first data item collected differs from a format of a second data item collected, and wherein a data item is associated with a value of a key;
      transforming the first and second data items in accordance with the first specification of the first parameterized application to obtain transformed data items; and
      populating a queue with the transformed data items;
   dynamically executing the second parameterized application with the one or more values for the one or more parameters specified by the second specification to process the transformed data items in the queue, by storing, in an in memory data store accessible by the second parameterized application, information associated with one or more of the transformed data items and data specifying a state of the second parameterized application for the particular value of the key, with processing of the transformed data items including:
      for one or more of the transformed data items associated with a particular value of the key,
         identifying a current state, with respect to the particular value of the key, of the second specification;
         identifying one or more rules in a portion of the second specification to be executed in the current state;
         executing the one or more rules identified;
         determining that at least one of the one or more transformed data items satisfies one or more conditions of at least one of the one or more rules executed in the current state;
         responsive to the determining, generating a data structure specifying execution of one or more actions;
         causing the second specification, with respect to the particular value of the key, to transition from its current state to a subsequent state; and
         transmitting, to the third parameterized application, the generated data structure; and
   executing the third parameterized application with the one or more values for the one or more parameters specified by the third specification to perform operations including:
      based on at least one of the one or more actions specified in the data structure, sending one or more instructions to cause execution of the at least one of the one or more actions.

2. The method of claim 1, further including:
   during operation of one or more user interfaces, displaying one or more user interface elements for specifying one or more values of the one or more parameters for each of the first, second and third parameterized applications.

3. The method of claim 2, wherein executing the first parameterized application includes executing the first parameterized application with one or more values specified by the one or more user interface elements for the one or more parameters of the first parameterized application.

4. The method of claim 2, wherein executing the second parameterized application includes executing the second parameterized application with one or more values specified by the one or more user interface elements for the one or more parameters of the second parameterized application, wherein the one or more specified values are used as input by the rules in determining whether the one or more conditions are satisfied.

5. The method of claim 2, wherein executing the third parameterized application includes executing the third parameterized application with one or more values specified by the one or more user interface elements for the one or more parameters of the third parameterized application.

6. The method of claim 1, wherein a data item includes a data record and wherein the transforming includes reformatting the data record in accordance with a format specified by the first specification of the first parameterized application.

7. The method of claim 6, further including:
   based on execution of the second parameterized application, enriching the data record with data from a profile of a user associated with the data record, with the enriching being in accordance with instructions specified by the second specification of the second parameterized application to retrieve, from memory, profile data for the user and to populate one or more fields of the data record with the retrieved profile data.

8. The method of claim 1, wherein a parameterized application includes an application for data processing, with the application including one or more parameters that are configurable with one or more values.

9. The method of claim 1, further including executing a feedback loop to one or more third party systems for requesting confirmation of execution of the one or more actions.

10. The method of claim 1, further including:
generating, based on execution of the second parameterized application, one or more key performance indicators (KPIs) for the particular value of the key, with a KPI specifying one or more values of data items associated with the particular value of the key.

11. The method of claim 10, further including receiving data for the particular value of the key, with the received data being indicative of feedback with regard to at least one of the one or more actions; and
updating a KPI for the particular value of the key with the feedback data by aggregating one or more portions of data included in or associated with the KPI with the received data.

12. The method of claim 1, wherein the one or more actions include one or more of sending a text message to an external device, sending an email to an external system, opening a ticket for a work order in a case management system, cutting a mobile telephone connection, providing a web service to a targeted device, transmitting a data packet of the one or more transformed data items with a notification, and executing a data processing application that is hosted on one or more external computers on the one or more transformed data items.

13. The method of claim 1, wherein the one or more instructions are sent via a network connection to cause execution of at least one of the one or more actions on an external device, the method further including:
receiving a feedback message indicating whether the at least one of the one or more actions (i) were successfully completed, or (ii) failed.

14. The method of claim 13, wherein the at least one of the one or more actions are considered failed if a portion of the at least one of the one or more actions was not completed, wherein the feedback message indicates which portion of the at least one of the one or more failed actions was not completed.

15. The method of claim 13, wherein the feedback message indicates result data of the successfully completed and/or failed at least one of the one or more actions.

16. The method of claim 15, further including:
changing the one or more specified values for one or more parameters of the first, second, and/or third parameterized applications based on the result data; and
re-executing the first, second and/or third parameterized applications with the changed one or more specified values.

17. The method of claim 1, wherein the one or more instructions are sent via a network connection to cause execution of the one or more actions on an external device, the method further including:
receiving, from the external device, a feedback message including result data of the executed at least one of the one or more actions;
comparing the result data with predetermined data associated with a successful completion of the execution of the at least one of the one or more actions; and
determining that the execution of the at least one of the one or more actions was successfully completed, or that the execution of the at least one of the one or more actions failed, based on the comparison.

18. The method of claim 17, further including:
changing the one or more specified values for one or more parameters of the first, second, and/or third parameterized applications based on the result data; and
re-executing the first, second and/or third parameterized applications with the changed one or more specified values.

19. The method of claim 17, wherein the execution of the at least one of the one or more actions is determined as successfully completed if the result data deviates from the predetermined data less than a predetermined amount, and wherein the execution of the at least one of the one or more actions is determined as failed if the result data deviates from the predetermined data at least by a predetermined amount.

20. The method of claim 19, further including:
during operation of one or more user interfaces, displaying one or more user interface elements for specifying the predetermined data and the predetermined amount.

21. The method of claim 13, further including:
during operation of one or more user interfaces, outputting, via one or more displayed user interface elements, whether the at least one of the one or more actions (i) were successfully completed, or (ii) failed.

22. The method of claim 15, further including:
during operation of one or more user interfaces, outputting, via one or more displayed user interface elements, the result data.

23. The method of claim 22, further including:
receiving, via one or more displayed user interface elements, user-specified changes to one or more specified values for one or more parameters of the first, second, and/or third parameterized applications based on the result data; and
re-executing the first, second and/or third parameterized applications with the changed one or more specified values.

24. The method of claim 1, wherein the sending of the one or more instructions to cause execution of the at least one of the one or more actions is performed automatically by the third parameterized application by using the output specifying execution of the one or more actions as input.

25. The method of claim 1, wherein the execution of the at least one of the one or more actions is performed by an external system.

26. The method of claim 1, wherein the first parameterized application is executed on receipt of a specified event or at a specified time.

27. The method of claim 1, further including:
following determination that the at least one of the one or more transformed data items satisfies the one or more conditions, updating data representing a key performance indicator (KPI) with data specifying that the at least one of the one or more transformed data items satisfies the one or more conditions.

28. The method of claim 1, wherein the one or more transformed data items include an updated key performance indicator (KPI) that includes aggregated performance data for the value of the key and wherein the method further includes:

determining that the updated KPI satisfies one or more conditions of at least one of the one or more rules executed in the current state.

29. The method of claim 28, further including:
recording in memory data specifying that a transformed data item satisfies one or more conditions of at least one of the one or more rules.

30. The method of claim 1, based on execution of the first parameterized application, enriching a transformed data item with data from a profile of a user associated with value of a key also associated with the transformed data item.

31. The method of claim 1, wherein executing the second parameterized application further includes:
for the one or more of the transformed data items associated with the particular value of the key, processing the one or more of the transformed data items stored in the in-memory data storage in accordance with the saved state data for the particular value of the key.

32. An electronic system for processing keyed data items that are each associated with a value of a key, the keyed data items being from a plurality of distinct data streams, the processing including collecting the keyed data items, determining, based on contents of at least one of the keyed data items, satisfaction of one or more specified conditions for execution of one or more actions and causing execution of at least one of the one or more actions responsive to the determining, the electronic system including:
one or more processing devices; and
one or more machine-readable non-transitory hardware storage devices storing instructions that are executable by the one or more processing devices to perform operations including:
accessing first, second and third parameterized applications that include respective first, second and third specifications;
wherein the first specification specifies one or more parameters defining one or more properties of the first parameterized application and one or more respective values for those one or more parameters;
wherein the second specification specifies one or more parameters defining one or more properties of the second parameterized application and one or more respective values for those one or more parameters, wherein the second specification includes rules and respective conditions for the rules;
wherein the third specification specifies one or more parameters defining one or more properties of the third parameterized application and one or more respective values for those one or more parameters;
maintaining states of the second specification for respective values of the key, with a state for a particular value of the key specifying one or more portions of the second specification to be executed by the second parameterized application in that state;
executing the first parameterized application with the one or more values for the one or more parameters specified by the first specification to perform processing including:
collecting data items from one or more data sources and one or more data streams, a plurality of data sources or a plurality of data streams, wherein a format of a first data item collected differs from a format of a second data item collected, and wherein a data item is associated with a value of a key;
transforming the first and second data items in accordance with the first specification of the first parameterized application to obtain transformed data items; and
populating a queue with the transformed data items;
dynamically executing the second parameterized application with the one or more values for the one or more parameters specified by the second specification to process the transformed data items in the queue, by storing, in an in-memory data store accessible by the second parameterized application, information associated with one or more of the transformed data items and data specifying a state of the second parameterized application for the particular value of the key, with processing of the transformed data items including:
for one or more of the transformed data items associated with a particular value of the key,
identifying a current state, with respect to the particular value of the key, of the second specification;
identifying one or more rules in a portion of the second specification to be executed in the current state;
executing the one or more rules identified;
determining that at least one of the one or more transformed data items satisfies one or more conditions of at least one of the one or more rules executed in the current state;
responsive to the determining, generating a data structure specifying execution of one or more actions;
causing the second specification, with respect to the particular value of the key, to transition from its current state to a subsequent state; and
transmitting, to the third parameterized application, the generated data structure; and
executing the third parameterized application with the one or more values for the one or more parameters specified by the third specification of to perform operations including:
based on at least one of the one or more actions specified in the data structure, sending one or more instructions to cause execution of the at least one of the one or more actions.

33. The electronic system of claim 32, wherein the operations further include:
during operation of one or more user interfaces, displaying one or more user interface elements for specifying one or more values of the one or more parameters for each of the first, second and third parameterized applications.

34. The electronic system of claim 33, wherein executing the first parameterized application includes executing the first parameterized application with one or more values specified by the one or more user interface elements for the one or more parameters of the first parameterized application.

35. The electronic system of claim 33, wherein executing the second parameterized application includes executing the second parameterized application with one or more values specified by the one or more user interface elements for the one or more parameters of the second parameterized application, wherein the one or more specified values are used as input by the rules in determining whether the one or more conditions are satisfied.

36. The electronic system of claim 33, wherein executing the third parameterized application includes executing the third parameterized application with one or more values specified by the one or more user interface elements for the one or more parameters of the third parameterized application.

37. The electronic system of claim 32, wherein a data item includes a data record and wherein the transforming includes reformatting the data record in accordance with a format specified by the first specification of the first parameterized application.

38. The electronic system of claim 37, wherein the operations further include:
based on execution of the second parameterized application, enriching the data record with data from a profile of a user associated with the data record, with the enriching being in accordance with instructions specified by the second specification of the second parameterized application to retrieve, from memory, profile data for the user and to populate one or more fields of the data record with the retrieved profile data.

39. The electronic system of claim 32, wherein a parameterized application includes an application for data processing, with the application including one or more parameters that are configurable with one or more values.

40. The electronic system of claim 32, wherein the operations further include executing a feedback loop to one or more third party systems for requesting confirmation of execution of the one or more actions.

41. One or more machine-readable non-transitory hardware storage devices for processing keyed data items that are each associated with a value of a key, the keyed data items being from a plurality of distinct data streams, the processing including collecting the keyed data items, determining, based on contents of at least one of the keyed data items, satisfaction of one or more specified conditions for execution of one or more actions and causing execution of at least one of the one or more actions responsive to the determining, the one or more machine-readable hardware storage devices storing instructions that are executable by one or more processing devices to perform operations including:
accessing first, second and third parameterized applications that include respective first, second and third specifications;
wherein the first specification specifies one or more parameters defining one or more properties of the first parameterized application and one or more respective values for those one or more parameters;
wherein the second specification specifies one or more parameters defining one or more properties of the second parameterized application and one or more respective values for those one or more parameters, wherein the second specification includes rules and respective conditions for the rules;
wherein the third specification specifies one or more parameters defining one or more properties of the third parameterized application and one or more respective values for those one or more parameters;
maintaining states of the second specification for respective values of the key, with a state for a particular value of the key specifying one or more portions of the second specification to be executed by the second parameterized application in that state;
executing the first parameterized application with the one or more values for the one or more parameters specified by the first specification to perform processing including:
collecting data items from one or more data sources and one or more data streams, a plurality of data sources or a plurality of data streams, wherein a format of a first data item collected differs from a format of a second data item collected, and wherein a data item is associated with a value of a key;
transforming the first and second data items in accordance with the first specification of the first parameterized application to obtain transformed data items; and
populating a queue with the transformed data items;
dynamically executing the second parameterized application with the one or more values for the one or more parameters specified by the second specification to process the transformed data items in the queue, by storing, in an in-memory data store accessible by the second parameterized application, information associated with one or more of the transformed data items and data specifying a state of the second parameterized application for the particular value of the key, with processing of the transformed data items including:
for one or more of the transformed data items associated with a particular value of the key,
identifying a current state, with respect to the particular value of the key, of the second specification;
identifying one or more rules in a portion of the second specification to be executed in the current state;
executing the one or more rules identified;
determining that at least one of the one or more transformed data items satisfies one or more conditions of at least one of the one or more rules executed in the current state;
responsive to the determining, generating a data structure specifying execution of one or more actions;
causing the second specification, with respect to the particular value of the key, to transition from its current state to a subsequent state; and
transmitting, to the third parameterized application, the generated data structure; and
executing the third parameterized application with the one or more values for the one or more parameters specified by the third specification of to perform operations including:
based on at least one of the one or more actions specified in the data structure, sending one or more instructions to cause execution of the at least one of the one or more actions.

42. The one or more machine-readable hardware storage devices of claim 41, wherein the operations further include:
during operation of one or more user interfaces, displaying one or more user interface elements for specifying one or more values of the one or more parameters for each of the first, second and third parameterized applications.

43. The one or more machine-readable hardware storage devices of claim 42, wherein executing the first parameterized application includes executing the first parameterized application with one or more values specified by the one or more user interface elements for the one or more parameters of the first parameterized application.

44. The one or more machine-readable hardware storage devices of claim 42, wherein executing the second parameterized application includes executing the second parameterized application with one or more values specified by the one or more user interface elements for the one or more parameters of the second parameterized application, wherein the one or more specified values are used as input by the rules in determining whether the one or more conditions are satisfied.

45. The one or more machine-readable hardware storage devices of claim 42, wherein executing the third parameterized application includes executing the third parameterized application with one or more values specified by the one or more user interface elements for the one or more parameters of the third parameterized application.

46. The one or more machine-readable hardware storage devices of claim 41, wherein a data item includes a data record and wherein the transforming includes reformatting the data record in accordance with a format specified by the first specification of the first parameterized application.

47. The one or more machine-readable hardware storage devices of claim 46, wherein the operations further include:
based on execution of the second parameterized application, enriching the data record with data from a profile of a user associated with the data record, with the enriching being in accordance with instructions specified by the second specification of the second parameterized application to retrieve, from memory, profile data for the user and to populate one or more fields of the data record with the retrieved profile data.

48. The one or more machine-readable hardware storage devices of claim 41, wherein a parameterized application includes an application for data processing, with the application including one or more parameters that are configurable with one or more values.

49. The one or more machine-readable hardware storage devices of claim 41, wherein the operations further include executing a feedback loop to one or more third party systems for requesting confirmation of execution of the one or more actions.

* * * * *